US006385213B1

(12) United States Patent
Nakamura et al.

(10) Patent No.: US 6,385,213 B1
(45) Date of Patent: May 7, 2002

(54) FRAME SYNCHRONOUS PATTERN PROCESSING APPARATUS AND FRAME SYNCHRONOUS PATTERN DETECTION APPARATUS AND METHOD FOR DETECTING FRAME SYNCHRONOUS PATTERN

(75) Inventors: Yoshinori Nakamura, Osaka; Kazuo Takatsu, Kawasaki, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/880,723

(22) Filed: Jun. 23, 1997

(30) Foreign Application Priority Data

Nov. 15, 1996 (JP) .............................................. 8-305346

(51) Int. Cl.[7] .................................................. H04J 3/06
(52) U.S. Cl. ...................................... 370/513; 370/514
(58) Field of Search ................................ 370/509, 506, 370/516, 517, 522, 513, 514, 512, 535, 544; 375/368

(56) References Cited

U.S. PATENT DOCUMENTS

| 4,748,623 | A | * | 5/1988 | Fujimoto | 370/513 |
| 4,920,535 | A | * | 4/1990 | Watanabe et al. | 370/514 |
| 5,081,654 | A | * | 1/1992 | Stephenson, Jr. et al. | 370/512 |
| 5,136,587 | A | * | 8/1992 | Obana et al. | 370/514 |
| 5,241,543 | A | * | 8/1993 | Amada et al. | 370/509 |
| 5,666,351 | A | * | 9/1997 | Oksanen et al. | 370/506 |
| 5,710,774 | A | * | 1/1998 | Suh et al. | 370/513 |
| 5,784,380 | A | * | 7/1998 | Kawahara | 370/509 |

FOREIGN PATENT DOCUMENTS

JP          63-244949          10/1988

\* cited by examiner

Primary Examiner—Melvin Marcelo
Assistant Examiner—Phuoychau Ba Nguyen
(74) Attorney, Agent, or Firm—Rosenman & Colin LLP

(57) ABSTRACT

In processing a frame synchronous pattern, a data switch section arranges in such a manner that an object frame synchronous pattern comes as a start of the parallel data, and a provisional-region detection section for samples, among the parallel data, a part in which the object frame synchronous pattern is presumably located, as a provisional region, and converts the parallel data of the provisional region in serial. And a frame synchronous pattern detecting section detects the object frame synchronous pattern from the partial serial data of the sampling and converted and responsive to the frame synchronous pattern detection section and the provisional-region detection section. A data switch control section, controls the data switch section based on the output of the provisional-region detection section and the output of the frame synchronous pattern detection section.

17 Claims, 46 Drawing Sheets

FIG. 19(a) LOAD INPUT
FIG. 19(b) Q OUTPUT
FIG. 19(c) A2 INPUT
FIG. 19(d) LATCH TIMING

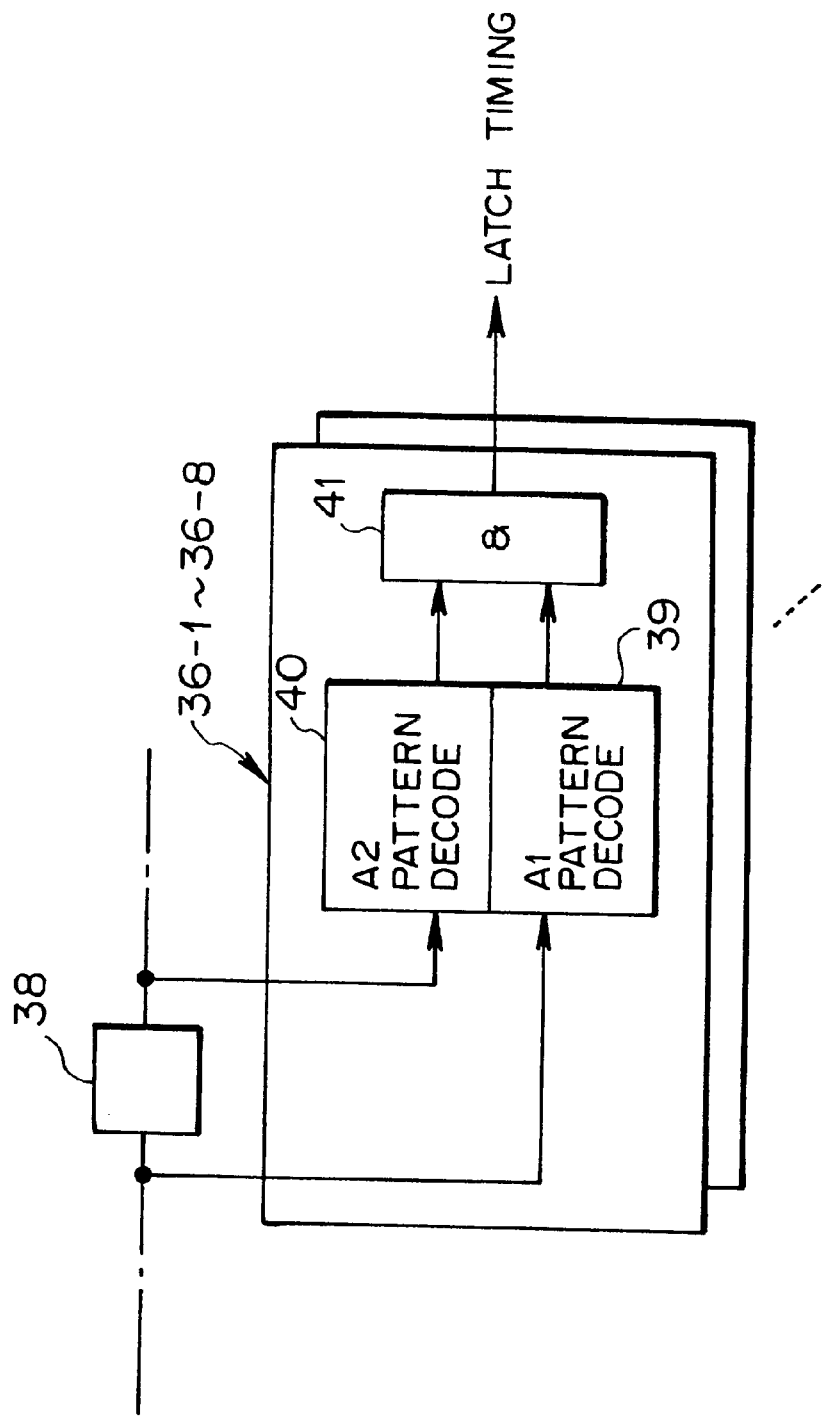

PRE FDET OUTPUT
TEMPORARY
POSITION DETECTION
PULSE

FDET OUTPUT
FRAME PATTERN
DETECTION PULSE

BIT SHIFT AMOUNT

BIT SHIFT AMOUNT
(SHIFT AMOUNT FOR ARRANGING
LEADING DATA OF FRAME TO THE
FIRST BIT)

FRAME SYNCHRONOUS PATTERN PROCESSING APPARATUS AND FRAME SYNCHRONOUS PATTERN DETECTION APPARATUS AND METHOD FOR DETECTING FRAME SYNCHRONOUS PATTERN

BACKGROUND OF THE INVENTION (1) Field of the Invention

The present invention relates to a frame synchronous pattern processing apparatus and a frame synchronous pattern detection apparatus and a method for detecting frame synchronous pattern, and more particularly to the frame synchronous pattern processing apparatus and frame synchronous pattern detection apparatus and the method for detecting frame synchronous pattern which may be used advantageously for the synchronized digital signal transmission network including SDH (Synchronous Digital Hierarchy) or SONET (Synchronous Optical Network).

(2) Description of the Related Art (A) Brief Description of SDH Transmission System As it is well known, for the realization of B-ISDN, ITU-T is now standardizing SDH as an internationally however unified digital hierarchy (however, North America standardizes the above-mentioned SONET as its original hierarchy).

This SDH (or SONET) adopts a multiplexing method for multiplexing by adding an overhead containing information for maintenance and operation to a plurality of signals of lower group level and, therefore, the multiplexed frame comprises a format including a plenty of maintenance and operation information for respective speed as described in the item (B) below.

The overhead includes, normally, section overhead (SOH) for transmission line and path overhead (POH) for path, for multiplexing generally by adding POH to signal of lower group side (lower group level) and finally SOH is added.

(B) Description of SDH (SONET) transmission network

FIG. 40 is a block diagram showing an example of SDH (SONET) transmission network and, in this FIG. 40, 301 indicates subscriber terminal, 302 line terminal apparatus (NT), 303 and 306 transmission terminal station equipment (LT) respectively, 304 switch gear (SW), 305 multiplexer (MUX) and 307 relay transmission line.

In SDH (SONET) transmission network shown in this FIG. 40, lower group level data from a plurality of subscriber terminals 301 is byte multiplexed in the multiplexer 305 to be stacked into STM-N (STS-M) frame (wherein N and M represent multiplexing factor and N=1,4,16,64, . . . : M=3,12,48,192, . . . ), processed by overhead (SOH, POH) termination/replacement processing or AU/TU pointer termination/replacement processing in the transmission terminal station apparatus 306 before being transmitted through the relay transmission line 307 to the corresponding subscriber terminal 301 side.

By the way, STM-1(STS-3) frame constituting the basic multiplexed frame in the SDH (SONET) includes, as shown in FIG. 41, a format represented by two-dimensional byte array of 9 rows×270 bytes wherein the leading 9 rows×9 bytes are composed of a section overhead (SOH) 231 and AU (AU-4) pointer 232 and the following 9 rows×261 bytes are called payload (SPE: Synchronous Payload Envelope) 233 containing multiplexed information (VC: lower group level data).

Moreover, the section overhead 231 includes, as shown in FIG. 42, basically, a relay section overhead (RSOH: Regenerator-SOH) 231A and a terminal station section overhead (MSOH: Multiplex-SOH) 231 B. The relay section overhead 231 A is used for signal maintenance/operation in the relay section [mutually between repeaters (existing on the relay transmission line 307: not illustrated) and between the repeater and the transmission terminal station apparatus 306] and composed of a frame synchronous pattern (A1, A2 byte) and B1 byte for coding error monitoring in the relay section and the like.

On the other hand, the terminal station section overhead 231 B is used for signal maintenance/operation in the terminal station section (between transmission terminal station apparatuses 306), and composed of B2 byte for coding error monitoring in the terminal station section and of K1, K2 byte [APS (Automatic Protection Switch) byte] used for supplying/receiving signal for controlling a system switching between the transmission terminal station apparatuses 306 and used for a display of an in alarm state in respect of the trouble of the repeaters and the relay transmission line 307.

AU4 pointer 232 is used for indicating a containing position (frame leading position) of VC(VC4) in the payload 233 and composed of H1–H3 bytes, and these H1–H3 bytes are used for the pointer value updating or the phase adjustment in clock switching (positive staff/negative staff) or the like.

Here, in FIG. 42, two bytes marked by*and X following C1 byte are respectively bytes not scrambled upon the transmission, each byte marked by X is respectively reserved for domestic use and each blank byte is reserved for future international standardization.

STM-4 (STS-12) frame is built up by byte multiplexing 4 frames (in the multiplexer 305) of STM-1 (STS-3) comprising the above-mentioned format, then, STM-16 (STS-48) is built up by byte multiplexing 4 frames of STM-4 (STS-12) and similarly STM-N (STS-M) frame is built up sequentially by byte multiplexing lower group side frames by 4 frames.

In consequence, for instance, the section overhead 231 of an STM-4 frame is composed of, as shown in FIG. 43, 9 rows×144 bytes wherein section overhead 231 shown in FIG. 42 is byte multiplexed by four and the section overhead 231 of STM-64 (STS-192) frame is composed of 9 rows× 576 bytes.

Next, FIG. 44 is a block diagram showing the composition example of the essential part of the transmission terminal station apparatus 306. As shown in this FIG. 44, the transmission terminal station apparatus 306 comprises a current system 403A and a standby system 403B including respectively, for instance, a SOH termination processing section 404, an AU pointer processing section 405, a TU pointer processing section 406, an elastic memory (ES) section 407, a POH termination processing section (POH termination processor) 408 and a path switch alarm insertion section 409. 410 indicates a microcomputer ($\mu$-COM) and 411 a cross connect apparatus (XC).

Here, the SOH termination processing section 404 executes an SOH termination processing such as a frame synchronization establishment, a coding error monitoring and so on based on the section overhead 231 of a received multiplexed frame (STM-N/STS-M), and the AU pointer processing section 405 extracts a TU signal by recognizing the frame leading position of TU level contained in the payload 233 based on the AU pointer 232 included in the AU4 signal removed of RSOH231A and MSOH231B by the termination processing.

The TU pointer processing section 406, extracts a signal of VC level contained in the TU signal (decomposition of the TU signal into a VC signal) based on the TU pointer included in the TU signal extracted in the AU pointer processing section 405, the ES section 407 executes clock switching process of the VC signal and the POH termination processing section 408 performs, through the monitoring of the path overhead which is the overhead of the VC signal, a BIP (Bit Interleaved Parity) operation or a UNEQ (Unequipped: indicates that VC signal does not contain the payload 233 ) alarm detection and other.

The path switch alarm insertion section 409 inserts a path switch alarm as a control information 25 for indicating the switching process of current system 403A/standby system 403B to the VC signal according to the setting by the microcomputer 410.

Thus, in the transmission termination apparatus 306, first, in the SOH termination processing section 404, the frame synchronization is established by detecting the frame synchronous pattern through the detection of a given bit pattern of A1, A2 byte contained in the section overhead 231 of the received multiplexed frame, the BIP operation in respect of B1 byte or other various types of termination processing are performed to break down the received multiplexed frame into the AU4 signal.

Next, the AU4 signal is broken down into the TU signal based on the AU4 pointer 232 in the TU pointer processing section 406, and moreover this TU signal is broken down into the VC signal based on the TU pointer in the TU pointer processing section 406. The thus obtained VC signal is clock-changed over from the transmission line side clock to the apparatus side clock in the ES section 407 so that the transmission speed can be processed in the following stage.

Here, the POH termination processing section 408 executes the necessary termination processing such as the coding error monitoring or the alarm display to the path overhead contained in the VC signal. When any alarm is detected in this termination processing, an alarm processing according to the detected alarm will be performed by the path switch alarm insertion section 409 and the microcomputer 410.

For instance, if an UNEQ alarm is detected in this POH termination processing section 408, this UNEQ alarm is supplied to the path switch alarm insertion section 409 and, the BIP operation result (BIPPM: BIP performance monitor) is notified to the microcomputer 410. Being notified, the microcomputer 410 executes an alarm processing by software before setting the path switch alarm insertion to the path switch alarm insertion section 409 (the signal of the TU channel which has detected the UNEQ alarm is set to ALL 1).

In the cross connect apparatus (XC) 11, if an anomaly is detected by the detection of the TU channel set to the ALL "1", the transmission system of that channel shall be switched from the current system 3A to the standby channel 3B.

Thus, in the transmission terminal station apparatus 306, after the frame synchronization is established by executing SOH termination processing to the received multiplexed frame, the AU pointer processing and the POH termination processing or other, are sequentially executed under the condition wherein the frame synchronization is established. As a result, the transmission terminal station apparatus 306 can break down the received multiplexed frame into the VC signal and can execute the alarm detection process precisely during this breaking-down process.

By the way, in the SOH termination processing section 404, when the multiplexing factor n of the multiplexed frame increases and the data transmission rate achieves higher rate such as 115 Mbps (STM-1/STS-3), 622 Mbps (STM-4/STS-12), 2.4 Gbps (STM-16/STS-48), 10 Gbps (STM-64/STS-192), the device operation rate, power consumption or other problems occur, so the establishment of a setup/hold margin or the lower power consumption are assured reducing the rate by converting once the multiplexed frame (multiplexed serial data) into parallel data.

However, in this case, as A1, A2 bytes of the number corresponding to the multiplexed frame multiplexing factor N (M) exist (by 3×N for STM-N and by M for STS-M) in the section overhead 231 of the multiplexed frame as shown in FIG. 42 and FIG. 43, if the multiplexed frame is paralleled by m [in which m=8(bit)×natural number], as shown in FIG. 45, for example, m positions of the leading position of A1(A2) bytes exist in m parallel data, namely m patterns of the frame synchronous pattern (FDET) to be detected exist.

As the consequence, in the SOH termination processing section 404, m ways of detection of A1, A2 byte (frame synchronous pattern) shall be executed in accordance with the parallel factor m of the multiplexed frame.

FIG. 46 is a block diagram showing the composition of the SOH termination processing section 404 in respect of such frame synchronous pattern detection function and, as shown in this FIG. 46, the SOH termination processing section (frame synchronous pattern processing apparatus) 404 comprises a serial/parallel (S/P) conversion section 412, a byte switch (BSW) section 413, a frame synchronous pattern detection (FDET) section 414-1 to 414-m, a counter control section 415, a frame counter 416, a synchronization protection section 417 and a byte switch control section 418.

Here, the S/P conversion section 412 S/P converts the received multiplexed serial data (received multiplexed frame) into m parallel data and the byte switch section 413 performs the slot replacement (data rearrangement) so that the frame synchronous pattern (A1, A2 byte) in m parallel data is positioned at the leading slot under the control of the byte switch control section 418. It should be noted that this slot rearrangement is performed so as to proceed to the replacement of the section overhead 231 which is performed sequentially from the leading slot in the following stage.

On the other hand, respective frame synchronization detection section (frame synchronous pattern detection apparatus) 414-1 to 414-m detects respectively A1, A2 byte (given bit pattern) from the m parallel data and, in this case, the leading slot position of the A1 (A2) byte exists m ways in the m parallel data (namely m×frame synchronous pattern to be detected exist) so m sections are provided as shown in FIG. 46.

Moreover, the counter control section 415 controls the counting operation of the frame counter 416 and, for example, the count value of the frame counter 416 is counted up each time a frame synchronous pattern is detected in the frame synchronous pattern detection section 414-i (in which i=1 to m) and the count value of the frame counter 416 is reset on the reception of the synchronization establishment signal (OOF) described below from the synchronization protection section 416.

Additionally, the frame counter 416 counts the count value corresponding to the given protection stages under the control of the counter control section 415 and when the count value of the frame counter 416 attains a given value (number of protection stages), the synchronization protection section 417 outputs the synchronization establishment signal (OOF) indicating the establishment of frame synchronization by a consecutive detection of the frame synchronous pattern in the frame synchronous pattern detection section 414-i in a given number of times.

Receiving the synchronization establishment signal (OOF) from the synchronization protection section 417, the byte switch control section 418 performs the slot rearrangement processing by controlling the byte switch 413 so that the leading one of the frame synchronous patterns detected at that moment by the frame synchronous pattern detection section 414-i is positioned at the leading slot in m parallel data.

Given such composition, in the SOH termination processing section 404, first, the received multiplexed serial data is converted into low speed parallel data through m parallelization by the S/P converter 412 before detecting A1, A2 byte (predetermined bit pattern of 16 bits in total) contained in this m parallel data by the frame synchronous pattern detection section 414-i for detecting the frame synchronous pattern.

When it is recognized that the frame synchronous pattern is detected in the given times consecutively through the counter control section 415, the frame counter 416 and the synchronization protection section 417, the byte switch 413 and the byte switch control section 418 rearrange slots so that the leading position of such frame synchronous pattern is placed at the leading slot in m parallel data.

Thus, concerning main signal data for the following stage, as the frame synchronous pattern is always positioned at its leading slot, data may only be inserted sequentially from the leading slot for changing the section overhead 231.

However, as in the SOH termination processing section (frame synchronous pattern processor) 404 the frame synchronous pattern existing in m ways in m parallelized parallel data is detected by the frame synchronous pattern detection section 414-i, the frame pattern detection circuit which was necessary only by one way for the entire apparatus in the serial data processing (refer to FIG. 47) will be necessary by m ways for the entire apparatus (refer to FIG. 48), according to the increase of the multiplexed factor of the multiplexed frame(increase of parallel processing rate), the number of equipment gate and the number of inner net increases so as to increase bulk size and cost of LSI, the layout will be complex and other problems will appear.

Moreover, as the frame synchronous pattern detection signals are produced m ways by the frame synchronous pattern detection section 414-i, the control of the frame counter 416, the synchronization protection section 417 or the byte switch control section 418 will be complex so as to provoke LSI bulk size, layout and cost problem in the same way.

SUMMARY OF THE INVENTION

The present invention is devised based on the consideration of these problems and has a object of providing a frame synchronous pattern processing apparatus and a frame synchronous pattern detection apparatus and method for detecting a frame synchronous pattern, wherein the frame synchronous pattern in m parallel data may be precisely detected without making m frame synchronous patterns in m parallel data detectable.

To achieve this object, the frame synchronous pattern processing apparatus according to the invention comprises:
- a data switch section for performing a data rearrangement processing of parallel data obtained by serial/parallel conversion of multiplexed serial data having a frame synchronous pattern based on an SDH transmission system so that the frame synchronous pattern is leading one;
- a temporary region detection section for temporarily detecting a candidate of region data which may contain the frame synchronous pattern from the parallel data and for serializing this temporary region data;
- a frame synchronous pattern detection section for detecting the frame synchronous pattern from the temporary region data obtained by the temporary region detection section; and
- a data switch control section for controlling the data rearrangement processing by the data switch section according to the detection state of the temporary region data by the temporary region detection section and to the detection state of the frame synchronous pattern by the frame synchronous pattern detection section.

Therefore, according to the frame synchronous pattern processing apparatus of the present invention, a candidate of regions possibly containing frame synchronous pattern may be detected temporarily by the temporary region detection section before detecting the actual frame synchronous pattern from these temporary regions by the frame synchronous pattern detection section, so as to enable to detect the frame synchronous pattern in parallel data by only one circuit independent of the parallel data parallel factor and, thus, to obtain the following effects.

(1) Even when the parallel factor of data to be treated increases, the frame synchronous pattern may be detected rapidly without increasing size, power consumption or cost of the present apparatus.

(2) As it becomes possible to detect the frame synchronous pattern in parallel data by one circuit (common circuit in respect of parallel data), the frame synchronous pattern detection information is unified in respect of the parallel data so as to simplify various controls including the count control of the protected stage number information during the frame synchronization establishment and others resulting in the reduction of size, power consumption or cost of the present apparatus.

Moreover, the frame synchronous pattern detection apparatus of the invention comprises:
- a temporary region detection section for detecting the candidate of regions data which may contain the frame synchronous pattern, from multiplexed serial data having the frame synchronous pattern based on the SDH transmission system; and
- a frame synchronous pattern detection section for detecting the frame synchronous pattern, from the temporary region data detected by the temporary region detection section.

Therefore, according to the frame synchronous pattern detection apparatus of the present invention, in this case also, even when the parallel factor of data to be treated increases, the frame synchronous pattern may be detected rapidly without increasing size, power consumption or cost of the present apparatus.

Moreover, the frame synchronous pattern detection apparatus of the invention comprises:
- a temporary region detection section for temporally detecting a candidate of region data which may contain such frame synchronous pattern, from data having a given frame synchronous pattern; and
- a frame synchronous pattern detection section for detecting the frame synchronous pattern, from the temporary region data detected by the temporary region detection section. On the other hand, the frame synchronous pattern detection method of the invention comprises stages of:

detecting a candidate of region data containing the frame synchronous pattern, from data having a given frame synchronous pattern; and detecting the frame synchronous pattern, from the temporary region data.

Therefore, according to the frame synchronous pattern detection apparatus and the method for detecting frame synchronous pattern of the invention, the desired frame synchronous pattern may be detected rapidly in respect of the transmission system or data processing system except the SDH transmission method thus contributing remarkably to its versatility.

BRIEF DESCRIPTION OF THE DRAWINGS

FIG. 26 is a block diagram showing a composition of A1/A2 byte detection section in the temporary frame synchronous pattern detection section of the variation.

DESCRIPTION OF THE PREFERRED EMBODIMENTS (a) Aspect of the Invention

The aspect of the invention is described referring to drawings.

Figure 1:
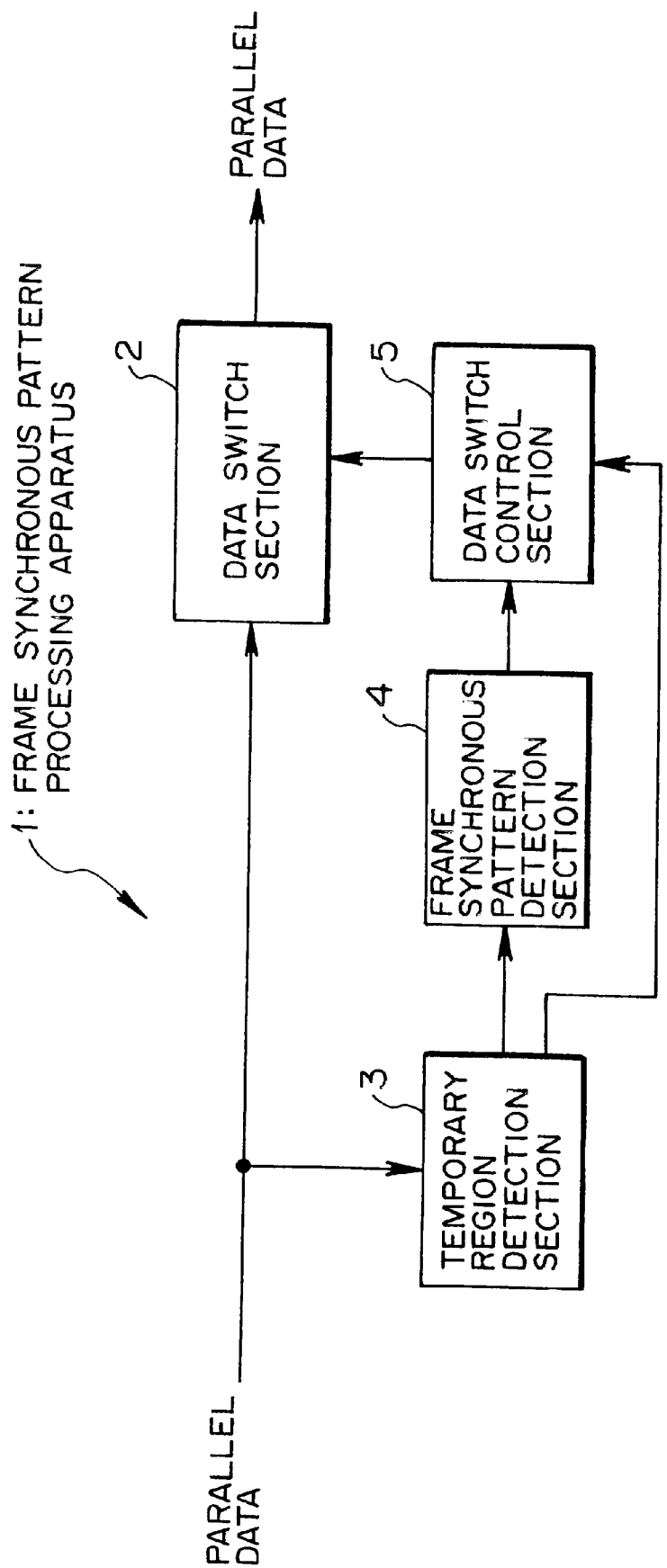
FIG. 1 and FIG. 2 are block diagrams representing respectively an aspect of the present invention.

FIG. 1 is a block diagram showing an aspect of the present invention. A frame synchronous pattern processing apparatus 1 shown in this FIG. 1 comprises a data switch section 2, a temporary regions detection section 3, a frame synchronous pattern detection section 4 and a data switch control section 5.

Here, the data switch section 2 performs a data rearrangement of parallel data obtained by a serial/parallel conversion of multiplexed serial data having a frame synchronous pattern based on the SDH transmission system so that the frame synchronous pattern is leading one; the temporary region detection section 3 temporarily detects candidate region data which may contain the frame synchronous pattern from the parallel data and serializes this temporary region data.

The frame synchronous pattern detection section 4 detects the frame synchronous pattern from the temporary region data obtained by this temporary region detection section 3; and the data switch control section 6 controls the data rearrangement processing by the data switch section 2 according to the detection state of the temporary region data by the temporary region detection section 3 and the detection state of the frame synchronous pattern by the frame synchronous pattern detection section 4.

Therefore, in the frame synchronous pattern processing apparatus 1 of the present invention composed as mentioned above, first, the candidate regions which may contain a frame synchronous pattern may be temporarily detected by the temporary region detection section 3 before detecting an actual frame synchronous pattern from these temporary regions by the frame synchronous pattern detection section 4.

Thus, in the frame synchronous pattern detection apparatus 4, the frame synchronous pattern in parallel data may be detected by only one circuit independent of the parallel factor of the parallel data (without making m ways of frame synchronous patterns in m parallel data detectable), permitting, as a consequence, to obtain the following effects.

(1) Even when the parallel factor of data to be treated increases, the frame synchronous pattern may be detected rapidly without increasing size, power consumption or cost of the present apparatus 1.

(2) As it becomes possible to detect the frame synchronous pattern in parallel data by one frame synchronous pattern detection section 4 (common circuit in respect of parallel data), frame synchronous pattern detection information is unified in respect of the parallel factor so as to simplify various controls including the count control of the protected stage number information during the frame synchronization establishment and others resulting in the reduction of size, power consumption or cost of the present apparatus.

To achieve this, the temporary region detection section 3 comprises, for example, a temporary position information detection section for detecting temporary position information in the parallel data of the frame synchronous pattern, and a temporary region data hold section for sequentially holding a given region parallel data including a reference position based on the temporary position information detected by the temporary position information detection section as the temporary region data by turns and serially outputting the parallel data. Thus, in this temporary region detection section 3, it becomes possible to securely detect data of regions which may contain the frame synchronous pattern. As the consequence, the reliability in the frame synchronous pattern detection processing may be improved remarkably.

To be more specific, the temporary position information detection section comprises, for example, an A1 byte detection section for detecting an A1 byte from the parallel data, an A2 byte detection section for detecting an A2 byte from the parallel data, and a switching control section which comprises a control section for stopping the detection operation of the A1 byte detection section and starting the detection operation of the A2 byte detection section, when an A1 byte is detected by the A1 byte detection section, and on the other hand, stopping the detection operation of the A2 byte detection section and starting the detection operation of the A1 byte detection section, when an A2 byte is detected by the A2 byte detection section.

Thus, when the A2 byte is detected after the detection of the A1 byte, this temporary position information detection section may hold the region data in the temporary region data hold section presuming that a frame synchronous pattern comprising the A1 byte and the A2 byte are included in a given region taking this A2 byte as the reference position (for example, regions including several bytes forward and backward).

As the consequence, the frame synchronous pattern detection section 4 may detect the frame synchronous pattern including the A1 byte, the A2 byte extremely efficiently and rapidly.

Here, if the A1 byte detection section mentioned above is so composed to detect the A1 byte for one byte for each A1 byte leading position which may exist in the parallel data and the A2 byte detection section is so composed to detect one byte of the A2 byte for each A2 byte leading position which may exist in the parallel data, as for the necessary number of circuit for the A1 byte detection and the necessary number of circuit for the A2 byte detection, that will be sufficient for one byte (8 bits) regardless of the parallel factor of the parallel data.

Therefore, it would be extremely advantageous for size, power consumption or cost of the present apparatus 1 and for LSI layout and the like.

Additionally, if the switching control section comprises a control section for stopping the detection operation of the A1 byte detection section when the A1 byte is detected in the A1 byte detection and, for starting the detection operation of the A2 byte detection section and, on the other hand, for stopping the detection operation of the A2 byte detection section when the A2 byte is detected in the A2 byte detection and, for starting the detection operation of the A1 byte detection section, the detection of the A2 byte after the detection of the A1 byte may performed securely.

As the consequence, in the temporary position information detection section, the temporary position information of the frame synchronous pattern comprising the A1 byte and A2 byte may be detected very efficiently.

Here, if the control section comprises a JK type flip-flop circuit, the composition of the control section may be extremely simplified, contributing remarkably to the reduction of size and cost of the apparatus 1.

Moreover, the switching control section may include a invalidation processing section for determining the validity/ invalidity of the temporary region data based on the A1 byte detection state in the A1 byte detection section and the A2 byte detection state in the A2 byte detection section, and for performing the invalidation processing to inhibit output of the temporary position information to the temporary region data hold section if the temporary region data is invalid.

In this composition, as this switching control section stops outputting the temporary position information to the temporary region data hold section if the temporary region data is invalid, the invalid data is not held in the temporary region data hold section but only the reliable data (the region data including the frame synchronous pattern) will be held. Therefore, the frame synchronous pattern detection section 4 may always detect the frame synchronous pattern precisely, contributing considerably to the reliability improvement of this apparatus 1.

To be more specific, as the invalidation processing section compares, for instance, the leading position of the A1 byte detected in the A1 byte detection section and the leading position of the A2 byte detected in the A2 byte detection section, determines the temporary region data invalid when respective leading positions are different from each other and performs the invalidation processing, the temporary region data will be held as valid data in the temporary region data hold section only when the detected leading position of the A1 byte corresponds to the detected leading position of the A2 byte and both A1 and A2 bytes of the detection object, are detected normally. Therefore, only more reliable region data may be detected and held.

Here, this invalidation processing section may be realized easily by comprising an A1 byte leading position holding section for temporarily holding the leading position of the A1 byte detected in the A1 byte detection section and a comparison section for comparing the leading position of the A1 byte held in this A1 byte leading position hold section with the leading position of the A2 byte detected in the A2 byte detection section, wherein as the result of the comparison in this comparison section, the temporary region data is determined invalid when the leading position of the A1 byte and the leading position of the A2 byte are determined different from each other and the invalidation processing is executed. Accordingly, the invalidation processing section may be composed very simply.

Also, the invalidation processing section may comprise a timer for executing the counting operation for a given period of time when the A1 byte is detected in the A1 byte detection section and for performing the invalidation processing to the temporary region data determined invalid when the A2 byte is not detected in the A2 byte detection section before the end of the counting operation of this timer.

Consequently, as the temporary position information is not supplied to the temporary region data hold section when the A2 byte which should be detected as the temporary position information is not detected within a certain period of time after the detection of the A1 byte, the temporary region data is invalid then and will not be held in the temporary region data hold section.

Therefore, the present apparatus 1 allows to prevent an iterative detection of the same bit pattern as A1 byte which may be produced accidentally in the paralleled data and to avoid waiting for a long time without detecting the temporary region data so as to improve its reliability considerably.

Moreover, the invalidation processing section may comprise an A1 byte continuity monitoring section for monitoring whether the A1 byte is detected continuously in the A1 byte detection section and for performing the invalidation processing judging the temporary region date invalid when the continuity of the A1 byte is not confirmed in this A1 byte continuity monitoring section and the A2 byte is not detected in the A2 byte detection section.

In this composition, this invalidation processing section may judge the temporary region data invalid then and make it not be held in the temporary region data hold section if the A1 byte or the A2 byte is not detected after the detection of the A1 byte, namely unknown data other than the A1 and A2 byte is detected after the detection of the A1 byte except. As a consequence, the reliability of the temporary region data is further improved.

Here, the temporary position information detection section may comprise an A1/A2 byte detection section for simultaneously detecting the A1 byte and the A2 byte from a plurality of time slots of the parallel date and supply the detection position as the temporary position information to the temporary region data hold section when the A1 byte and the A2 byte are simultaneously detected by this A1/A2 byte detection section.

Consequently, in this temporary position information detection section, the region including the boundary of the A1 byte and the A2 byte (namely, the region including the frame synchronous pattern) appearing on the time slot of the parallel data may be identified in a certain degree with only one detection operation by the A1/A2 byte detection section so as to localize the region including the frame synchronous pattern more effectively. Therefore, the temporary region data may be detected more rapidly with a higher accuracy.

Next, the temporary region data hold section comprises, for instance, a plurality of shift stages having a plurality of stages of shift circuits for temporarily holding and shifting respective input data according to the parallel factor of the parallel data for temporarily,—wherein the shift circuit output of lower stage side is sequentially connected to the highest stage side shift circuit input in respective shift stage when the temporary position information is detected in the temporary position information detection section and the highest stage shift circuit output of the respective shift stage is connected to the lowest stage shift circuit input of the following shift stage for serializing the input parallel data.

With this composition, in this temporary region data hold section, as the parallel data shift operation and the parallel data serialization operation are realized by using the shift circuit, the input parallel data may be serialized without individually providing a circuit for shifting the parallel data and a circuit for serializing the parallel data. As a consequence, the serialization processing may be realized extremely rapidly while minimizing the size of the present apparatus 1.

Adding a mask processing section for masking output from the temporary region data hold section to this temporary region data hold section when the parallel data except the temporary region data is input as the input parallel data, the frame synchronous pattern detection section 4 may always perform frame synchronous pattern detection only with the data including the frame synchronous pattern. Consequently, this contributes considerably to the improvement of the detection operation reliability and the reduction of power consumption.

By operating in cooperation with the temporary region detection section 3, the frame synchronous pattern detection section 4 may perform the detection of the frame synchronous pattern by using the serialization processing of the temporary regions data so as to minimize the processing period of time from the temporary region data detection in the temporary region detection section 3 to the frame synchronous pattern detection in the frame synchronous pattern detection section 4. As the consequence, the frame synchronous pattern may be detected from the temporary region data extremely rapidly.

Next, the data switch control section 5 may be composed to generate, as control signal for the data switch section 2, a data shift amount corresponding to the period of time from the detection of the temporary region data in the temporary region detection section 3 to the detection of the frame synchronous pattern in the frame synchronous pattern detection section 4.

In this composition, this data switch control section 5 may easily recognize the data shift amount necessary for positioning the frame synchronous pattern detected in the frame synchronous pattern detection section 4 at the leading position of the parallel data, securely control the data rearrangement processing of the data switch section 2 by such data shift amount and always position precisely the frame synchronous pattern at the leading position of the parallel data. Consequently, the rearrangement processing is performed by an extremely simple control in a way to contribute considerably to the simplification of the size of the present apparatus 1 and to the higher speed processing.

To be more specific, the data switch control section 5 comprises a counter for counting the counter value for the number of parallel of the parallel data when the temporary region data is detected in the temporary region detection section 3, wherein the data switch control section 5 comprises to supply to the data switch section 2, as the data shift amount, the counter value of this counter of the time when the frame synchronous pattern is detected in the frame synchronous pattern detection section 4.

Thus, in the data switch control section 5, as the counter value of the counter is taken as the data shift amount by the data switch section 2 even when the data shift amount exceeds the parallel factor of the parallel data because of the relation of the data amount of the temporary region data, the time required for the rearrangement processing in the data switch section 2 may always be minimized. Therefore, this rearrangement processing may be executed more rapidly.

Figure 2:
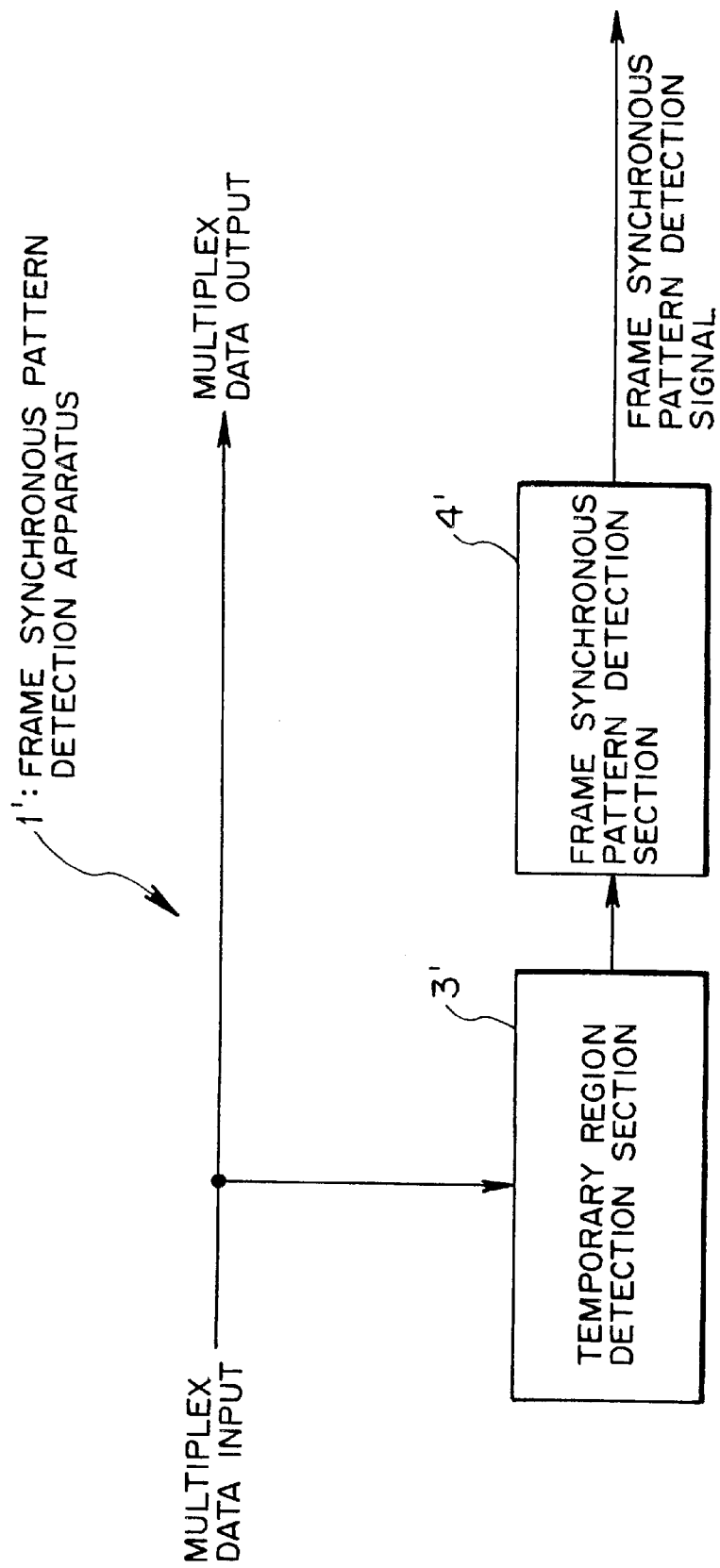

Next, FIG. 2 is also a block diagram showing an aspect of the present invention. As shown in this FIG. 2, the frame synchronous pattern detection apparatus 1' comprises a temporary region detection section 3' and a frame synchronous pattern detection section 4'.

Here, the temporary region detection section 3' detects the candidate region data containing the frame synchronous pattern from multiplexed data having the frame synchronous pattern based on the SDH transmission system. The frame synchronous pattern detection section 4' detects the frame synchronous pattern from the temporary region data detected in this temporary regions detection section 3'.

In the frame synchronous pattern detection apparatus 1' composed as mentioned above, first, the candidate regions which may contain the frame synchronous pattern may be detected temporarily by the temporary region detection section 3' before detecting the actual frame synchronous pattern from these temporary regions by the frame synchronous pattern detection section 4'. Thus, in the frame synchronous pattern detection apparatus 4, the frame synchronous pattern in parallel data can be detected by only one circuit independent of the parallel factor of the parallel data.

As the consequence, even when the parallel factor of data to be treated increases, the frame synchronous pattern may be detected rapidly without increasing size, power consumption or cost of the present apparatus 1'.

Note that, as the temporary region detection section 3' may also temporarily detect the candidate region data including such frame synchronous pattern from not only the frame synchronous pattern based on the SDH transmission system but also the data having a certain frame synchronous pattern, the present apparatus 1' may be applied to any data processing or the transmission system or the like except the SDH transmission method, thus contributing remarkably to its versatility.

(b) Description of an Embodiment of the Present Invention

Now, an embodiment of the present invention will be described.

(b-1) General Description of a Frame Synchronous Pattern Processing Apparatus

Figure 3:
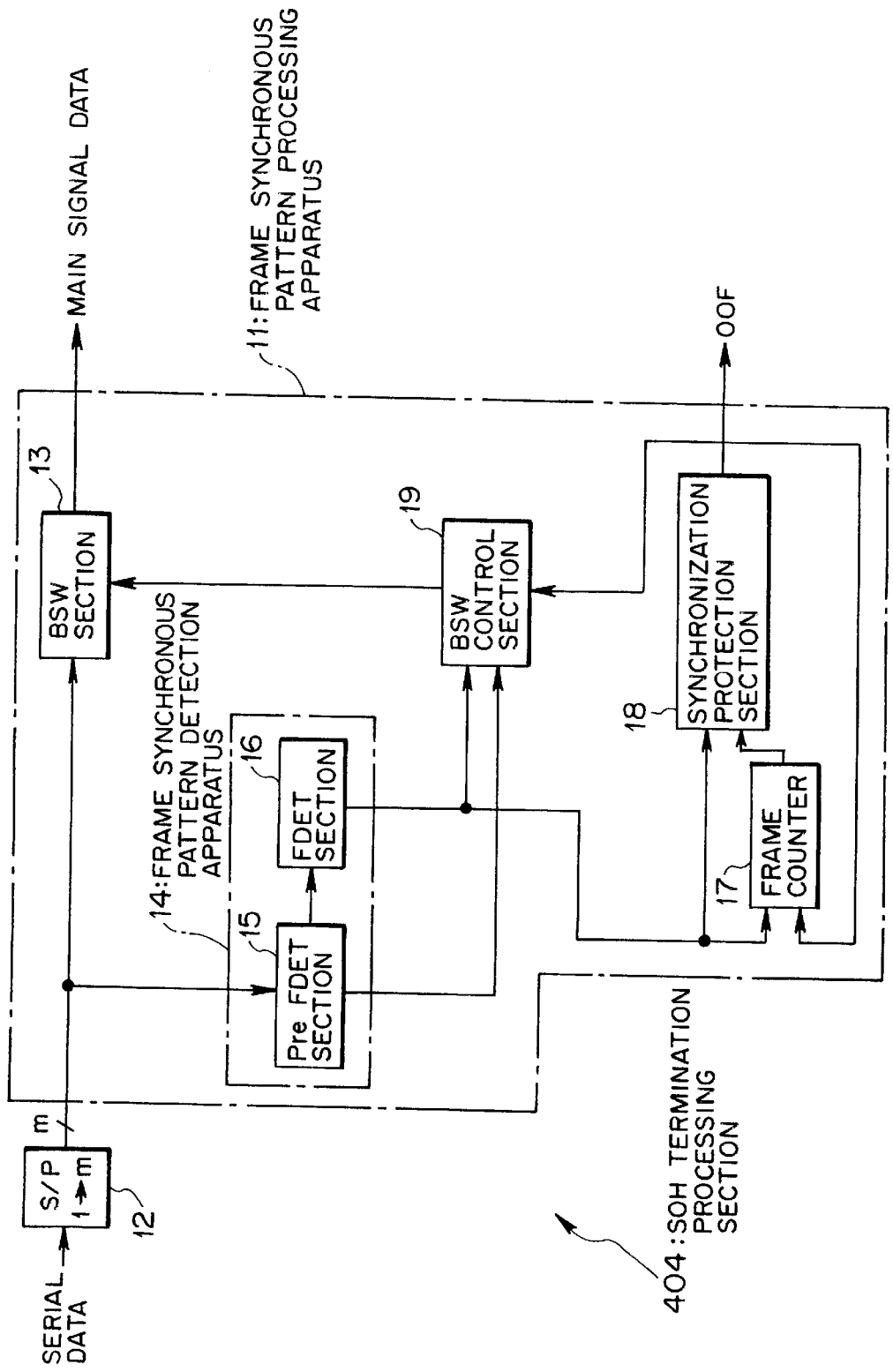
FIG. 3 is a block diagram showing a composition of a frame synchronous pattern processing apparatus of an embodiment of the present invention.
Figure 44:
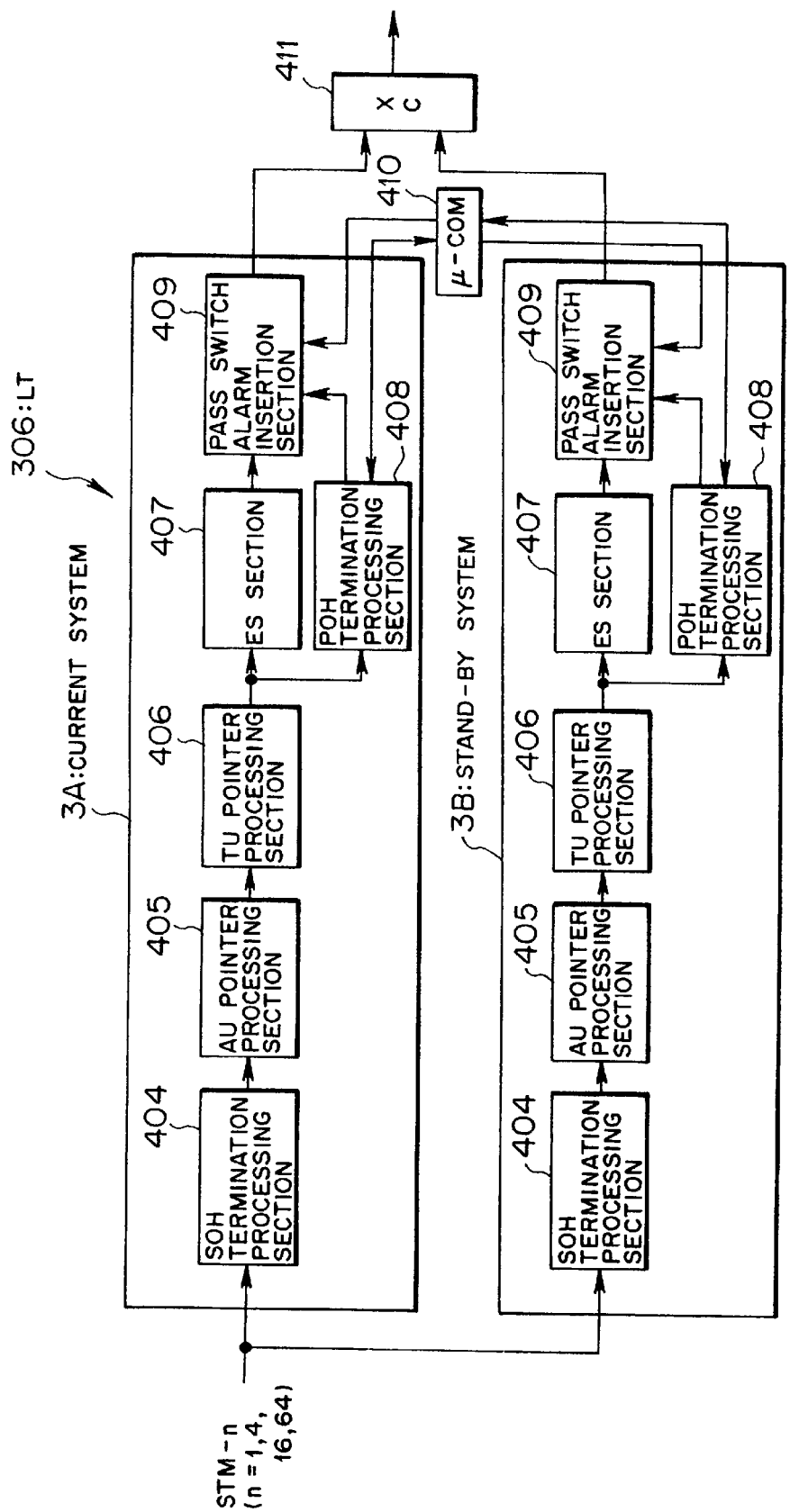
FIG. 44 is a block diagram showing an example of composition of the essential parts of a transmission terminal station apparatus.
Figure 45:
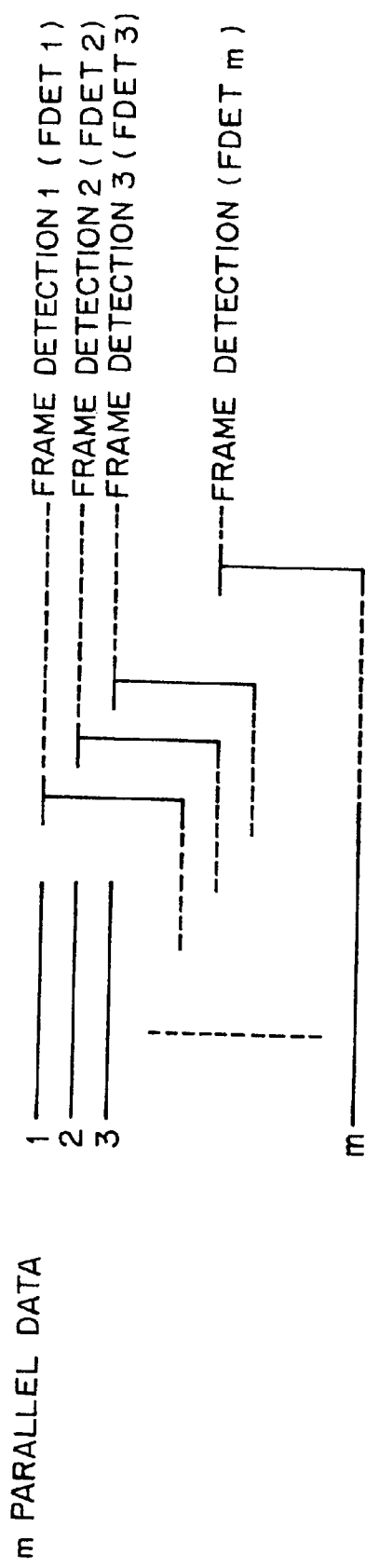
FIG. 45 is a diagram for illustrating a frame synchronization detection method.

FIG. 3 is a block diagram showing a composition of a frame synchronous pattern processing apparatus as an embodiment of the present invention. The frame synchronous pattern processing apparatus 11 shown in FIG. 3 is applied to the above-mentioned SOH termination processing section 404 in respect of FIG. 44, and comprises a byte switch (BSW) section 13, a frame synchronous pattern detection apparatus 14, a frame counter 17, a synchronization protection section 18 and a byte switch control section 19. Note that 12 indicates a serial/parallel (S/P) conversion section for converting the received multiplexed serial data into the parallel data (m parallel data).

Figure 46:
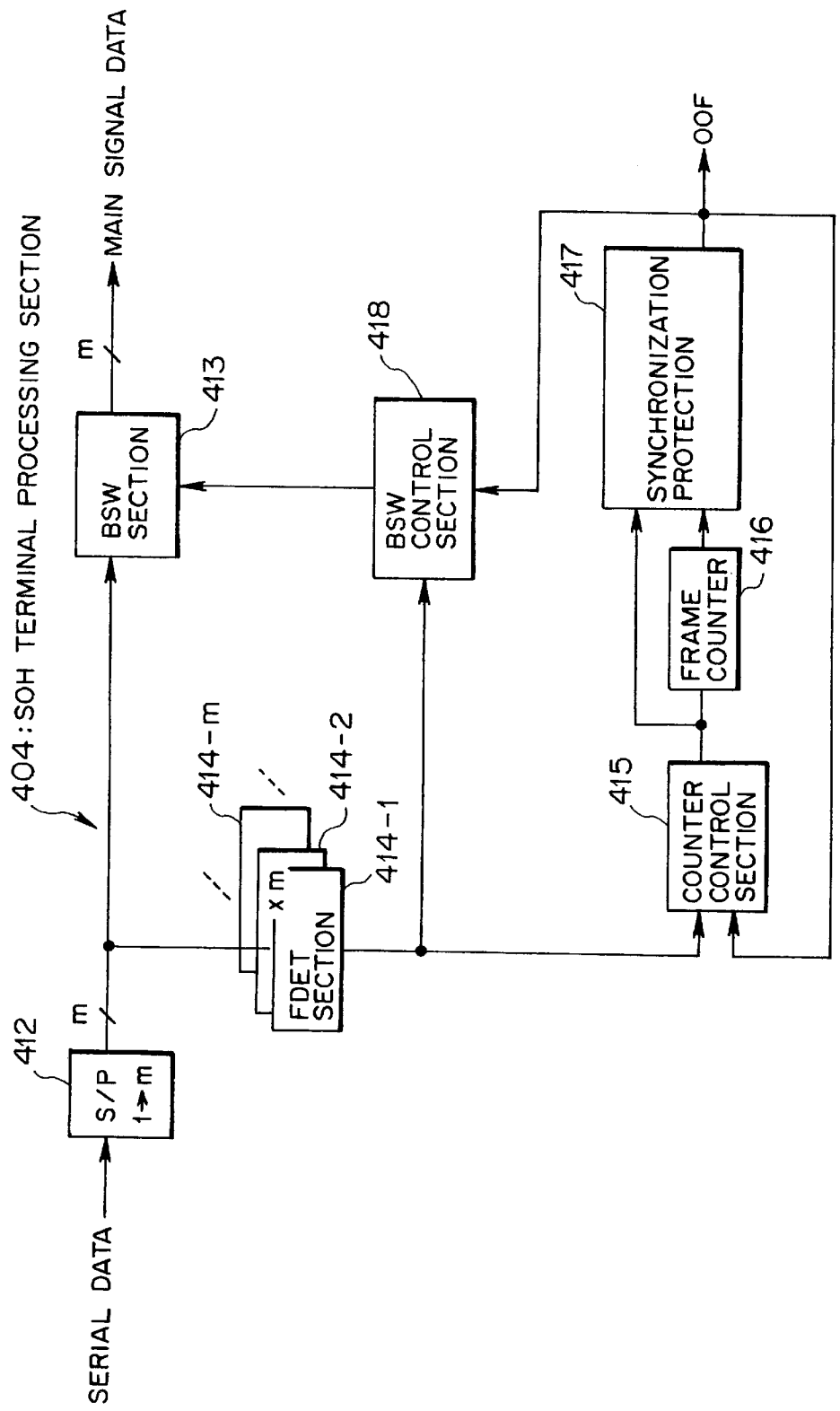
FIG. 46 is a block diagram showing a composition of SOH termination processing section in respect of frame synchronization detection function.
Figure 47:
FIG. 47 and FIG. 48 are respectively diagrams for illustrating problems encountered during a frame synchronization detection.
Figure 48:
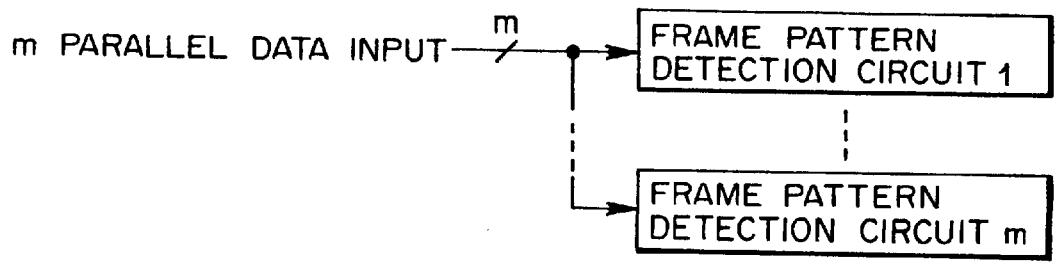

Here, the byte switch section (data switch section) 13, as the one shown in FIG. 46, performs slot replacement (data rearrangement) so that the frame synchronous pattern is positioned at the leading slot in respect of the m parallel data obtained through the S/P conversion, in the S/P conversion section 12, of multiplexed serial data having the frame synchronous pattern (predetermined bit pattern composed of A1, A2 byte) based on the SDH (or SONET) transmission system under the control of the byte switch control section 19.

The frame counter 17 counts the count value of the given number of protection stages in response to the detection state of the frame synchronous pattern in the frame synchronous pattern detection apparatus (may called simply "detection apparatus"hereinafter) 14 and, in this embodiment, the count value is counted up each time a frame synchronous pattern is detected in the detection apparatus 14.

Moreover, when the count value of this frame counter 17 attains a certain value (the protection stage number), the synchronization protection section 18 outputs the synchronization establishment signal (OOF) indicating that the frame synchronous patterns have been continuously detected for a given number of times and the frame synchronization has been established.

In other words, as it is obvious from this FIG. 3, the frame synchronous pattern processing apparatus 11 of the present embodiment reduces the frame synchronous pattern detection signal (detection information) to one in respect of the m parallel data by making the detection apparatus 14 for detecting the frame synchronous pattern in the m parallel data common to the m parallel data and simplifies the control of the frame counter 17 and the synchronization protection section 18 (the count control of the protection stage number) (the counter control section 415 in FIG. 46 to be omitted).

Here, the detection apparatus 14 is composed common to the m parallel data because of the following reason.

Figure 42:
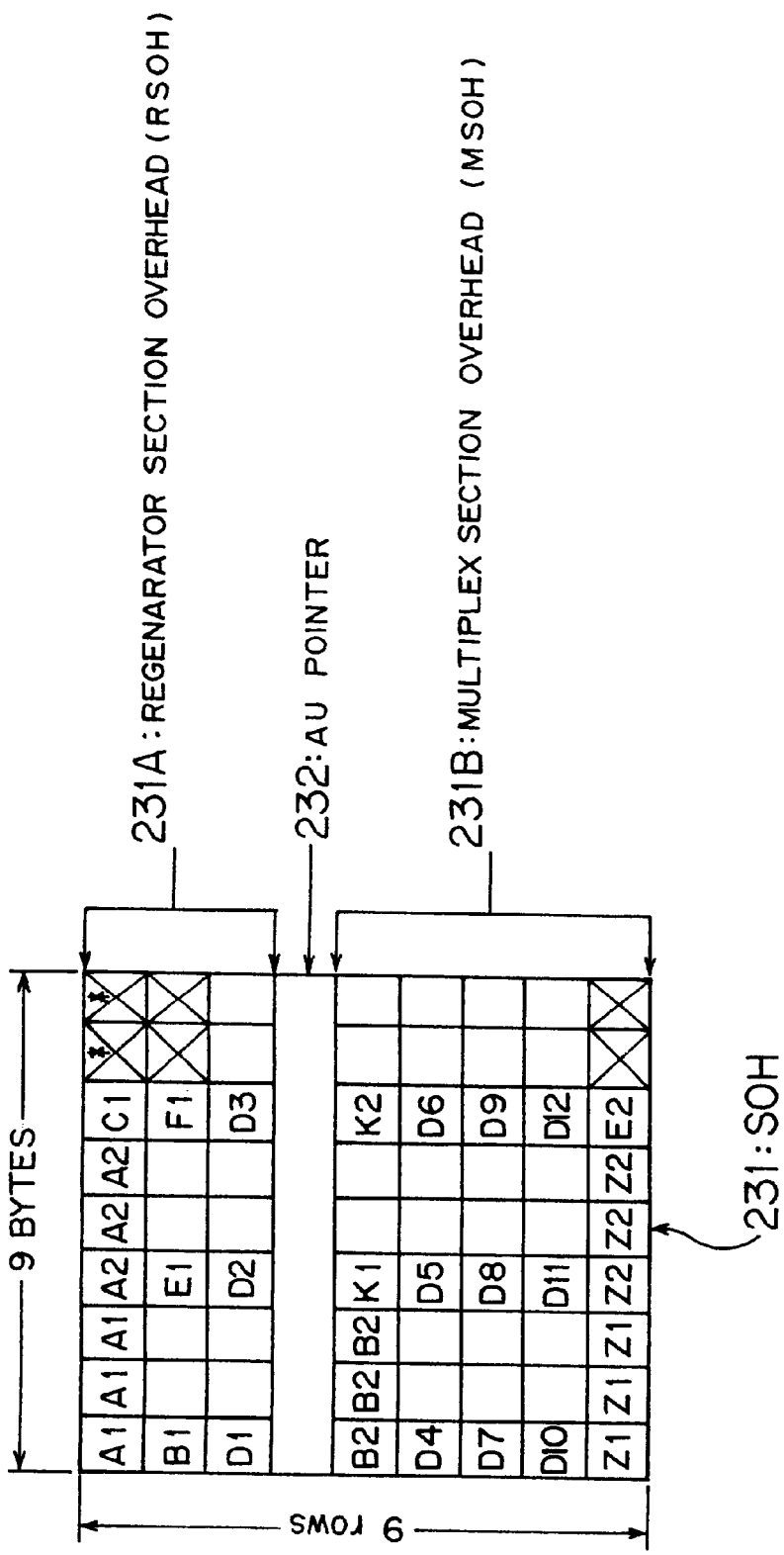
FIG. 42 is a diagram showing a format of STM-1 section overhead.
Figure 43:
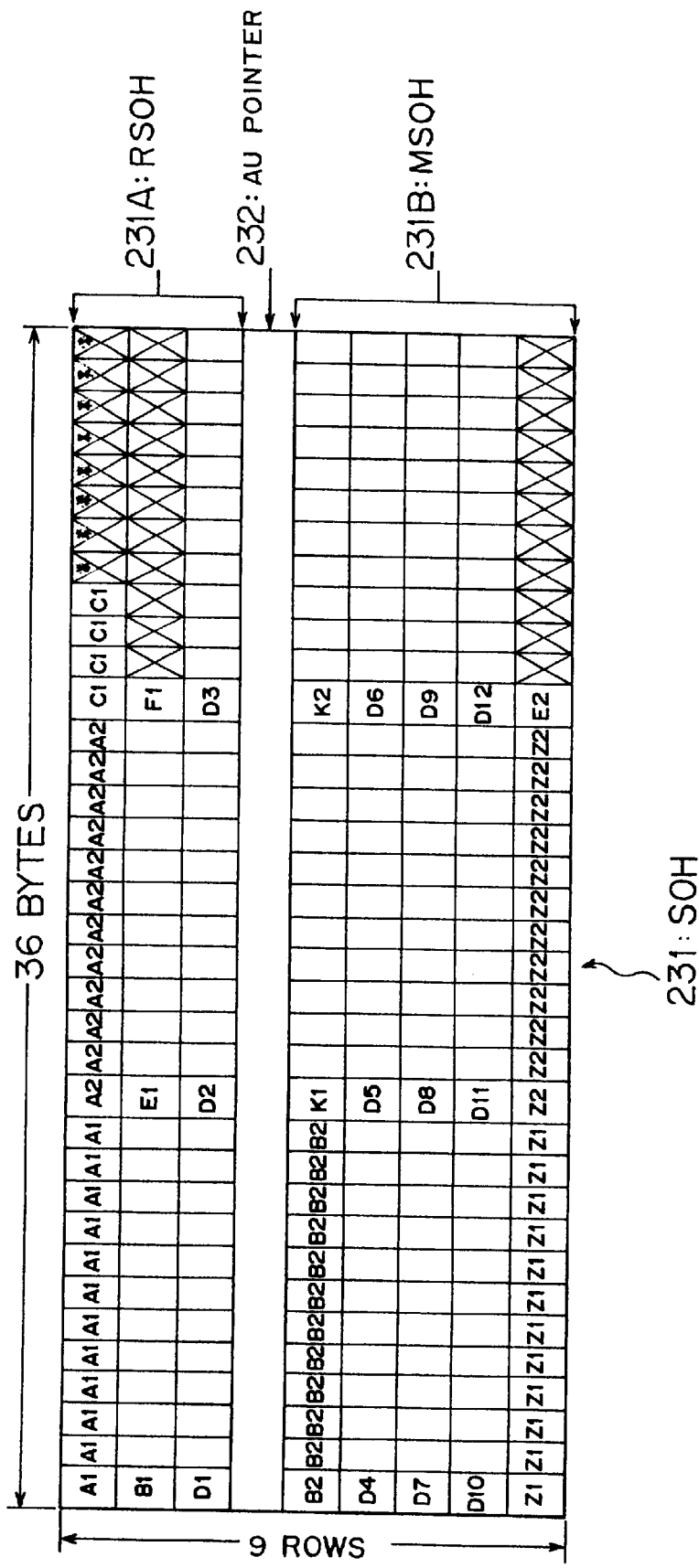
FIG. 43 is a diagram showing a format of STM-4 section overhead.

As mentioned for FIG. 42 and FIG. 43, in the SDH/SONET system multiplex signal, basic frame format signal (STM-1/STS-1) containing A1, A2 byte for frame synchronous pattern detection is byte multiplexed and when multiplex factor is n, the A1, A2 byte are multiplied also by n.

Figure 4:
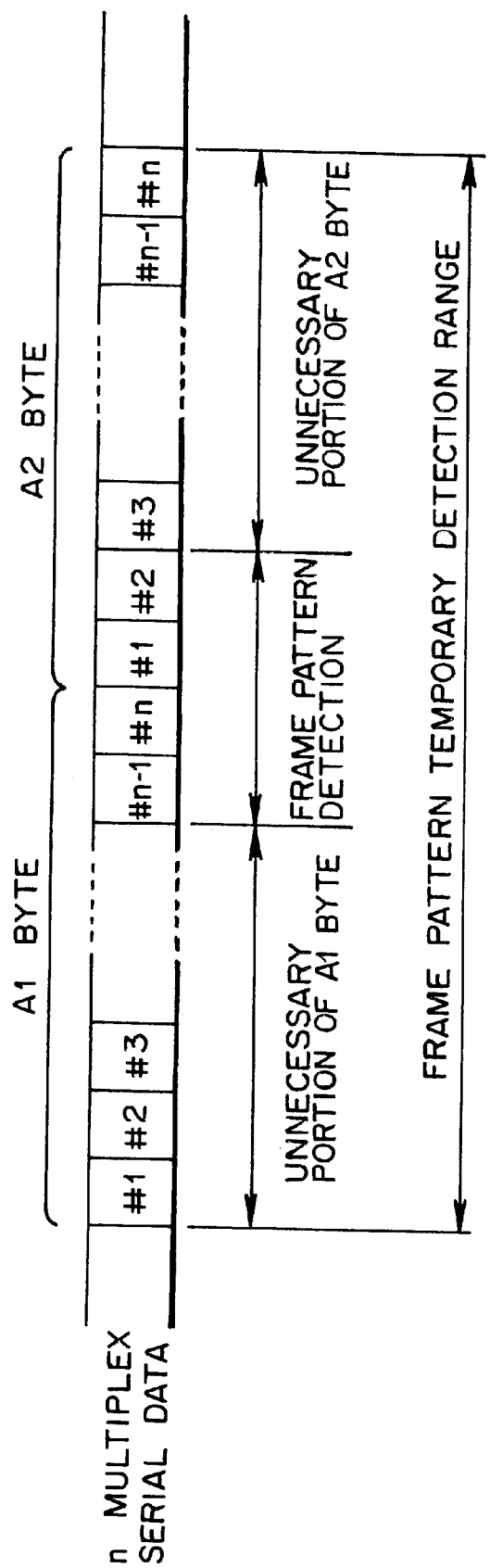
FIG. 4 is a schematic diagram illustrating a concept of frame synchronous pattern detection in the present embodiment.

However, as shown in FIG. 4 for instance, ordinarily, the actual frame synchronous pattern to be detected corresponds to several bytes at the boundary of the A1, A2 byte in n multiplexed serial data, so only several bytes among the n×A1, A2 bytes are actually used for the detection and the remaining bytes are useless.

Given this condition, the frame synchronous pattern detection may be performed by only one apparatus (circuit) to the m parallel data by recognizing (detecting) temporarily possible position of the actual frame synchronous pattern using bytes becoming useless and by detecting the actual frame synchronous pattern from a given region data containing that position, in place of directly detecting the actual frame pattern among the parallel data (detecting if all input parallel data corresponds with the given bit pattern comprising the A1, A2 byte).

Therefore, the detection apparatus 14 comprises, as shown in FIG. 3, a temporary frame synchronous pattern detection (Pre FDET) section 15 and a frame synchronous pattern (FDET) detection section 16.

Here, the temporary frame synchronous pattern detection section (temporary region detection section) 15 detects temporarily the candidate region data which may contain the frame synchronous pattern from the m parallel data and serializes such temporary region data, while the frame synchronous pattern detection section 16 detects the actual frame synchronous pattern from the temporary region data of this temporary frame synchronous pattern detection section 15.

Moreover, the byte switch control section (data switch control section) 19 controls the slot rearrangement processing in the byte switch section 13 in accordance with the detection state of the temporary region data in the temporary frame synchronous pattern detection section 15 and the detection state of the frame synchronous pattern in the frame synchronous pattern detection section 16 and, in the present embodiment, as mentioned below, this slot rearrangement processing is performed in response to a bit shift amount corresponding to the period of time from the detection of the temporary region data to the detection of the actual frame synchronous pattern.

In the frame synchronous pattern processing apparatus 11 (frame synchronous pattern detection method) of the present embodiment composed as mentioned above, first, the candidate region which may contain the frame synchronous pattern (A1 and A2 bytes) is detected temporarily from the parallel data in the temporary frame synchronous pattern detection section 15 and then the actual frame synchronous pattern is detected from the temporary region in the frame synchronous pattern detection section 16.

Thus, in the frame synchronous pattern detection section 16, frame synchronous pattern in a parallel data may be detected by only one circuit independent of the parallel factor m of the parallel data (without enabling the detection of m ways of frame synchronous patterns in the m parallel data) and, as the consequence, the frame synchronous pattern detection signal will be reduced to one in respect of the m parallel data as mentioned above so as to simplify the control of the frame counter 17 and the synchronization protection section 18.

Now, the detail of the temporary frame synchronous pattern detection section 15, the frame synchronous pattern detection section 16 and the byte switch control section 19, as much essential parts of the present embodiment will be described.

(b-2) Detailed Description of the Temporary Frame Synchronous Pattern 15

Figure 5:
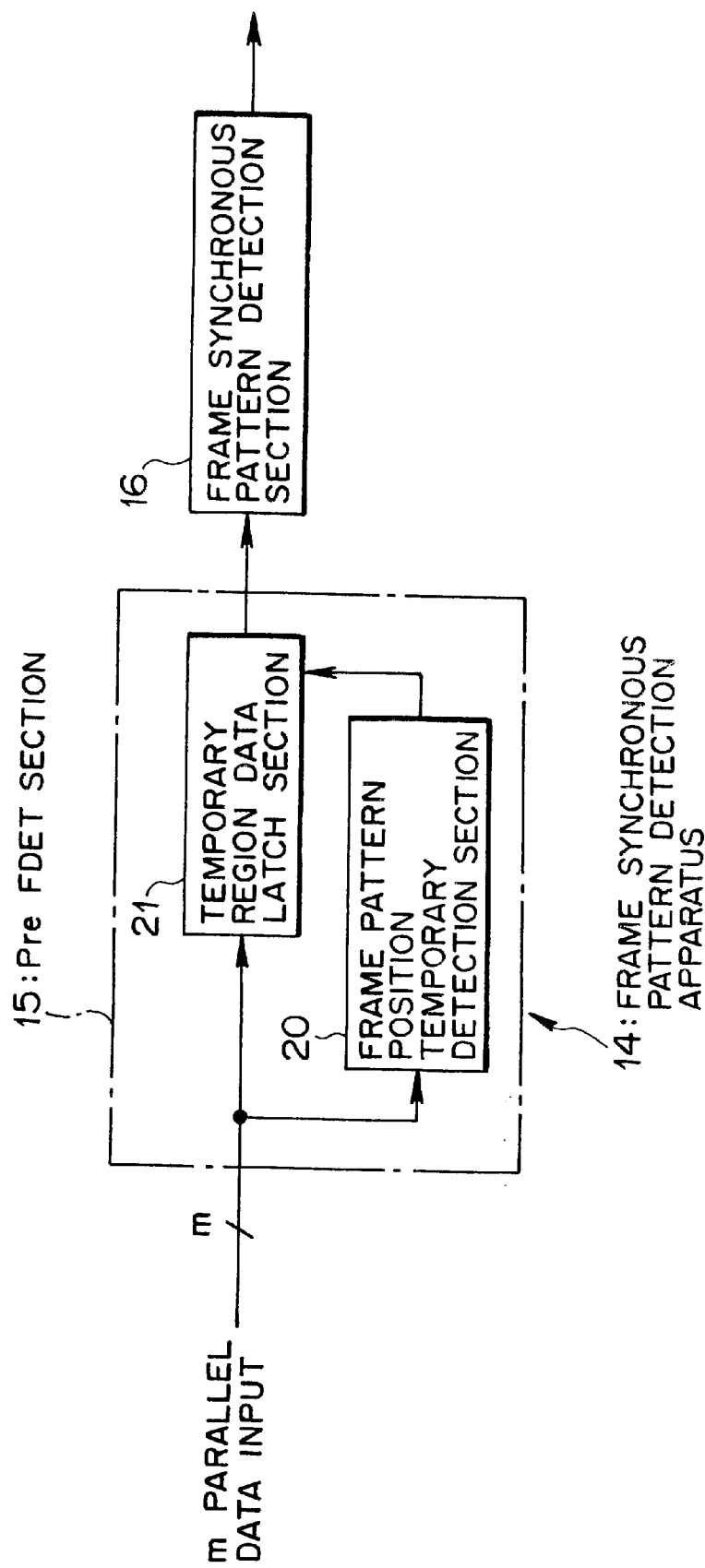
FIG. 5 is a block diagram showing a composition of a temporary frame synchronous pattern detection section of the present embodiment.

FIG. 5 is a block diagram showing a composition of the frame synchronous pattern detection section 15. As shown in this FIG. 5, the frame synchronous pattern detection section 15 of the present embodiment comprises a frame pattern position temporary detection section 20 and a temporary region data latch section 21.

Figure 7:
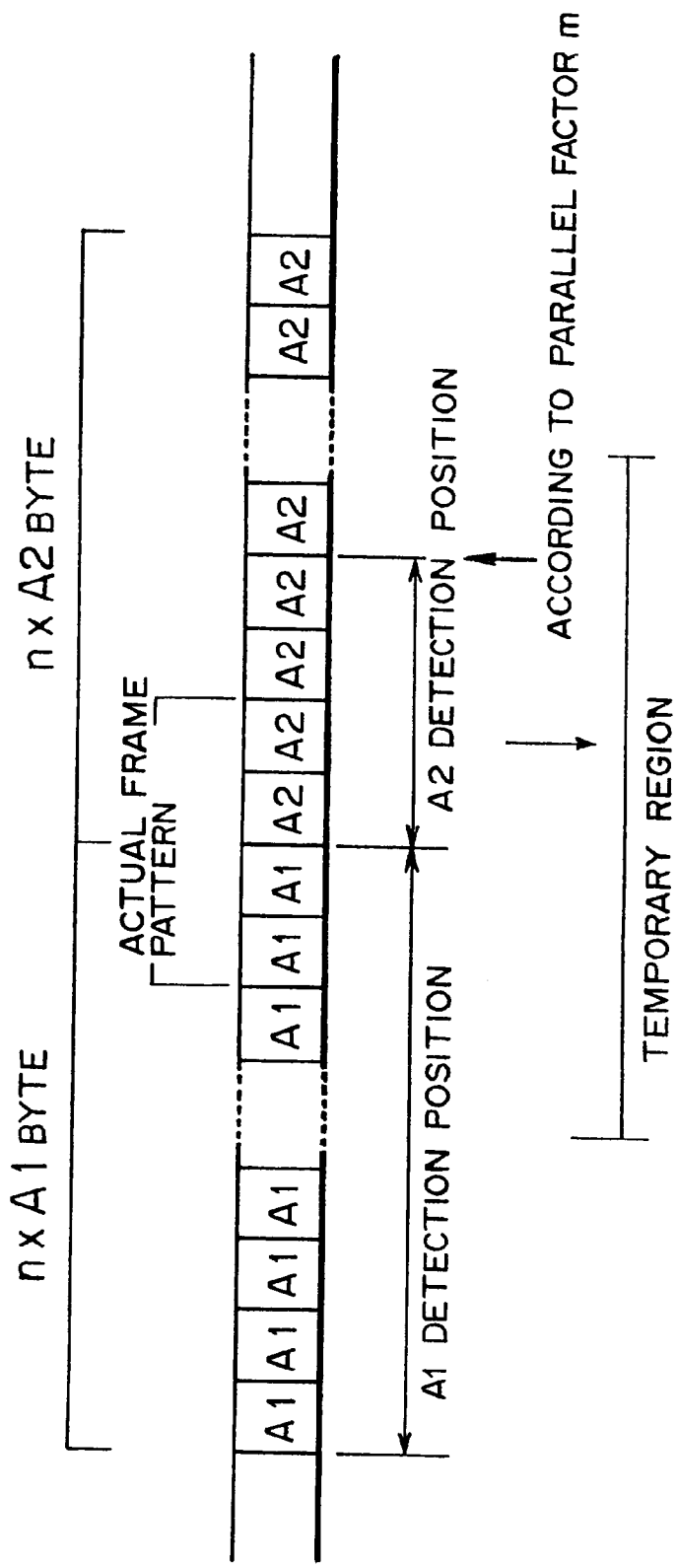
FIG. 7 and FIG. 8 are diagrams illustrating respectively an operation of the frame pattern position temporary detection section of the present embodiment.

Here, the frame pattern position temporary detection section (temporary position information detection section) 20 detects the temporary position information (for example, the position of the A2 byte detected after the detection of the A1 byte in the present embodiment) in the parallel data of an actual frame synchronous pattern (for example, 4 bytes including the boundary between the A1 and A2 byte as shown in FIG. 7).

On the other hand, the temporary region data latch section (temporary region data hold section) 21 is designed to output serially all the way sequentially holding as the temporary position data a given region (temporary region of several bytes before and after including the temporary position: refer to FIG. 7) having as reference position the temporary position information detected in this frame pattern position temporary detection section 20.

Figure 6:
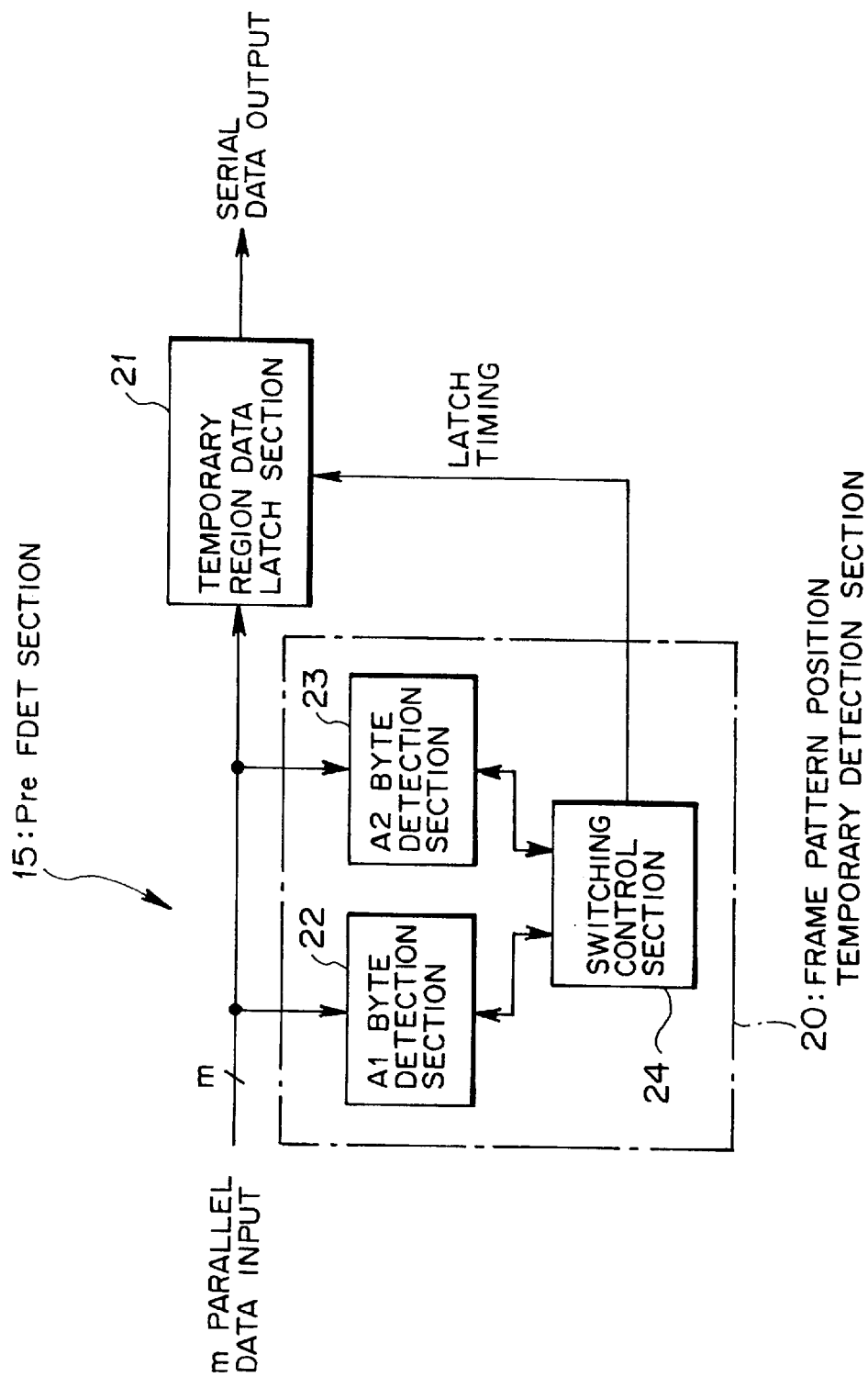
FIG. 6 is a block diagram showing the composition of a frame pattern position temporary detection section of the present embodiment.

For this, the frame pattern position temporary detection section 20 further comprises, as shown in FIG. 6, the A1 byte detection section 22 for detecting the A1 byte from the parallel data, the A2 byte detection section 23 for detecting the A2 byte from the parallel data and a switching control section 24 for switching the detection operation of these A1 byte detection section 22 and the A2 byte detection section 23 according to the detection timing of the A1 byte/A2 byte.

Moreover, in this frame pattern position temporary detection section 20, when the A2 byte is detected by the A2 byte detection section 23 after the detection of the A1 byte in the A1 byte detection section 22 by the switching operation of the switching control section 24, the detection position of such A2 byte is supplied to the temporary region data latch section 21 as the temporary position information by a latch timing signal.

Consequently, in the frame pattern position temporary detection section 20, first, any A1 byte among continuous n bytes is detected from all input parallel data by the A1 byte detection section 22, then, any A2 byte among continuous n bytes is detected by the A2 byte detection section 23 on the switching operation of the switching control section 24.

Here, the A1 byte detected first by the A1 byte detection section 22 cannot be identified where it was detected in n×A1 byte while the A2 byte detected next in the A2 byte detection section 23 can be identified being at the position proximal to the leading head of n×A2 byte. Therefore, the actual frame pattern may be identified in several bytes around the position of the A2 byte detected after the detection of the A1 byte.

So, when the A2 byte is detected by the A2 byte detection section 23 after the detection of the A1 byte by the A1 byte detection section 22, the switching operation of the switching control section 24 outputs a latch timing signal as the temporary position information to the temporary region data latch section 21. The detail of this switching control section 24 will be described below. Then, the temporary region data latch section 21, as mentioned below, holds the given region (for example, the region of several byte before and after) taking the detected A2 byte as reference position by sequentially latching (shifting) parallel data with such latch timing.

In other words, when the A2 byte is detected after the detection of the A1 byte, this frame pattern position temporary detection section 20 supposes that several bytes before and after taking this A2 byte as reference position includes the frame synchronous pattern comprising the A1 byte/A2 byte (boundary of A1/A2 byte) and makes such region data held by the temporary region data latch section 21.

As the consequence, the data of a region which may contain the actual frame synchronous pattern (several bytes including the boundary between A1 and A2 bytes) may be detected securely so as to improve remarkably the reliability of the frame synchronous pattern detection processing by the frame synchronization detection section 16. Moreover, the frame synchronous pattern detection section 16 may detect effectively and rapidly the frame synchronous pattern comprising the A1 byte and the A2 byte.

Figure 8:
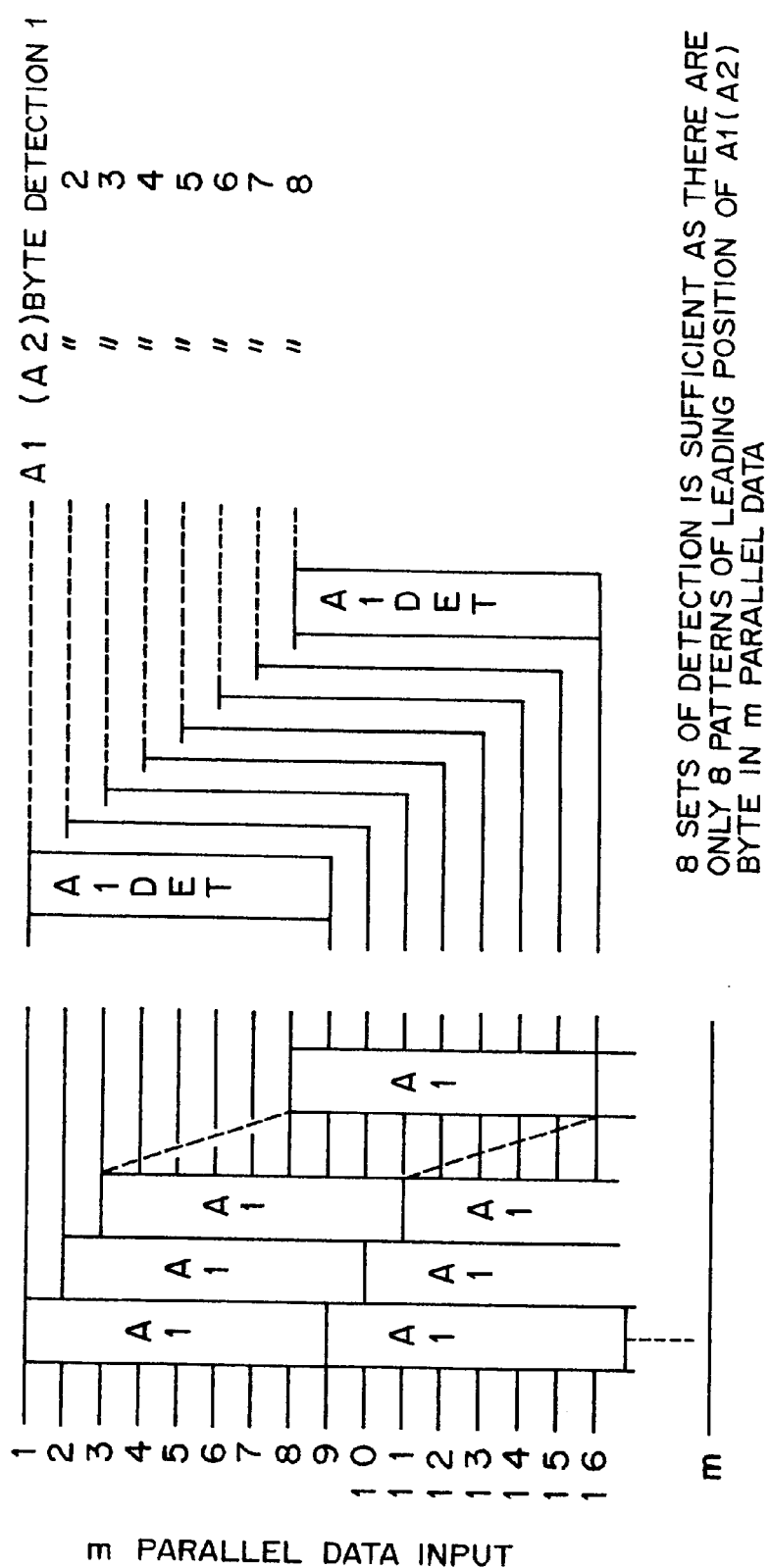

By the way, to detect a certain byte among the m parallel data, the m detection circuits are ordinarily necessary as m ways of leading slot positions may exist in m parallel data; however, in the SDH (or SONET) transmission system, as the A1 and A2 byte continue by n bytes respectively, when the A1 byte (or the A2 byte) is detected, only eight ways of leading slot positions thereof exist as shown in FIG. 8 for example.

Therefore, 8 ways of the detection circuits respectively will be only enough as the detection circuit for 1 byte (8 bits) is required, respectively, for the A1 byte detection section 22 and the A2 byte detection section 23.

Figure 9:
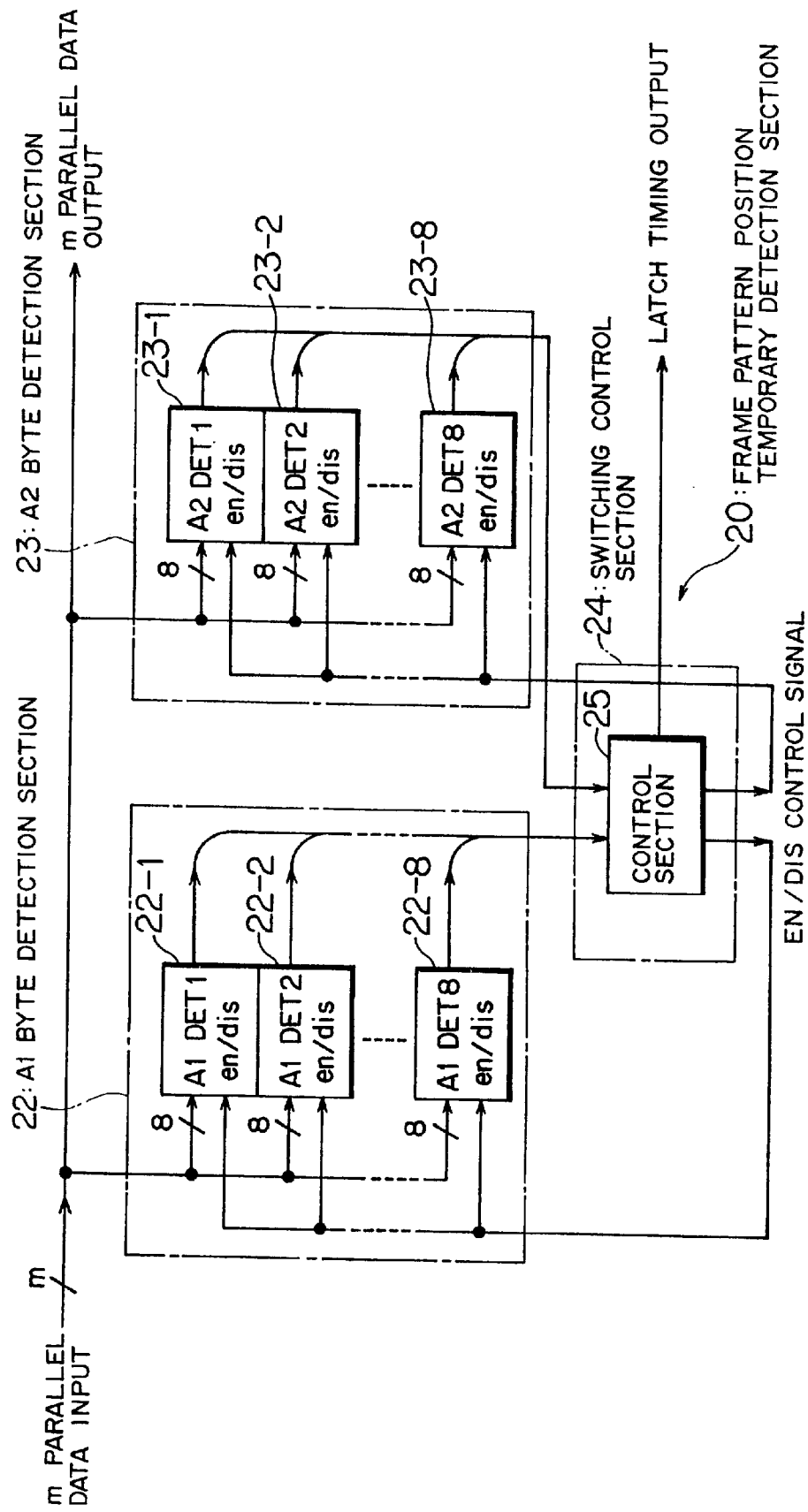
FIG. 9 is a block diagram showing a detailed composition of the frame pattern position temporary detection section of the present embodiment.

As the consequence, as shown in FIG. 9 for example, the A1 byte detection section 22 comprises the A1 byte detection sections (A1 DET1 to 8)22-1 to 22-8 corresponding to 8 ways of A1 byte leading positions which may exist in the parallel data and composed to detect one byte of the A1 byte for each A1 byte leading position which may exists in the parallel data and, as the same way, the A2 byte detection section 23 comprises the A2 byte detection sections (A2 DET1 to 8) 23-1 to 23-8 corresponding to 8 ways of A2 byte leading positions which may exist in the parallel data and composed to detect one byte of the A2 byte for each A2 byte leading position which may exist in the parallel data.

The switching control section 24 comprises a control section 25 for achieving the switching operation mentioned above as shown in this FIG. 9.

Here, this control section 25 stops detection operation by the A1 byte detection section 22 and starts the detection operation by the A2 byte detection section 23 when the A1 byte is detected in the A1 byte detection section 22, while stopping the detection operation by the A2 byte detection section 23 and starts the detection operation by the A1 byte detection section 22 when the A2 byte is detected in the A2 byte detection section 23.

Figure 10:
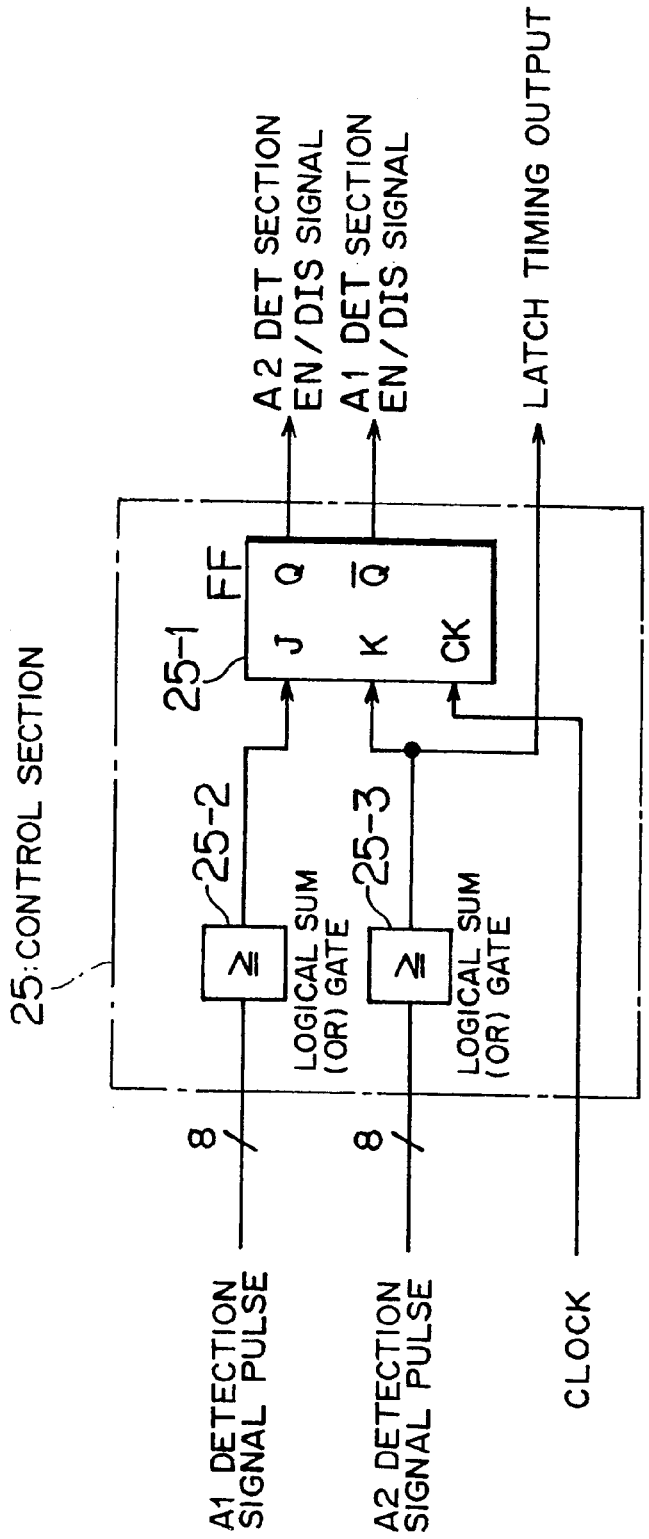
FIG. 10 is a block diagram showing a composition of a control section of the frame pattern position temporary detection section of the present embodiment.

To be more specific, in the present embodiment, this control section 25 is composed using a JK type flip-flop (FF) circuit 25-1 and OR gates (logic sum circuit) 25-2, 25-3 as shown in FIG. 10 such that a K input of the FF circuit 25-1 is supplied to the temporary region data latch section 21 as a latch timing signal, a Q output is supplied as enable (EN)/disable signal (DIS) for each A2 byte detection circuit 23-i (in which i=1 to 8) and reversed output of Q output is supplied as enable (EN)/disable signal (DIS) for each A1 byte detection circuit 22-i.

Figure 11:
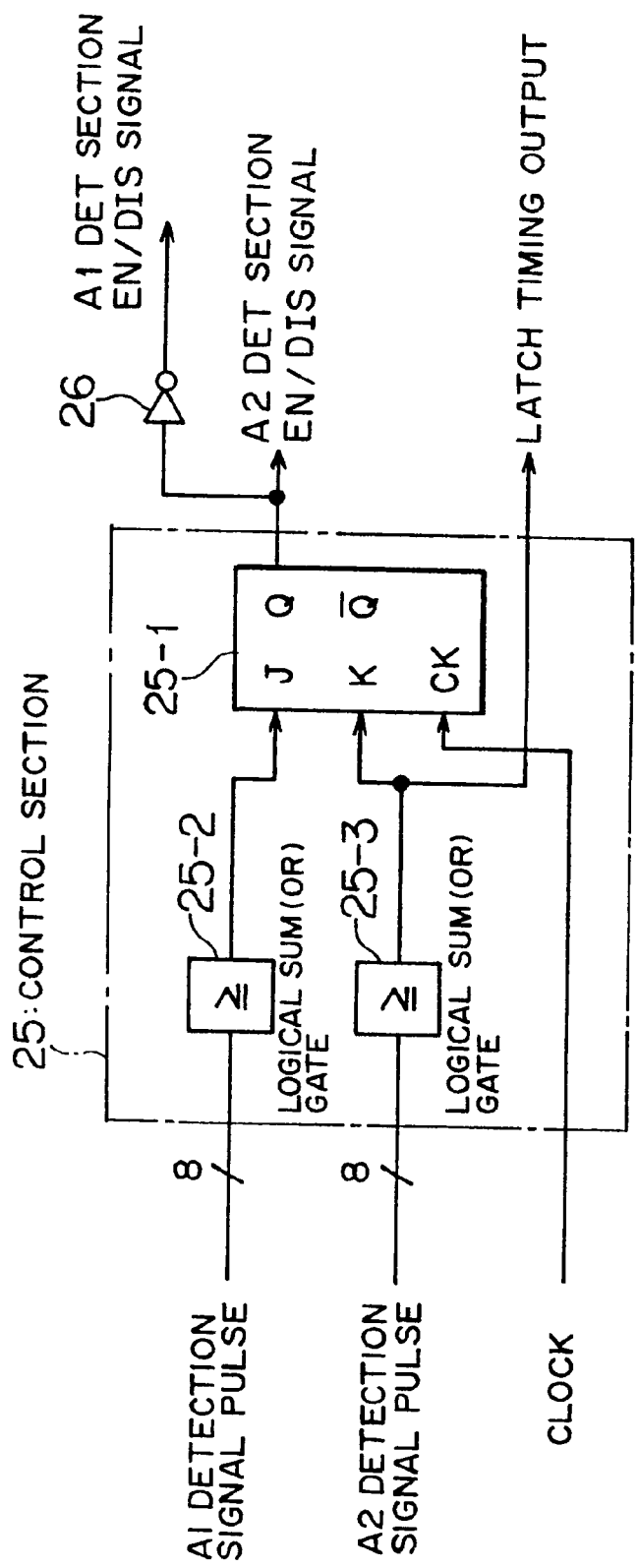
FIG. 11 is a block diagram showing another composition of the control section in the frame pattern position temporary detection section of the present embodiment.

The reversed output Q output for the A1 byte detection circuit 22-i may be taken directly from a Q output reversing terminal of the FF circuit 25-1 as shown in this FIG. 10 or a signal obtained by by reversing Q output of the FF circuit 25-1 by a reversing gate 26 as shown in FIG. 11 for instance.

Figure 13:
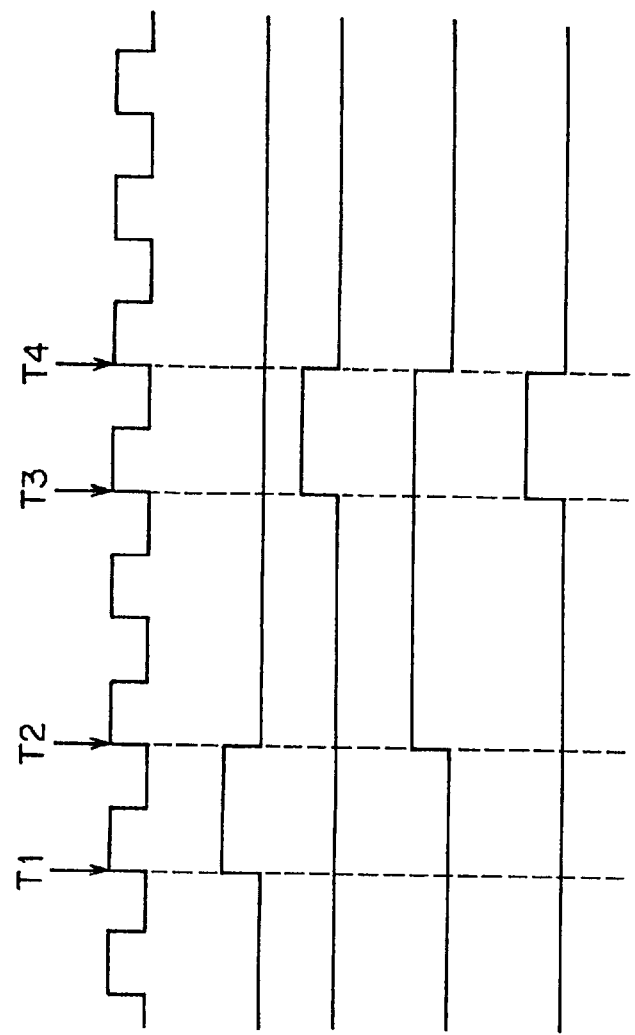
FIG. 13(*a*) to FIG. 13(*e*) are all timing charts illustrating an operation of the control section in the frame pattern position temporary detection section of the present embodiment.

This control section 25 operates according to the clock timing shown in FIG. 13(*a*) for example, alternatively switching the detection operation of A1 byte detection section 22 and A2 byte detection section 23 according to the detection timing of A1 byte /A2 byte.

Namely, on the detection of the A1 byte on one of the A1 byte detection circuits 22-i [refer to the time point T1 in FIG. 13(*b*)], output of the OR gate 25-2 (J input of the FF circuit 25-1) is turned to the H and Q output of the FF circuit 25-1 turns to "H" at the next clock timing [refer to the time point T2 in FIG. 13(*d*)]. As the consequence, A2 control detection circuits 23-i are controlled to enable state (A1 byte detection circuits 22-i are controlled to disable state).

Thereafter, on the detection of the A2 byte on any of the A2 byte detection circuits 23-i [refer to the time point T3 in FIG. 13(*c*)], in this control section 25, output of the OR gate 25-3 (K input of the FF circuit 25-1) is turned to "H" and at the same time the latch timing signal for the temporary region data latch section 21 turns to H [refer to the time point T3 in FIG. 13(*e*)] and Q output of the FF circuit 25-1 turns to L at the next clock timing [refer to the time point T4 in FIG. 13(*d*)]. As the consequence, A1 control detection circuits 22-i are controlled to enable state (A2 byte detection circuits 23-i are controlled to disable state).

Figure 12:
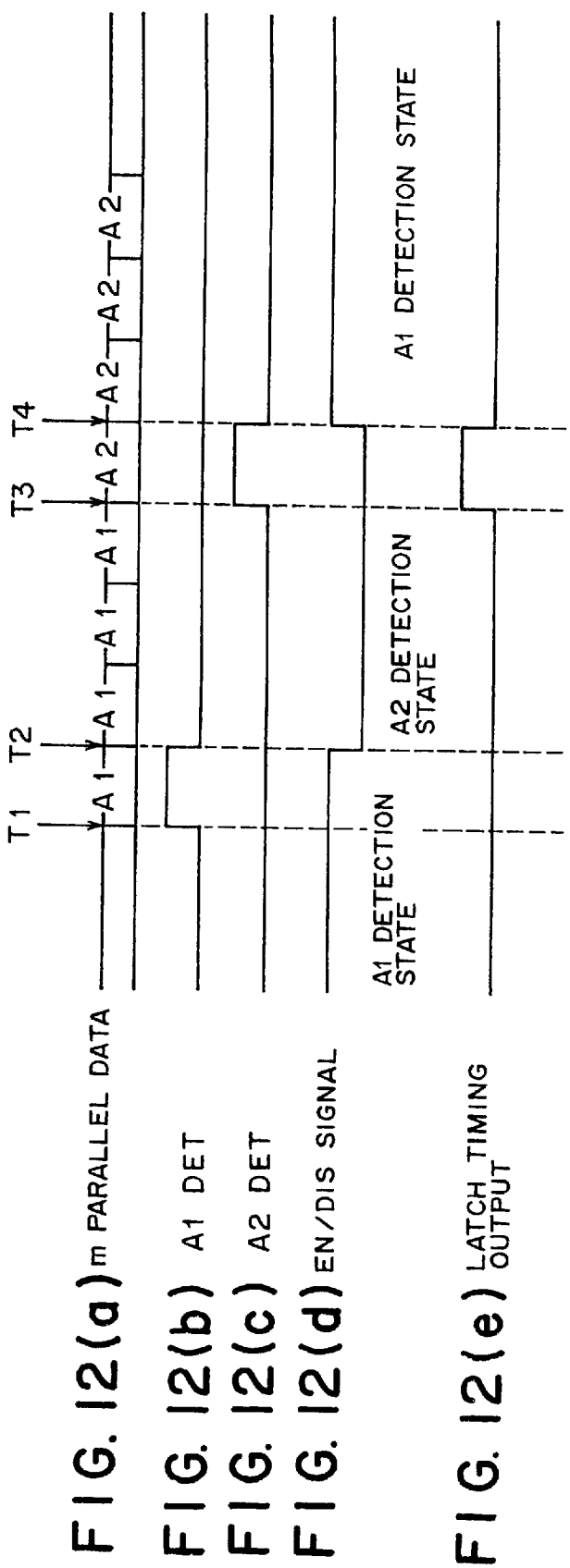
FIG. 12(*a*) to FIG. 12(*e*) are all timing charts illustrating an operation of the frame pattern position temporary detection section of the present embodiment.

In the frame pattern position temporary detection section 20 of the present embodiment composed as mentioned above, first, at the initial state, the control section 25 controls A1 byte detection circuits 22-i to the enable state and A2 byte detection circuits 23-i to the disable state so as to realize the A1 byte detection operation state as shown in FIG. 12(*d*) for example.

In this composition, when parallel data is input at the timing shown in FIG. 12(*a*) for example, first, A1 byte will be detected by one of the A1 byte detection circuits 22-i (refer to the time point T1 in FIG. 12(*b*)) . Then, in the control section 25, as mentioned above, Q output of the FF circuit 25-1 turns to H at the next clock timing (reversed output of Q output being "L" ) so as to disable ("L") the control signal for A1 byte detection circuits 22-i; as the consequence, A1 control detection circuits 22-i are controlled to the disable state and A2 byte detection circuits 23-i are controlled to the enable state (the A2 byte detection operation starting state) [refer to time point T2 in FIG. 12(*d*)].

Thereafter, upon the detection of the A2 byte from the parallel data in one of A2 byte detection circuits 23-i [refer to time point T3 in FIG. 12(*c*)], in the control section 25, K input to the FF circuit 25-1 turns to "H" as mentioned above, the latch timing signal turns to H [refer to time point T3 in FIG. 12(*e*)] and, Q output from FF circuit 25-1 turns to L at the next clock timing [refer to time point T4 in FIG. 12(*d*)].

As the consequence, again, A1 control detection circuits 22-i turn to the enable state (A1 byte detection operation start) and A2 byte detection circuits 23-i are controlled to the disable state (A2 byte detection operation stopped) to return to the initial state.

In the frame pattern position temporary detection section 20 composed as mentioned above, it is sufficient to detect one byte of the A1 byte on any one of the A1 byte detection circuits 22-i for detecting the A1 byte by the A1 byte detection section 22 and to detect one byte of the A2 byte on any one of the A2 byte detection circuits 23-i for detecting the A2 byte by the A2 byte detection section 23, the number of circuit necessary for the detection of A1/A2 byte will be one byte (8 bits) (namely 8 ways) independent of the parallel factor of the parallel data, that is very advantageous for the apparatus size, power consumption, cost and the LSI layout of this processing apparatus 11 (detection apparatus 14).

In the frame pattern position temporary detection section 20 mentioned above, on the detection of the A1 byte by the switching control section 24 (control section 25), it stops the A1 byte detection operation and starts the A2 detection operation, upon the detection of A2 byte, it stops the A2 byte detection operation and starts the A1 detection operation so as to achieve securely the A2 byte detection operation after the detection of the A1 byte permitting to detect the temporary position information (latch timing signal) of the frame synchronous pattern comprising the A1 byte /A2 byte extremely effectively.

Moreover, as the control section 25 is realized using the JK type FF circuit 25-1, its composition is extremely simple contributing to the reduction of size and cost of the apparatus.

(b-2-1) Description of the First Variation of the Frame Pattern Position Temporary Detection Section 20

Figure 14:
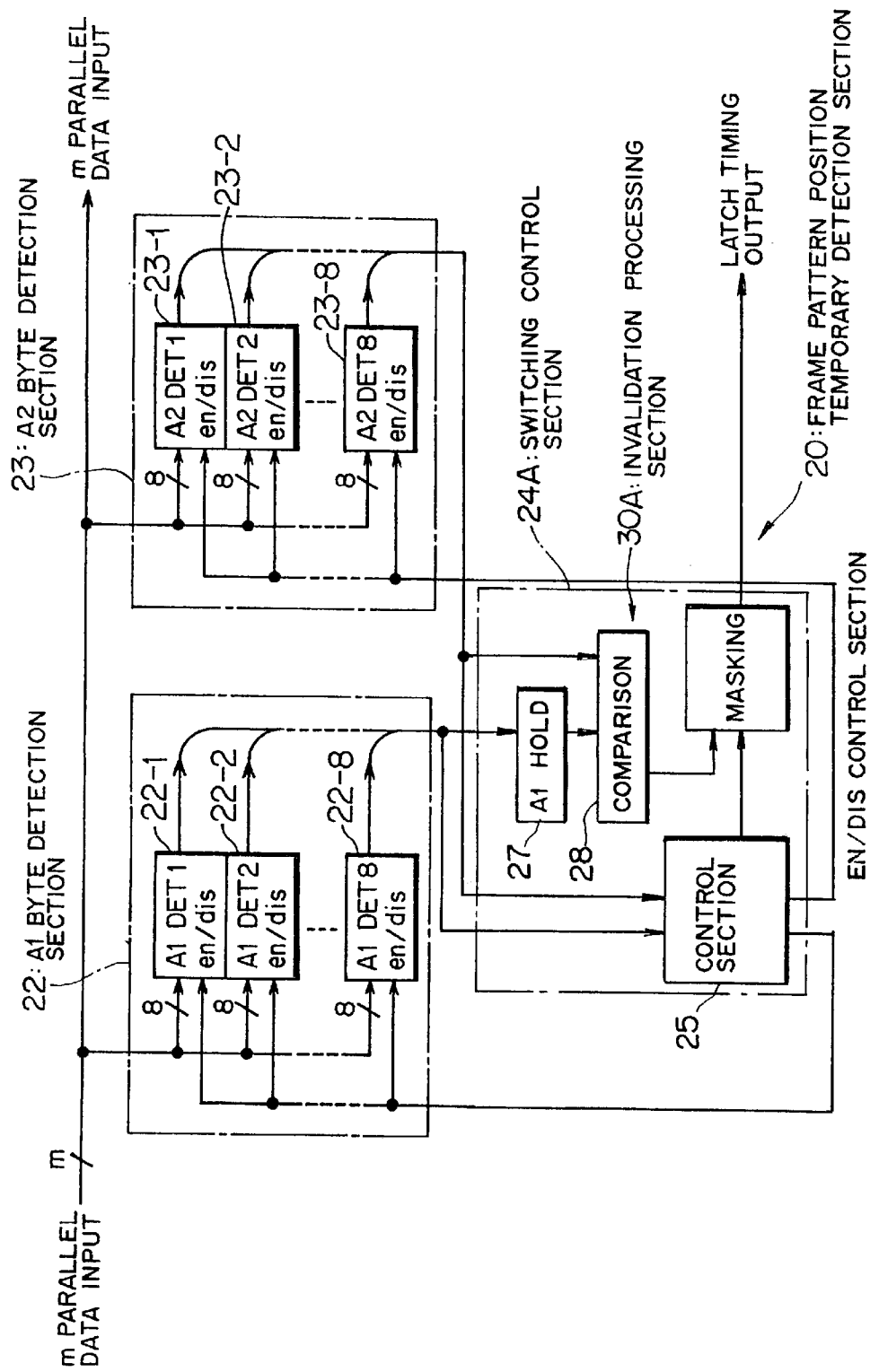
FIG. 14 is a block diagram showing a first variation of the frame pattern position temporary detection section of the present embodiment.

Next, FIG. 14 is a block diagram showing a first variation of the frame pattern position temporary detection section 20. As shown in this FIG. 14, the detection section 20 of this variation is different from that sown in FIG. 9 in that it comprises as the switching control section 24A an inactivation processing section 30A in addition to the detection section 25 (refer to FIG. 10).

Here, the inactivation processing section 30A judges validity/invalidity of the temporary region data to be latched by the temporary region data latch section 21 based on the detection state of the A1 byte in the A1 byte detection section 22 and the detection state of the A2 byte in the A2 byte detection section 23, and if it is determined invalid, executes the invalidation processing for inhibiting the outputting of the latch timing signal (temporary position information) to the temporary region data latch section 21.

Thus, in the switching control section 24A of this variation, the latch timing signal is not supplied to the temporary region data latch section 21 by the invalidation processing section 30A when the temporary region data is invalid and invalid data is not held in the temporary region data latch section 21 so as to provide all the time latch processing and serialization only to the reliable data (region data including the frame synchronous pattern).

Here, validity/invalidity judgment of the temporary region data is made, in this variation, through the determination of agreement/disagreement of the pattern number (slot number:leading position in parallel data) of the A1 byte detected by any one of the A1 byte detection circuits 22-i and the pattern number of the A2 byte detected by any one of the A2 byte detection circuits 23-i.

In other words, on the detection of A1/A2 byte among the m parallel data, usually, m=8 (bits) natural number and the pattern number of the detected A1 byte should basically agree with the pattern number of the A2 byte; therefore, when respective pattern numbers agree, then such temporary region data is judged valid and when respective pattern numbers disagree, then such temporary region data will be judged invalid so as to inhibit further latch processing and serial processing control by the temporary region data latch section 21.

Therefore, the invalidation processing section 30A of this variation comprises, as shown in FIG. 14, an A1 pattern number hold section 27, a comparison section 28 and a masking section 29. The A1 pattern number hold section (A1 byte leading position hold section) 27 holds temporarily the pattern number of the A1 byte upon the detection of the A1 byte by any one of the A1 byte detection circuits 22-i and the comparison section 28 compares the pattern number of the A1 byte held by this A1 pattern number hold section 27 and the pattern number of the A2 byte detected thereafter by any one of A2 byte detection circuits 23-i.

As the result of the comparison by this comparison section 28, if the pattern number of the detected A1 byte and the pattern number of A2 byte are different, the masking section 29 masks the latch timing signal output from the control section 25 to the temporary region data latch section 21 (refer to FIG. 5) for inhibiting supply of the temporary position information serving as latching reference position for the parallel data by the temporary region data latch section 21.

Figure 15:
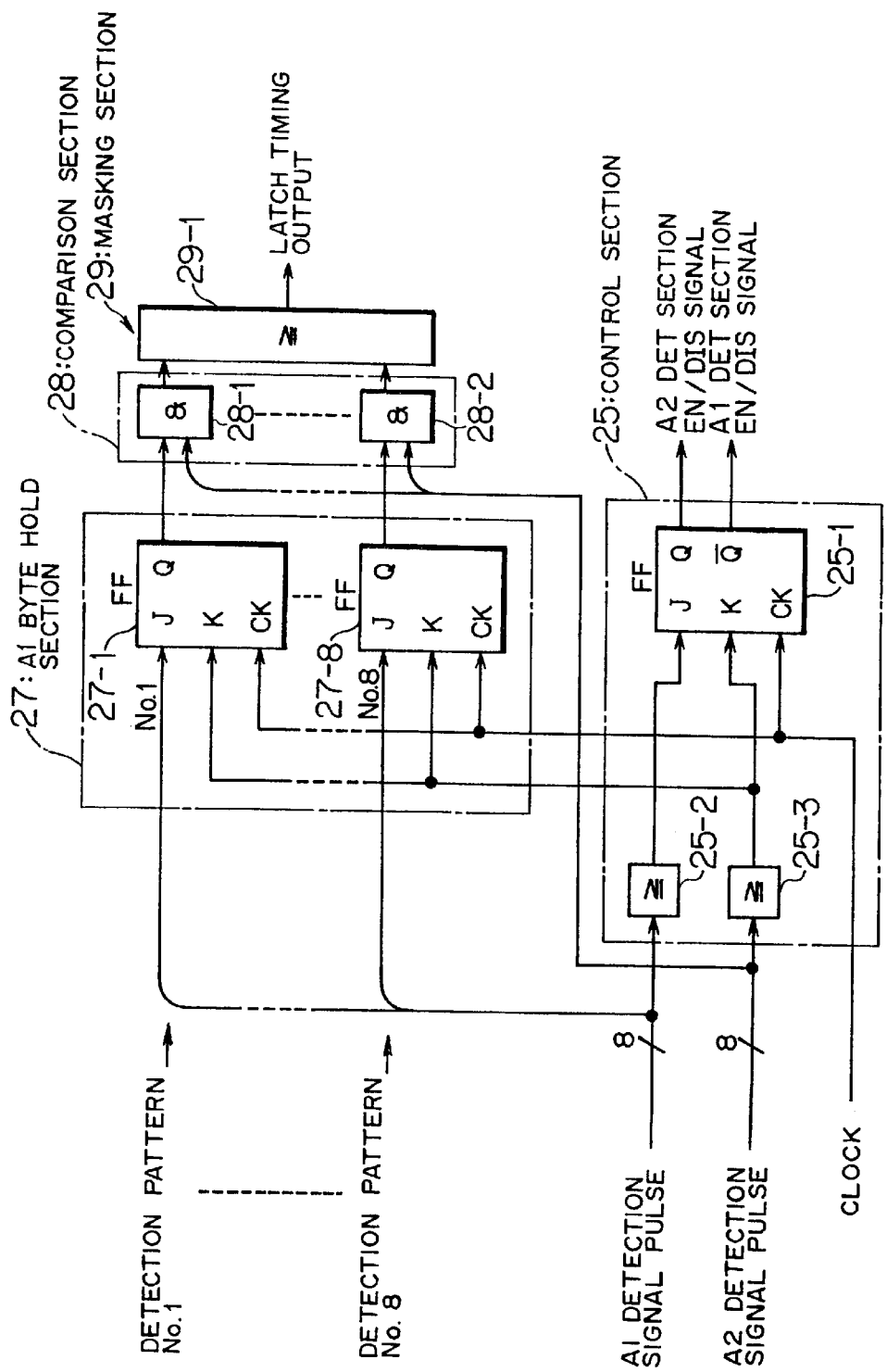
FIG. 15 is a block diagram showing a detailed composition of a changeover control section of the frame pattern position temporary detection section of the first variation.

The A1 pattern number hold section 27, the comparison section 28 and the masking section 29 are composed respectively as shown in FIG. 15. In other words, the A1 pattern number hold section 27 comprises 8 FF circuits 27-1 to 27-8, while the comparison section 28 comprises 8 AND gates (logical product circuit) 28-1 to 28-8 and the masking section 29 comprises 8-input type OR gate 29-1.

In the A1 pattern number hold section 27, the FF circuits 27-i (in which i=1 to 8) holds the pattern number i of the A1 byte upon the detection of the A1 byte by the corresponding A1 byte detection circuits 22-i; for example, upon the detection of the A1 byte by a certain A1 byte detection circuits 22-i, the A1 byte detection signal pulse having the pattern number "i" is input in the J input of the corresponding FF circuits 27-i turning its Q output to H for maintaining the A1 byte detection of the pattern number i.

In the comparison section 28, the AND gates 28-i output H only when Q output (pattern number "i") of the corresponding FF circuits 27-i of the A1 pattern number hold section 27 and the A2 byte detection signal pulse (pattern number "i" of detected A2 byte) input when the A2 byte is detected in the corresponding A2 byte detection circuits 23-i agree (when both become "H").

The OR gate 29-1 outputs "H" pulse to the temporary region data latch section 21 as the latch timing signal for the temporary region data latch section 21 when any one of outputs (8 inputs) from respective AND gate 28-1 of this comparison section 28 become "H".

In the frame pattern position temporary detection section 20 of the present variation composed as mentioned above, in this case too, first, at the initial state, the control section 25 controls A1 byte detection circuits 22-i to the enable state and A2 byte detection circuits 23-i to the disable state so as to realize the A1 byte detection operation state.

When the A1 byte is detected from the m parallel data by one of the A1 byte detection circuits 22-i, the detection pulse thereof (A1 detection signal pulse) is input in the control section 25 and, as mentioned above, A1 control detection circuits 22-i turn to the disable state and respective A2 byte detection circuits 23-i are controlled to the enable state to start the A2 byte detection operation.

At this time, the pattern number of the detected A1 byte is held by the A1 pattern number hold section 27. For instance, when the A1 byte having the pattern number "1" is detected by the A1 byte detection circuit 22-1, only the A1 byte detection signal pulse turns to H [refer to the time point T1 in FIG. 16(b) and FIG. 16(c)] while J input of the FF circuit 27-1 turns to H.

Thereby, in the FF circuit 27-1, Q output turns to H at the next clock timing [refer to the time point T2 in FIG. 16(a)] [Q outputs in other FF circuits 27-2 to 27-8 are all L:refer to the time point T2 in FIG. 16(g)] and the pattern number "1" is held as shown at the time point T2 in FIG. 16(f) enabling output only from the AND gate 28-1 of the comparison section 28.

At the same time, in the control section 25, as mentioned for FIG. 10, Q output of the FF circuit 25-1 being "H" and the reversed output of Q output "L", the control signal for A2 byte detection circuits 23-i turn to "H" (enable state) as shown by the time point T2 in FIG. 16(d) and the control signal for A1 byte detection circuits 22-i turns to "L" (disable state) as shown by the time point T2 in FIG. 16(e) permitting to start the A2 byte detection operation.

Thereafter, upon the detection of the A2 byte having the pattern number "2" by the A2 byte detection section 23-2 as shown, for instance, by the time point T3 in FIG. 16(i), in the control section 25, Q output from the FF circuit 25-1 turns to "L" at the next clock timing [refer to the time point T4 in FIG. 16(a)]and the reversed output of Q output "H", the control signal for respective A2 byte detection circuits 23-i turn to "L" (disable state) as shown by the time point T4 in FIG. 16(d) and the control signal for A1 byte detection circuits 22-i turn to "H" (enable state) as shown by the time point T4 in FIG. 16(e) to return to the initial state (A1 byte detection operation start state).

Then, on the detection of A2 byte, the control section 25 tries to output the latch timing signal to the temporary region data latch section 21; however as the pattern number of the A1 byte then held by the A1 pattern number hold section 27 is "1" which is different from the detected A2 byte pattern number "2", the AND gate 28-1 of the comparison section 28 rests in output enable state and the latch timing signal is not output as shown by the time point T3 in FIG. 16(k).

On the other hand, when the A1 byte having the pattern number "1" is detected in the A1 byte detection circuit 22-1 as shown by the time point T5 in FIG. 16(b), at the next clock timing [refer to the time point T6 in FIG. 16(a)], the detection operation is switched for A1 byte detection circuits 22-i and the A2 byte detection circuits 23-i [refer to the time point T6 in FIG. 16(d) and FIG. 16(e)] before the detection of the A2 byte of the same pattern number "1" by the A2 byte detection circuits 23-i at the time point T7 in FIG. 16(h), respective input for the AND gate 28-1 turns to "H" in the comparison section 28 to output the latch timing signal as shown by the time point T7 in FIG. 16(k).

Figure 16:
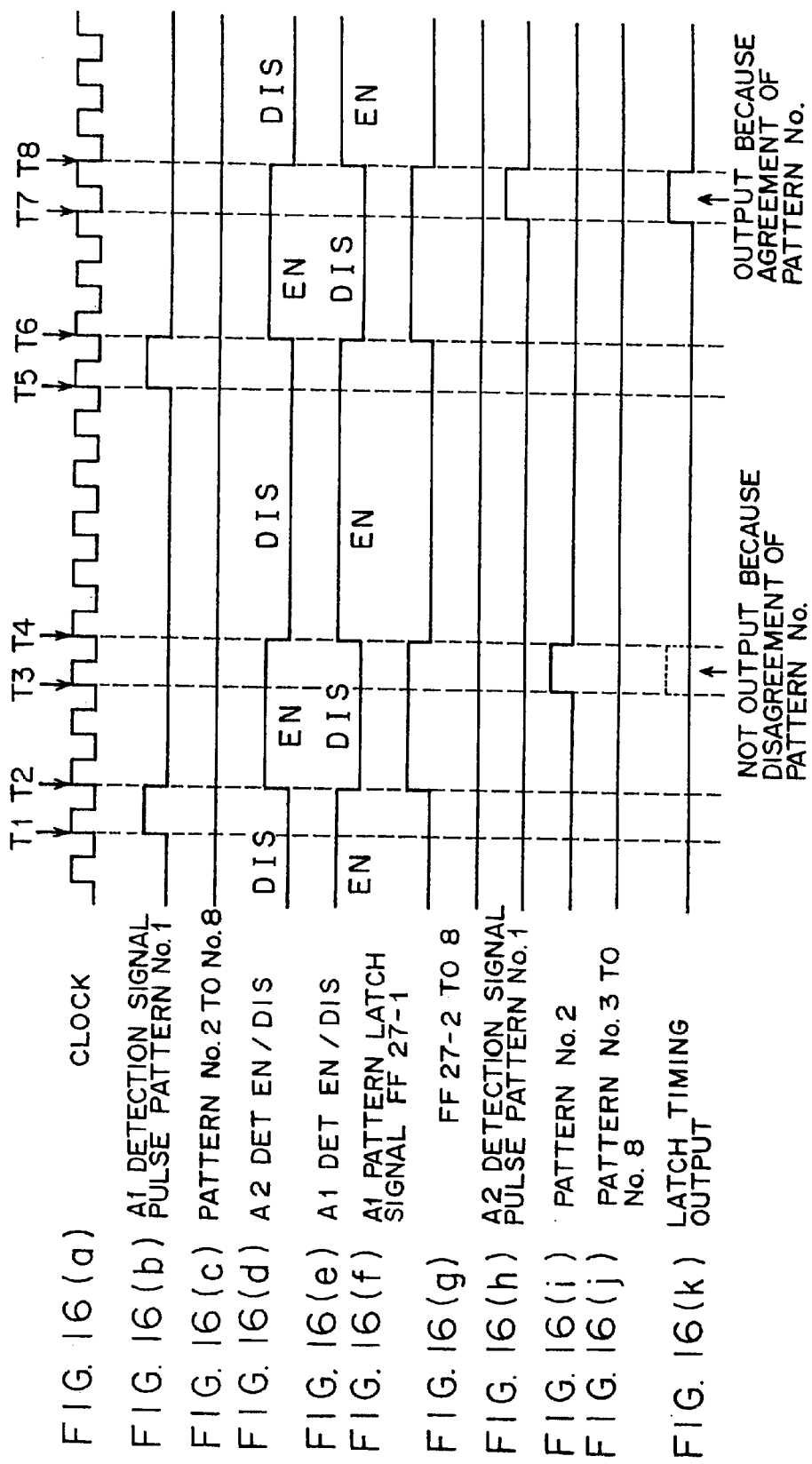
FIG. 16(*a*) to FIG. 16(*k*) are all timing charts illustrating an operation of the frame pattern position temporary detection section of the first variation.

Upon the detection of the A2 byte, in this case also, in the control section 25, at the next clock timing [refer to the time point T8 in FIG. 16(a)] the detection operation of A1 byte detection circuits 22-i and A2 byte detection circuits 23-i are turned again to the initial state (A1 byte detection operation starting state) [refer to the time point T8 in FIG. 16(d) and FIG. 16 (e)].

Thus, in this variation of the frame pattern position temporary detection section 20, when the temporary region data is invalid, the invalidation processing section 30A inhibits the latch processing and serialization of such data in the temporary region data latch section 21 permitting to hold only the reliable data (region data including the frame synchronous pattern) by the temporary region data latch section 21.

Therefore, the following frame synchronous pattern detection section 16 (refer to FIG. 3) may always detect the frame synchronous pattern precisely so as to contribute to the reliability of the present processing apparatus 11 (detection apparatus 14).

To be more specific, only when the pattern number of the detected A1 byte and the pattern number of the detected A2 byte agree and the detection of the A1/A2 byte are detected normally, the temporary region data of that time is held by the temporary region data latch section 21 as valid data so as to detect and hold only the temporary region data of higher reliability.

In this variation, the operation comprises the A1 pattern number hold section 27, the comparison section 28 (and the masking section 29) and when the pattern number of the detected A1 byte and the pattern number of the detected A2 byte are judged different, the temporary region data is judged invalid to mask (invalidation) by the masking section 29 so as to realize a very simple composition.

(b-2-2) Description of the Second Variation of the Frame Pattern Position Temporary Detection Section 20.

Figure 17:
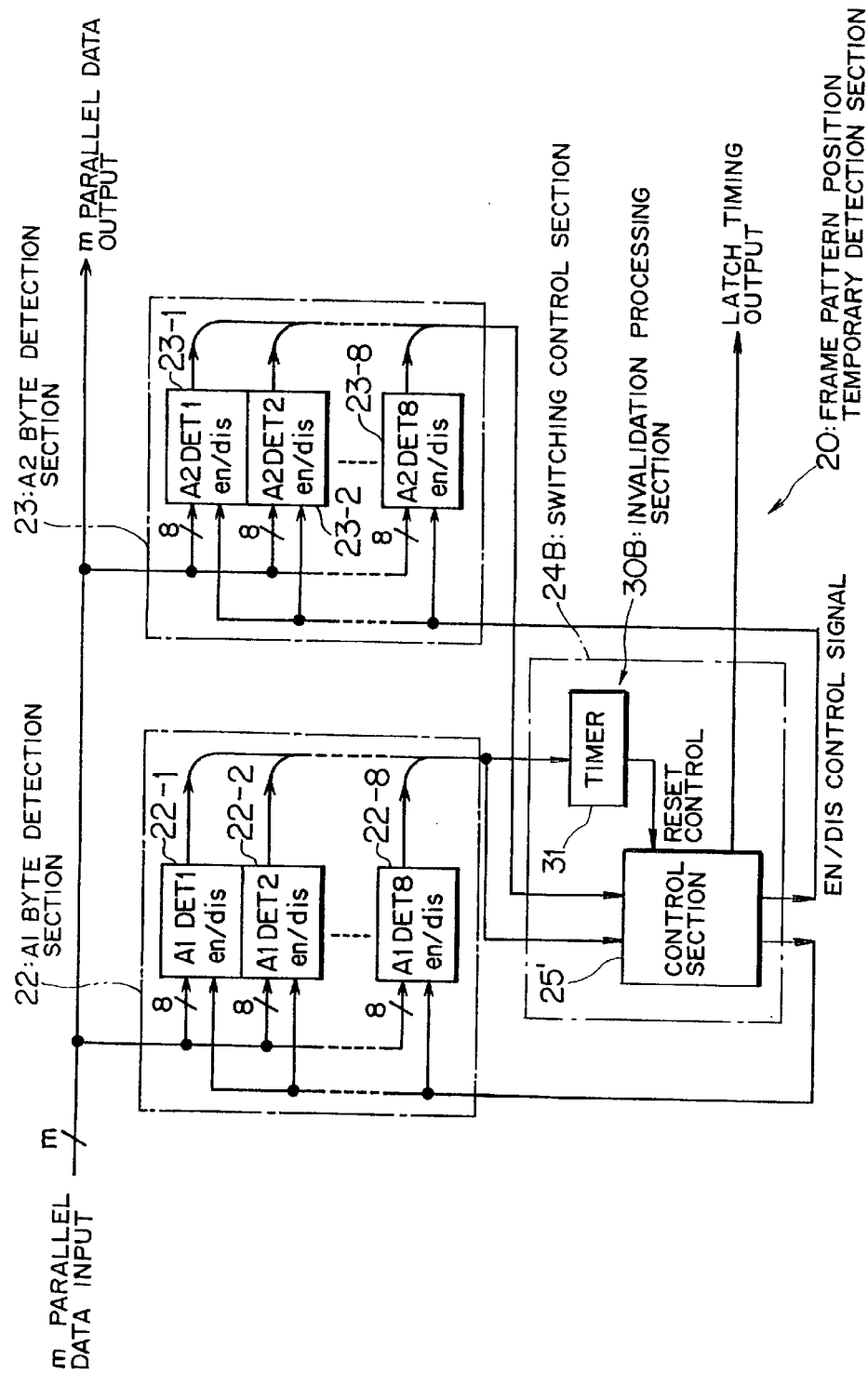
FIG. 17 is a block diagram showing a second variation of the frame pattern position temporary detection section of the present embodiment.

Next, FIG. 17 is a block diagram showing a second variation of the frame pattern position temporary detection section 20. As shown in this FIG. 17, the detection section 20 of this variation is different from that shown in FIG. 9 in that it comprises as the switching control section 24B a control section 25' and a timer 31 for performing the function of an inactivation processing section 30B.

Figure 18:
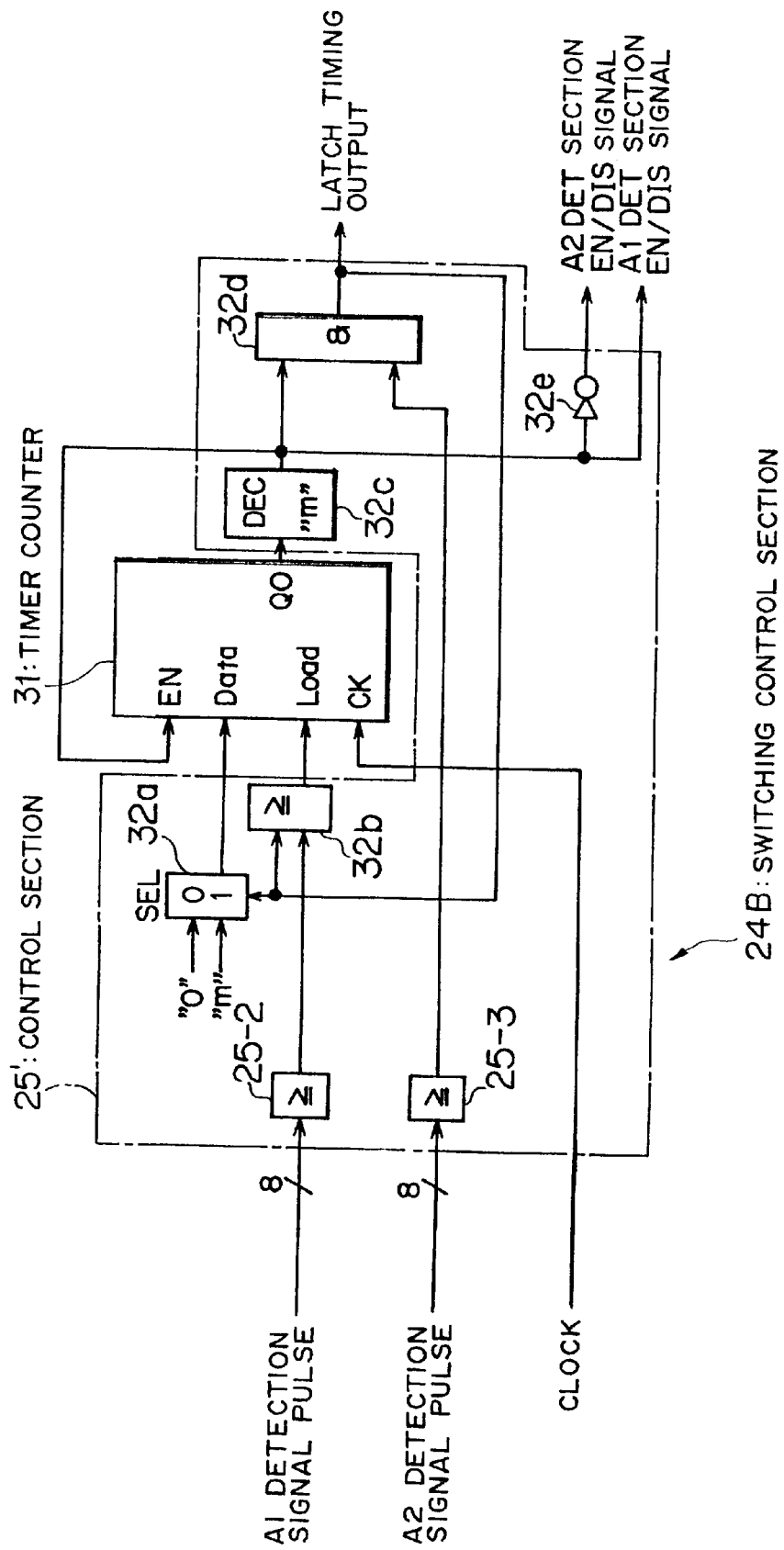
FIG. 18 is a block diagram showing a detailed composition of a changeover control section of the frame pattern position temporary detection section of the second variation.
Figure 19:
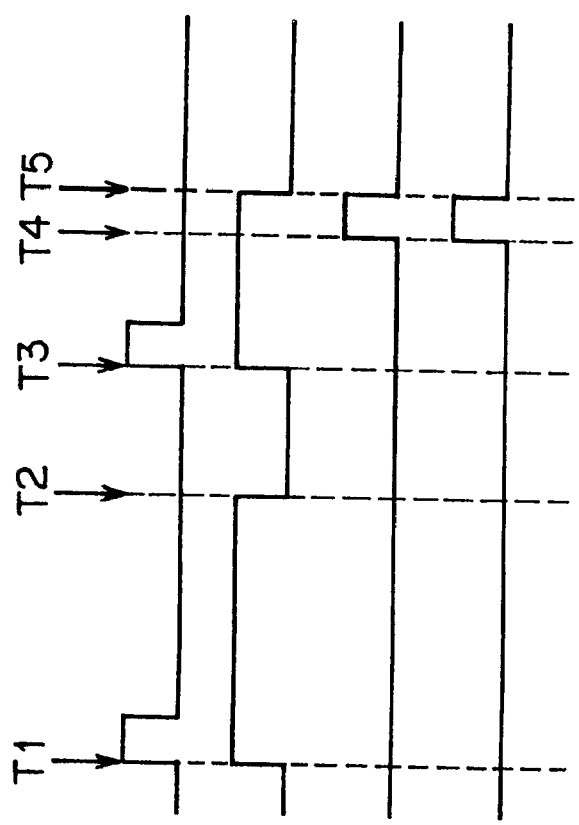
FIG. 19(*a*) to FIG. 19(*d*) are all timing charts illustrating an operation of a timer counter in the changeover control section of the second variation.

Here, the timer 31 is designed to count for a given time upon the detection of the A1 byte in the A1 byte detection section 22, comprises, in the present embodiment, a counter as shown in FIG. 18 for example and turns its Q output to "H" as shown in FIG. 19(b) (refer to the time point T1 and T2), when "H" pulse is input to the load terminal as shown in FIG. 19(a) (refer to the time point T1).

As shown in FIG. 18, the control section 25', in this variation, comprises the OR gate 25-2, 25-3, a selector (SEL) 32a, an the OR gate 32b, a decoder (DEC) 32c, an AND gate 32d and a reversion gate 32e; OR gate 25-2, 25-3 are respectively same as mentioned above for FIG. 10, and the selector 32a selects "0" or "m" as input data (DATA) for the timer counter 31 and, here, the data "m" shall be selected upon the input of the latch timing signal.

The OR gate 32b takes the logical sum of the output of the OR gate 25-2 and the output of the AND gate 32d and output "H" pulse when one of the Al detection signal pulse or the latch timing signal turns to "H", and when this "H" pulse is input to the load terminal of the timer counter 31, the timer counter 31 starts its counting operation.

The decoder 32c is designed to detect that Q output data from the timer counter 31 being "m" by decoding the input data "m" and when "m" is decoded in this decoder 32c, the timer counter 31 will be disabled through the enable (EN) terminal of the timer counter 31 to stop the counting operation.

In other words, when the A2 detection signal pulse is input to the AND gate 32d [refer to the time point T4 in FIG. 19(c)] after the start of counting operation of the timer counter 31 [refer to the time point T3 in FIG. 19(a) and FIG. 19(b)] and the latch timing signal is output from the AND gate 32d [refer to the time point T4 in FIG. 19(d)], this decoder 32c shall stop compulsorily the counting operation of the timer counter 31 at the next clock timing [refer to the time point T5 in FIG. 19(b)].

The AND gate 32d takes the logical sum of the Q output of the timer counter 31 and the output of the OR gate 25-3 and output "H" pulse as the latch timing signal only when the A2 byte is detected while Q output from the timer counter 31 is "H" and the A2 detection signal pulse turns to "H", while the reversion gate 33 reverses Q output of the timer counter 31 and the output of this reversion gate 33 is used, in this variation, as enable/disable signal for A2 byte detection circuits 23-i.

Namely, in the switching control section 24B, as the A2 byte should be detected within a certain byte number after the detection of the A1 byte when a actual frame synchronous pattern is input, based on the relation between the multiplexing factor n of the multiplexed serial data before the parallel conversion and the parallel factor m of the parallel data after the parallel conversion. Therefore, if the A2 byte is not detected within a guard time corresponding to a certain bytes (during the counting operation of the timer counter 31) after the detection of the A1 byte, the detection of the A1 byte is judged invalid and is resumed so as to avoid the erroneous detection of the case when the same bit pattern as the A1 byte exists accidentally in the input data.

In the second variation of the frame pattern position temporary detection section 20 composed as mentioned above, in this case also, first, at the initial state, the control section 25' controls A1 byte detection circuits 22-i to the enable state and A2 byte detection circuits 23-i to the disable state so as to realize the A1 byte detection operation state.

When A1 the byte is detected from the m parallel data shown, for instance, in FIG. 20(a), by one of respective A1 byte detection circuit 22-i, the A1 detection signal pulse (1 bit among 8 bits) turns to "H" [refer to the time point T1 in FIG. 20(b)] so as to turn the output from the OR gate 25-2 (load input of the timer counter 31) to "H".

Figure 20:
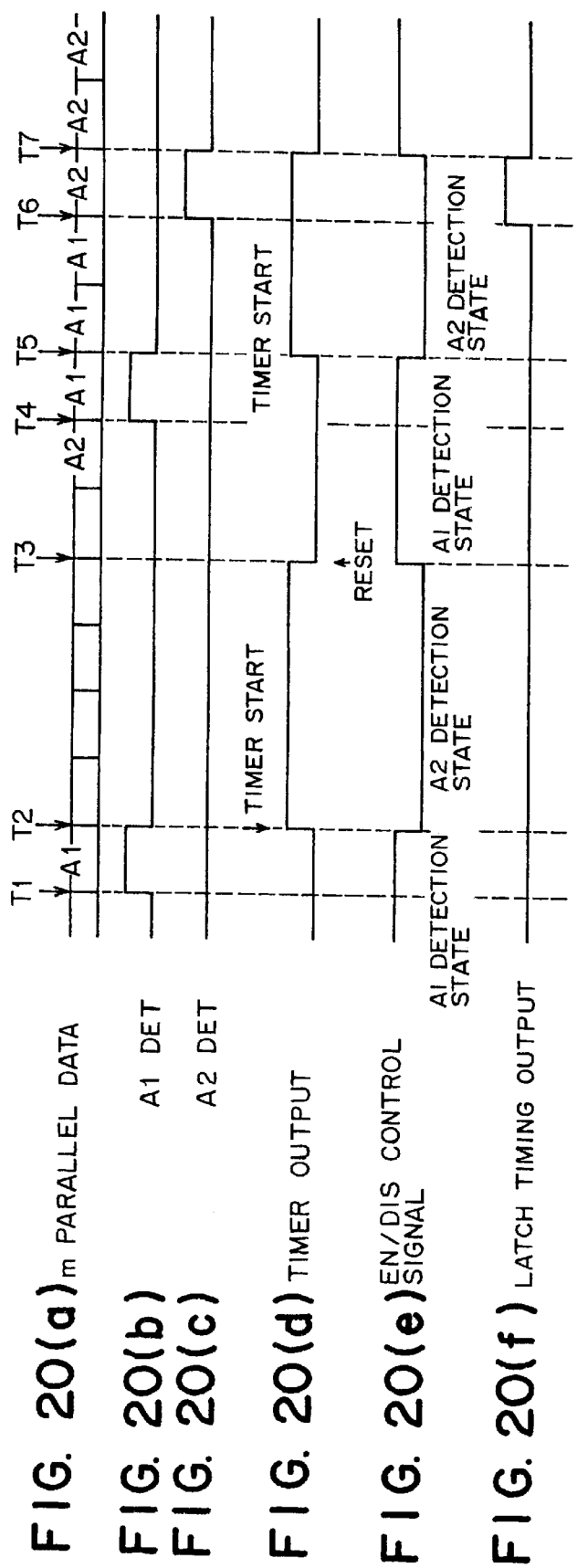
FIG. 20(*a*) to FIG. 20(*f*) are all timing charts illustrating the operation of the frame pattern position temporary detection section of the second variation.

Then, as shown by the time point T2 in FIG. 20 (d), the timer counter 31 turns its Q output to "H" as the next clock timing for starting the counting operation and, at the same time, as shown by the time point T2 in FIG. 20(e), controls A1 byte detection circuits 22-i to the disable state and A2 byte detection circuits 23-i to the enable state to initiate the A2 byte detection operation.

If the A2 byte is not detected by any of A2 byte detection circuits 23-i before the timer reset when Q output from the time counter 31 is turned to "L" as shown by the time point T3 in FIG. 20(d), Q output from the timer counter 31 is turned to "L" so as to control A1 byte detection circuits 22-i to the enable state and A2 byte detection circuits 23-i to disable state to return again to the A1 byte detection operation starting state.

At this time, as both Q output of the timer counter 31 and the output of the OR gate 25-3 are "L", the output of the AND gate 32 remains "L" and the latch timing signal is not output as shown by the time point T3 in FIG. 20(f).

Thereafter, again, if the A1 byte is detected in any of A1 byte detection circuits 22-i as shown by the time point T4 in FIG. 20(a), the A1 detection signal pulse turns to "H" as shown by the time point T4 in FIG. 20(b), Q output is turned to "H" at the next clock timing to start the counting operation [refer to the time point T5 in FIG. 20(d)].

In this case also, upon the detection of the A1 byte, using the Q output of the timer counter 31, the control section 25' controls A1 byte detection circuits 22-i to the disable state and A2 byte detection circuits 23-i to the enable state to initiate the A2 byte detection operation by the A2 detection section 23 [refer to the time point T5 in FIG. 20(e)].

When the A2 byte is detected by any of A2 byte detection circuits 23-i and A2 detection signal pulse turns to "H" during the counting operation of the timer counter 32 (while Q output is "H") as shown by the time point T6 in FIG. 20(a) and FIG. 20(d), output from the AND gate 32 is turned to "H" to output a latch timing signal as shown by the time point T6 in FIG. 20(f).

Upon this latch timing signal, the timer counter 31 integrates data m through the selector 32a and outputs data "m" as Q output. Then, the decoder 32c decodes this "m" data and the counting operation of the timer counter 31 is compulsorily stopped and, controls A1 byte detection circuits 22-i to the enable state and A2 byte detection circuits 23-i to the disable state so as to start again A1 byte detection operation state [refer to the time point T7 in FIG. 20(d) and FIG. 20(e)].

In the second variation of the frame pattern position temporary detection section 20, if the A2 byte is not detected after the guard time of several bytes after the detection of the A1 byte, the output of the latch timing signal is inhibited and such temporary region data at that time is canceled so as to avoid repetitive detection of the same bit pattern as the A1 byte which may accidentally exist in the input data.

Therefore, non detection of the temporary region data for a long time may surely be avoided so as to improve remarkably the reliability of this processing apparatus 11 (detection apparatus 14).

(b-2-3) Description of a Third Variation of the Frame Pattern Position Temporary Detection Section 20

Figure 21:
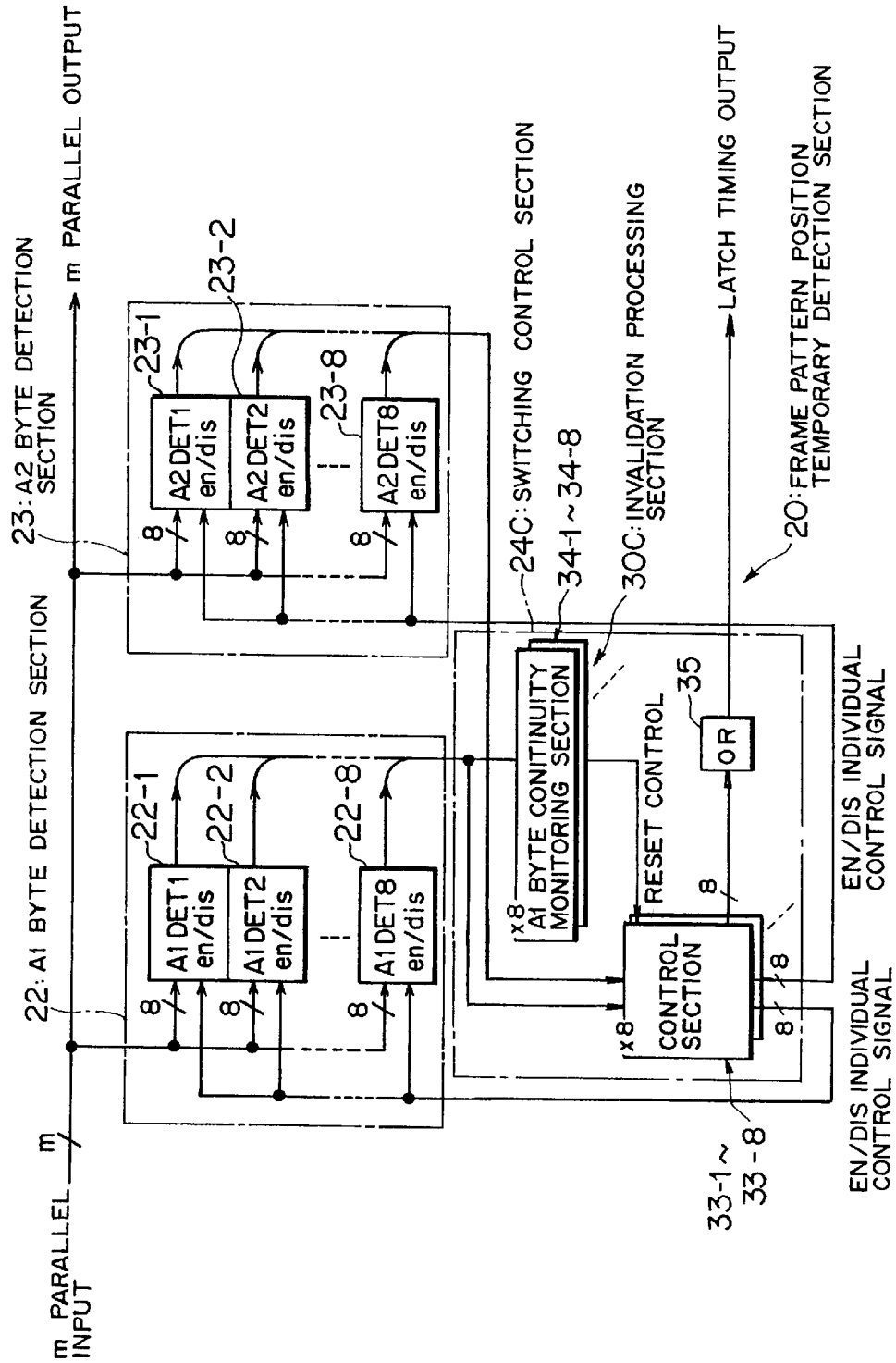
FIG. 21 is a block diagram showing a third variation of the frame pattern position temporary detection section of the present embodiment.

Next, FIG. 21 is a block diagram showing a third variation of the frame pattern position temporary detection section 20. As shown in this FIG. 21, the detection section 20 of this variation is different from the that shown in FIG. 9 in that it comprises as the switching control section 24C control sections 33-1 to 33-8, the A1 byte continuity monitoring sections 34-1 to 34-8 and an 8-input type OR gate 35.

The A1 byte continuity monitoring sections 34-i (in which i=1 to 8) monitor if the A1 byte is detected successively by the A1 byte detection section 22, and the control sections 33-i inhibit the output of the latch signal and controls (resets) the detection operation to the initial state (the A1 byte detection section 22 enabled and the A2 byte section 23 disabled) when the A2 byte is not detected by the A2 byte detection section 23 while the continuity of the A1 byte is not confirmed by this A1 byte continuity monitoring sections 34-i.

The OR gate 55 outputs to the temporary regions data latch section 21 "H" pulse as the latch timing signal, which is output upon the confirmation of the normal detection of the A2 byte after the detection of the A1 byte by any one of the control sections 33-i.

Figure 22:
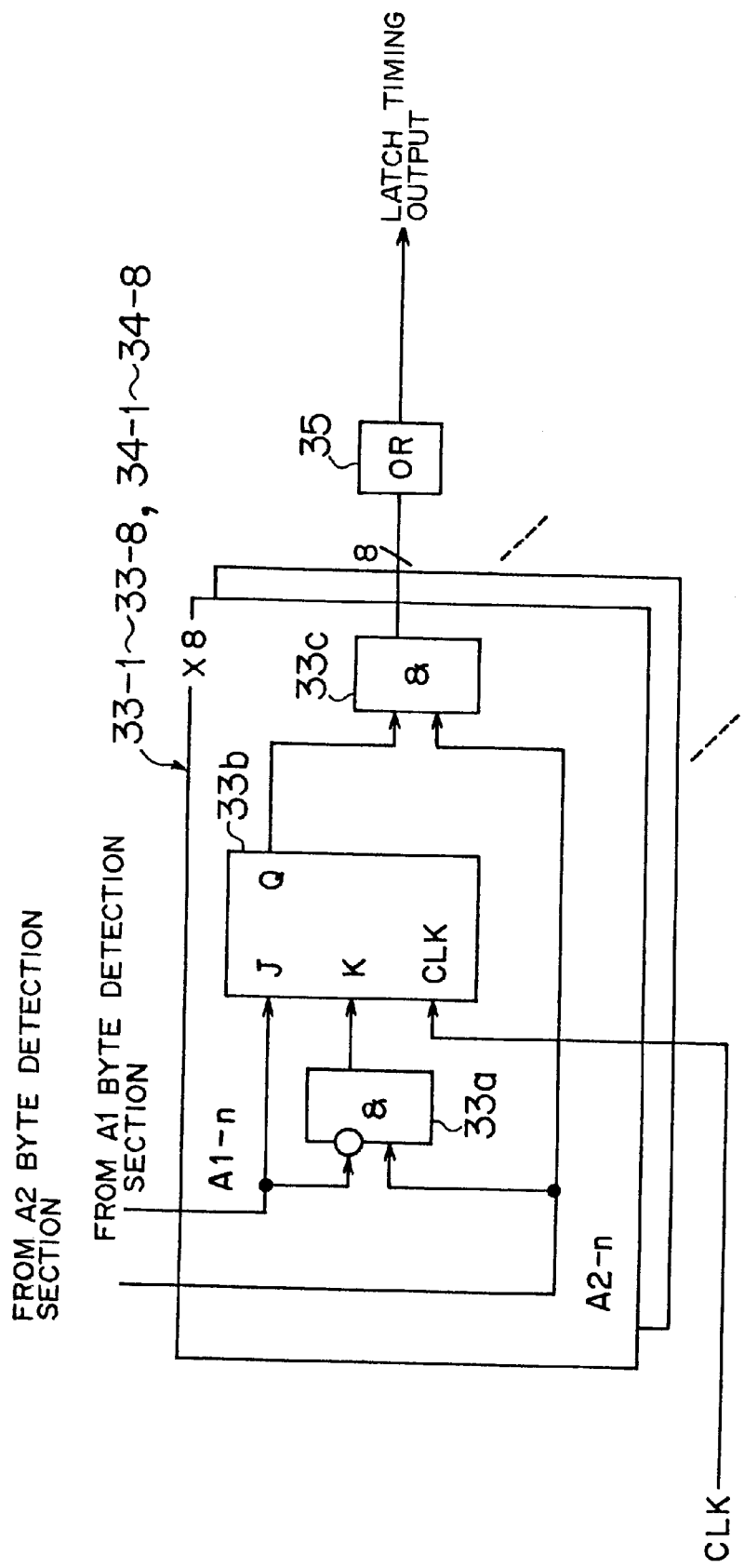
FIG. 22 is a block diagram showing a detailed composition of a changeover control section of the frame pattern position temporary detection section of the third variation.

For this sake, the control sections 33-i and the A1 byte continuity monitoring sections 34-i comprise actually, as shown in FIG. 22 for instance, 1-input reversion type AND gate 33a, a JK type FF circuit 33b and an AND gate 33c for enabling (achieved, for example, by turning Q output of FF circuit 33b to "H") the corresponding A2 byte detection circuits 23-i upon the detection of A1 byte by any one of A1 byte detection circuits 22-i and, thereafter, for maintaining the state (by keeping Q output of FF circuit 33b to "H") upon the detection of the A1 byte having the same pattern number "i"; on the other hand, they output the latch timing signal upon the detection of the A2 byte having the same pattern number "i" by the A2 byte detection circuits 23-i and control the detection operation to the initial state (reset:achieved, for example, by turning Q output of FF circuit 33b to "L").

Namely, in the switching control section 24C of this variation, if the A1 byte continuity is not confirmed by the A1 byte continuity monitoring section 34-i and the A2 byte is not detected by the A2 byte detection circuits 23-i, the invalidation processing section 30C judges the temporary region data of that time invalid so as to inhibit the output of the latch timing signal and to reset the detection operation to the initial state.

In this third variation of the frame pattern position temporary detection section 20 composed as mentioned above, in this case also, first, at the initial state, A1 byte detection circuits 22-i are controlled to enable state and A2 byte detection circuits 23-i to disable state so as to realize the A1 byte detection operation state.

Figure 23:
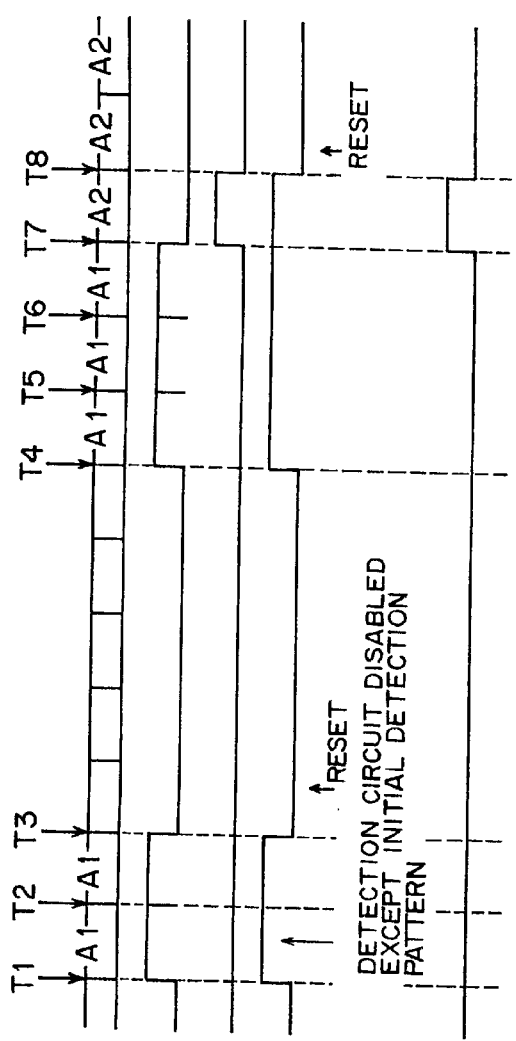
FIG. 23(*a*) to FIG. 23(*e*) are all timing charts illustrating an operation of the frame pattern position temporary detection section of the third variation.

When the A1 byte is detected from the m parallel data shown, for instance, by the time point T1 in FIG. 23(a) and FIG. 23(b), by one of respective A1 byte detection circuits 22-i, the control sections 33-i control the A1 byte detection circuits 22-i and the A2 byte detection circuits 23-i other than such detected pattern number "i" to the disable state and only the A1 byte detection circuits 22-i and the A2 byte detection circuits 23-i corresponding to the detected pattern number "i" to enable state [refer to the time point T1 in FIG. 23(d)].

Then, as shown by the time point T2 in FIG. 23(a) and FIG. 23(b), when A1 byte having the same pattern number "i" is detected at the next bit, by the A1 byte detection circuits 22-i, the control sections 33-i keep this state (only the A1 byte detection circuits 22-i and the A2 byte detection circuits 23-i corresponding to such pattern number "i" are enabled) [refer to the time point T2 in FIG. 23(d)].

As shown by the time point T3 in FIG. 23(a) and FIG. 23(b), when data other than the A1 byte is detected, the control section 33-i puts (reset) the detection operation by the A1 byte detection circuits 22-i and the A2 byte detection circuits 23-i to the initial state.

On the other hand, as mentioned above, when the A1 byte is detected from the m parallel data [refer to the time point T4 in FIG. 23(a) and FIG. 23(b)] by one of A1 byte detection circuits 22-i and the control sections 33-i control only the A1 byte detection circuits 22-i and the A2 byte detection circuits 23-i corresponding to the detected pattern number "i" to the enable state [refer to the time point T4 in FIG. 23(d)], during the detection of the same pattern number "i" [refer to the time points T5, T6 in FIG. 23(a) and FIG. 23(b)], in this case also, this state will be maintained, while the latch timing signal is output [refer to the time point T7 FIG. 23(e)] upon the detection of the A2 byte by the A2 byte detection circuits 23-i [refer to the time point T7 in FIG. 23(a) and FIG. 23(c)] and the detection operation returns to the initial state [refer to the time point T8 in FIG. 23(d)].

In this variation of the frame pattern position temporary detection section 20, except when the A1 byte or the A2 byte is detected after the detection of the A1 byte, namely unknown data other than the A1/A2 byte is detected after the detection of the A1 byte, the output of the latch timing signal is inhibited and such temporary region data at that time is canceled so as to avoid holding the same by the temporary region data latch section 21 as invalid data, this improves the reliability of the temporary region data.

(b-2-4) Description of a Forth Variation of the Frame Pattern Position Temporary Detection Section 20

Figure 24:
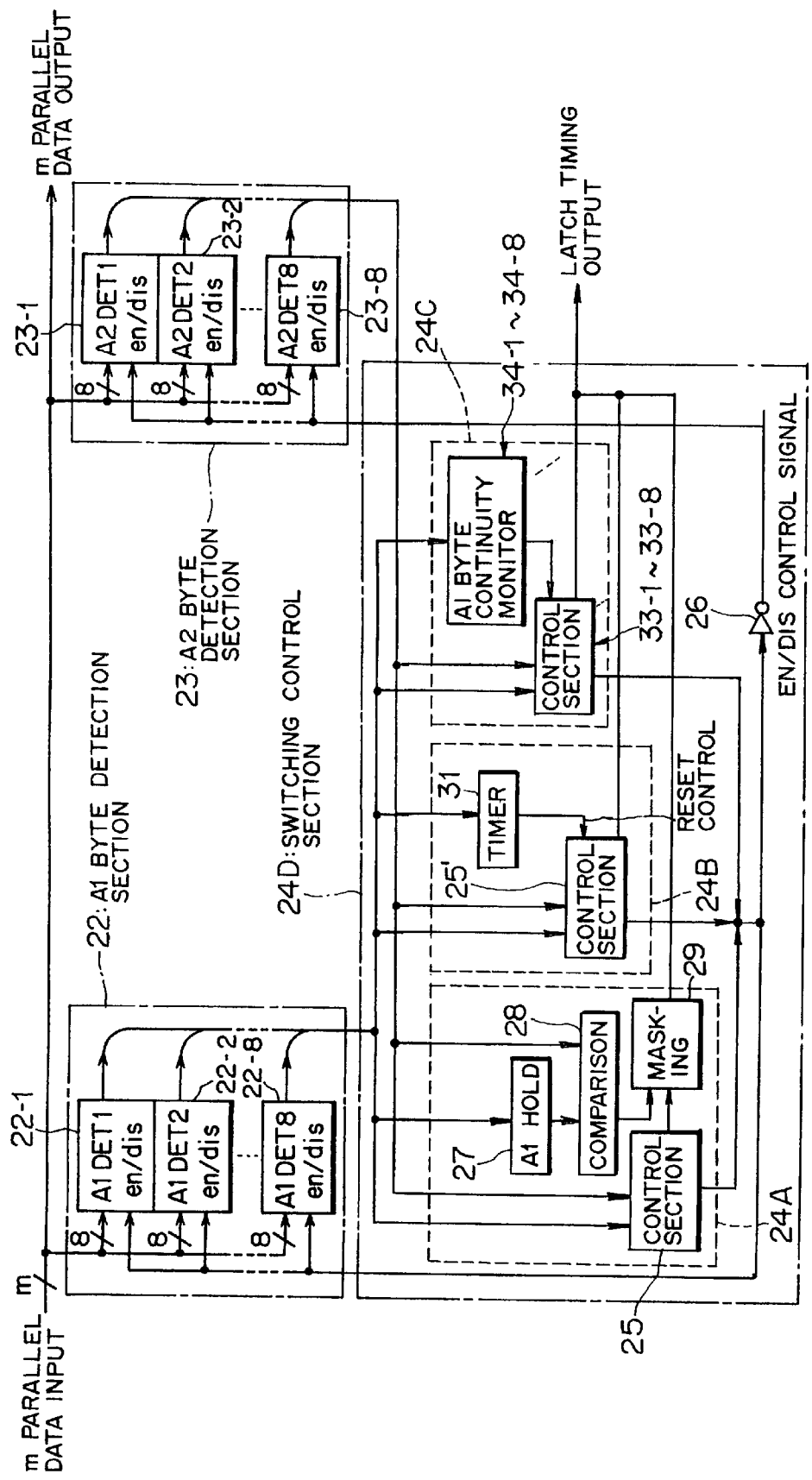
FIG. 24 is a block diagram showing a fourth variation of the frame pattern position temporary detection section of the present embodiment.

Next, FIG. 24 is a block diagram showing a forth variation of the frame pattern position temporary detection section 20. As shown in this FIG. 24, the detection section 20 of this variation comprises as the switching control section 24D control sections 24A to 24C mentioned above for the first to the third variations and the switching control sections 24A to 24C control independently as mentioned above for items (B1) to (B3).

In this composition, the forth variation of the frame pattern position temporary detection section 20 the output of the latch timing signal to the temporary region data latch section 21 is inhibited and such temporary region data at that time is canceled in any of the following case: (1) the pattern number of the detected A1 byte disagrees with the pattern number of the A2 byte, (2) A2 byte is not detected within a certain guard time after the detection of the A1 byte, or (3) unknown data other than the A1/A2 byte is detected after the detection of the A1 byte.

In other words, only when the A2 byte is detected within a certain guard time after the detection of the A1 byte and the pattern number of the detected A1 byte agrees with the pattern number of the A2 byte, and any of the conditions (1) to (3) is not satisfied, the temporary region data of that time is judged including the actual frame synchronous pattern, the latch timing signal is delivered to the temporary region data latch section 21 and the latching or the serialization processing are performed in the temporary region data latch section 21.

In this condition, the detection accuracy of the temporary region data will be improved remarkably so as to enhance all the more the reliability of the present processing apparatus 11 (detection apparatus 14).

Though the switching control section 24D comprises in combination three (3) the switching control sections 24A to 24C, it may be composed by the combination of any two (2) sections (switching control sections 24A and 24B, switching control sections 24B and 24C, switching control sections 24A and 24C).

(b-2-5) Description of a Variation of the Temporary Frame Synchronous Pattern Detection Section 15

Figure 25:
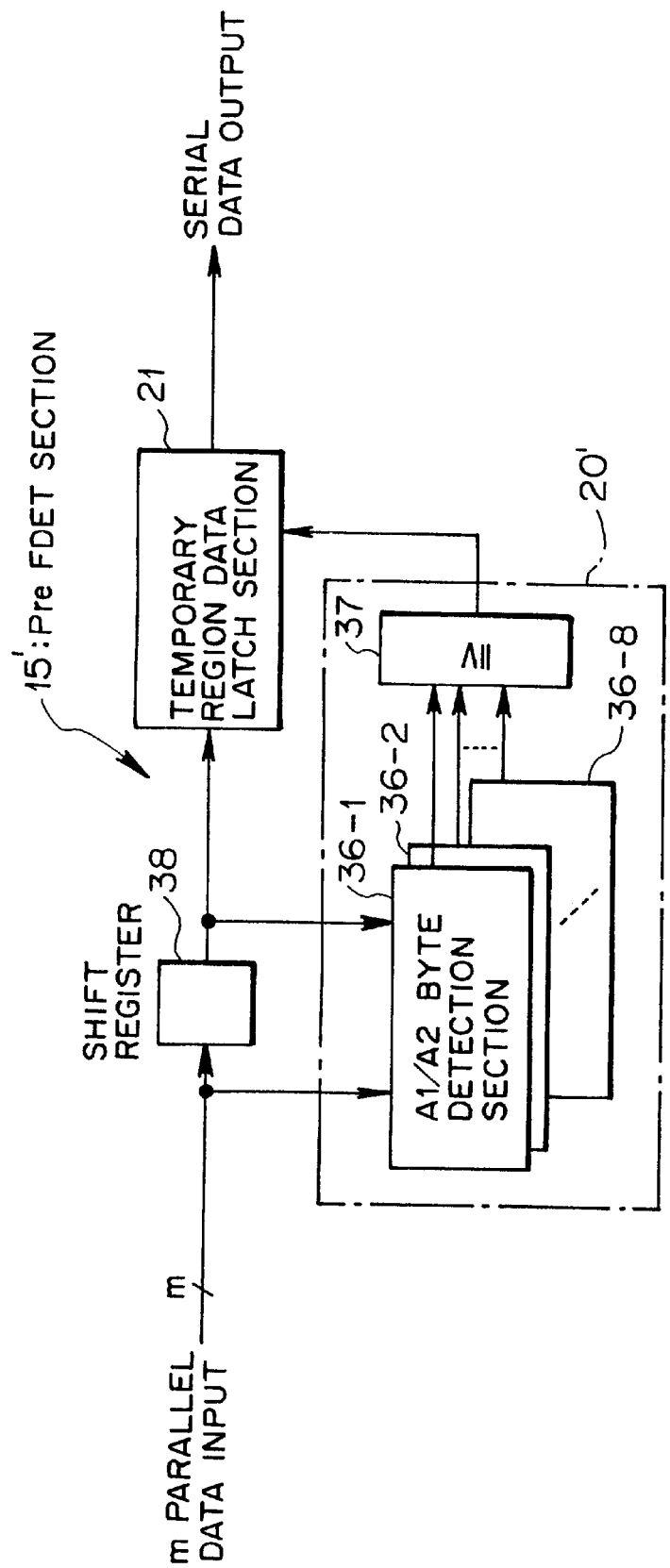
FIG. 25 is a block diagram showing a variation of the temporary frame synchronous pattern detection section of the present embodiment.

Next, FIG. 25 is a block diagram showing a variation of the temporary frame synchronous pattern detection section 15 shown in FIG. 5 and FIG. 6. As shown in this FIG. 25, the temporary frame synchronous pattern detection section 15' of this variation comprises a frame pattern position temporary detection section 20' having the A1/A2 byte detection sections 36-1 to 36-8, an OR gate 37 and a shift register 38 in place of the frame pattern position temporary detection section 20 shown in FIG. 5 and FIG. 6.

Here, the shift register 38 delays input m parallel data by one time slot, the A1/A2 byte detection circuit 36-i (in which i=1 to 8) detects simultaneously the A1/A2 byte from the m parallel data corresponding to 2 time slots before and after the delay by this shift register, and the OR gate 37 outputs "H" pulse (detection position) as the latch timing signal for temporary region data latch section 21 upon the simultaneous detection of the A1 and the A2 byte by any one of these A1/A2 byte detection circuits 36-i.

Therefore, the A1/A2 byte detection circuits 36-i comprises, as shown for example in FIG. 26, an A1 pattern decoding section 39, an A2 pattern decoding section 40 and an AND gate 41; when the A1 pattern decoding section 39 detects a bit pattern of the A1 byte and the A2 pattern decoding section 40 detects a bit pattern of A2 byte, the AND gate 41 turns its output to "H" for outputting the latch timing signal.

Figure 27A:
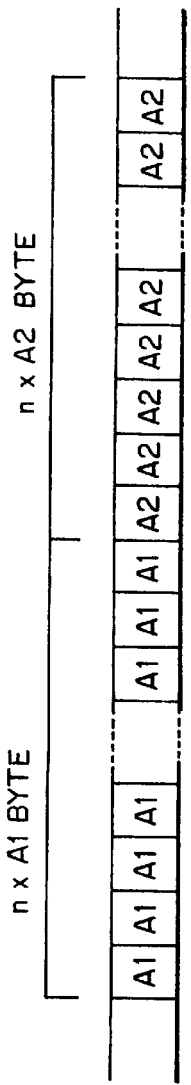
FIG. 27(*a*) and FIG. 27(*b*) are both illustrating an operation of the temporary frame synchronous pattern detection section of the variation.
Figure 27B:
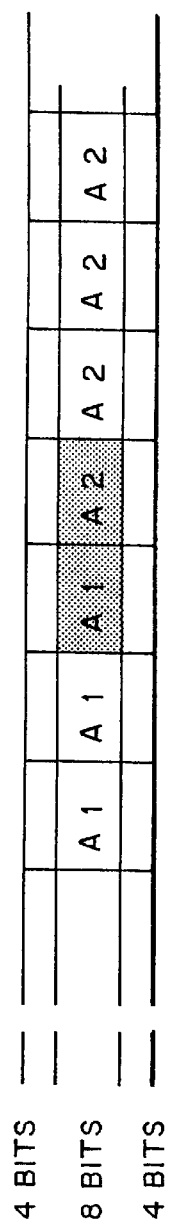

In other words, the frame pattern position temporary detection section 20' according to this variation may identify in some extent by one (1) detection operation the boundary of the A1/A2 byte [refer to meshed portion in FIG. 27(b)] necessarily existing when n multiplexed serial data comprising continuous n A1/A2 bytes respectively as shown for example in FIG. 27(a) are put in m parallel data (in which m=8×natural number and m=16 in this example) as shown in FIG. 27(b). Here, the boundary is not the actual boundary of the A1/A2 byte in the serial data, but the actual boundary point necessarily exist within several bytes around this detection position.

Therefore, in this case, the region containing frame synchronous pattern may be screened more effectively from the m parallel data and the temporary region data may be detected more rapidly and precisely.

As shown in FIG. 25, there are eight A1/A2 byte detection circuits 36-i because there are only 8 ways of the leading slots of the A1 byte (or A2 byte) in m parallel data in this case too. Consequently, these 8 A1/A2 byte detection circuits 36-i may respond to the increase of the parallel factor m of the parallel data in a way to contribute considerably to the versatility of this processing apparatus 11 (detection apparatus 14).

(b-3) Detailed Description of the Temporary Region Data Latch Section 21

Figure 28:
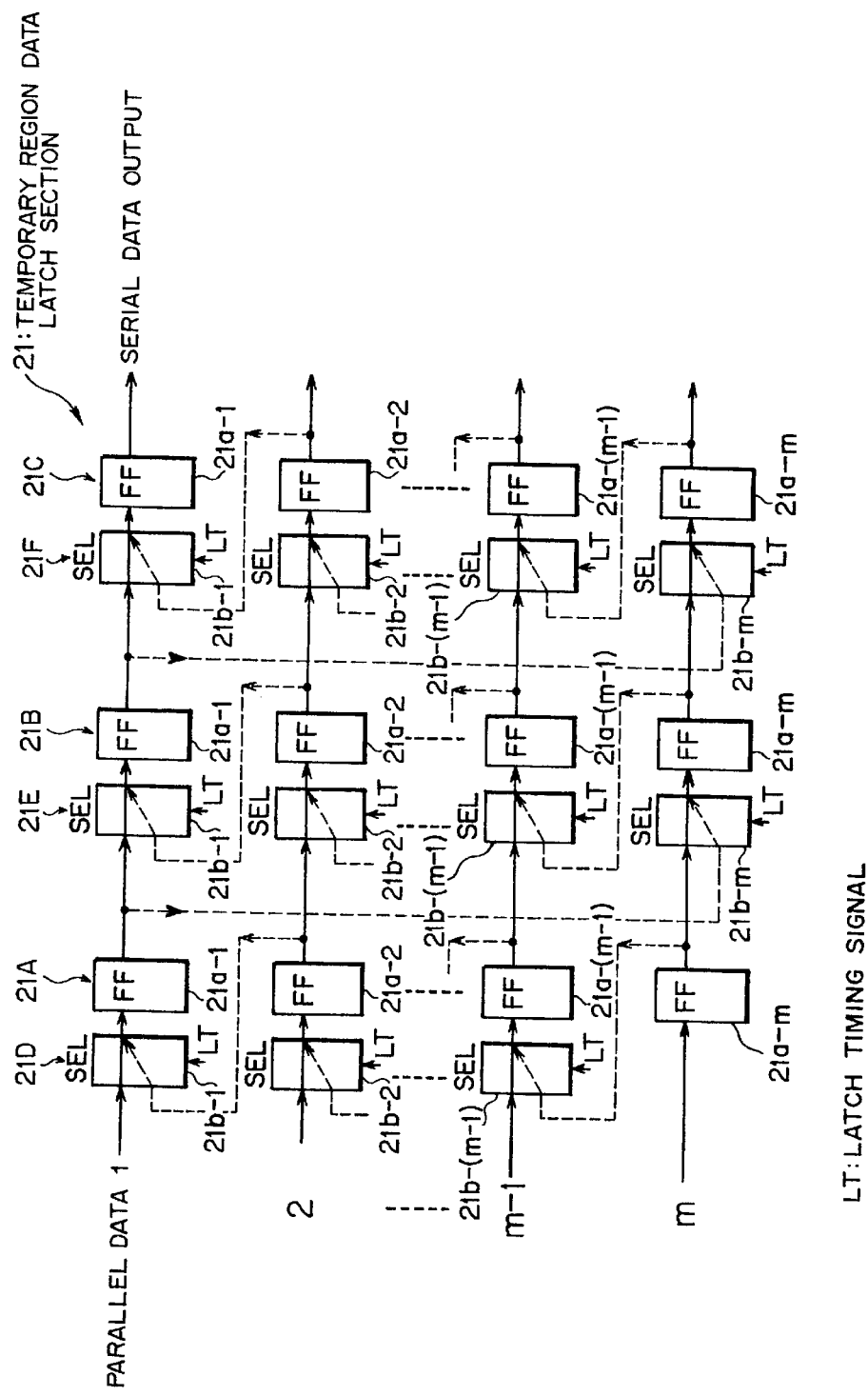
FIG. 28 is a block diagram showing a detailed composition of a temporary region data latch section of the present embodiment.

Next, FIG. 28 is a block diagram showing the detailed composition of the temporary region data latch section 21 shown in FIG. 5 and FIG. 6 (or FIG. 24). In this FIG. 28, 21A to 21C are respectively FF (shift) stage and 21D to 21F are respectively selector stage and, as shown in this FIG. 28, respective FF stage 21A to 21C comprises respectively the m stages of the FF (shift) circuits 21a-1 to 21a–m corresponding to the parallel factor m of the input parallel data while the selector stage 21D comprises m–1 stages of the selectors (SEL) 21b–1 to 21b–(m–1) and respective selector stage 21E, 21F comprises respectively m stages of the selectors 21b–1 to 21b–m.

Here, the respective FF circuits 21a–j (in which j=1 to m) holds respectively the input data temporarily and shifts (delays) the data by 1 clock (1 byte) while respective selector 21b–k (in which k=1 to m–1), 21b–j changes over respectively its input in response to the latch timing signal (LT) supplied from the frame pattern position temporary detection section 20 (or 20').

In the present embodiment, while the latch timing signal is not supplied, the input to respective selector 21b–k, 21b–j is switched to the parallel data input side respectively and the output from respective FF circuits 21a–j is connected in series to the input of the following corresponding FF circuits 21a–j (refer to the arrow in solid line) and if the latch timing signal is supplied, input to respective selectors 21b–k, 21b–j is switched to the lower stage side respectively inside the respective FF circuits 21A to 21C and output from respective FF circuits 21a–j (in which j>=2 in this case) of the lower stage side are connected sequentially to the input of FF circuits 21a–j of the higher stage side and, at the same time, the output from the FF circuit 21a-1 of the highest stage in shift stage 21A (21B) is connected to the input of the FF circuit 21-m of the lowest stage in the following shift stage 21B (21C)(refer to the arrow in broken line).

In this composition, in the temporary region data latch section 21, when the frame pattern position temporary detection section 20 (or 20') detects the frame synchronous pattern temporary position information and outputs the latch timing signal, at that timing, the inputs to respective selector 21b–k and 21b–j are switched to the lower stage side respectively, the input parallel data (temporary region data) is shifted sequentially by respective FF circuit 21a–j through the pass indicated by the arrow in broken line in FIG. 28 and, eventually, multiplexed serial data obtained by time-sharing input parallel data 1 to m is output from the FF circuit 21a-1 of the highest stage in the FF stage 21C.

Figure 29:
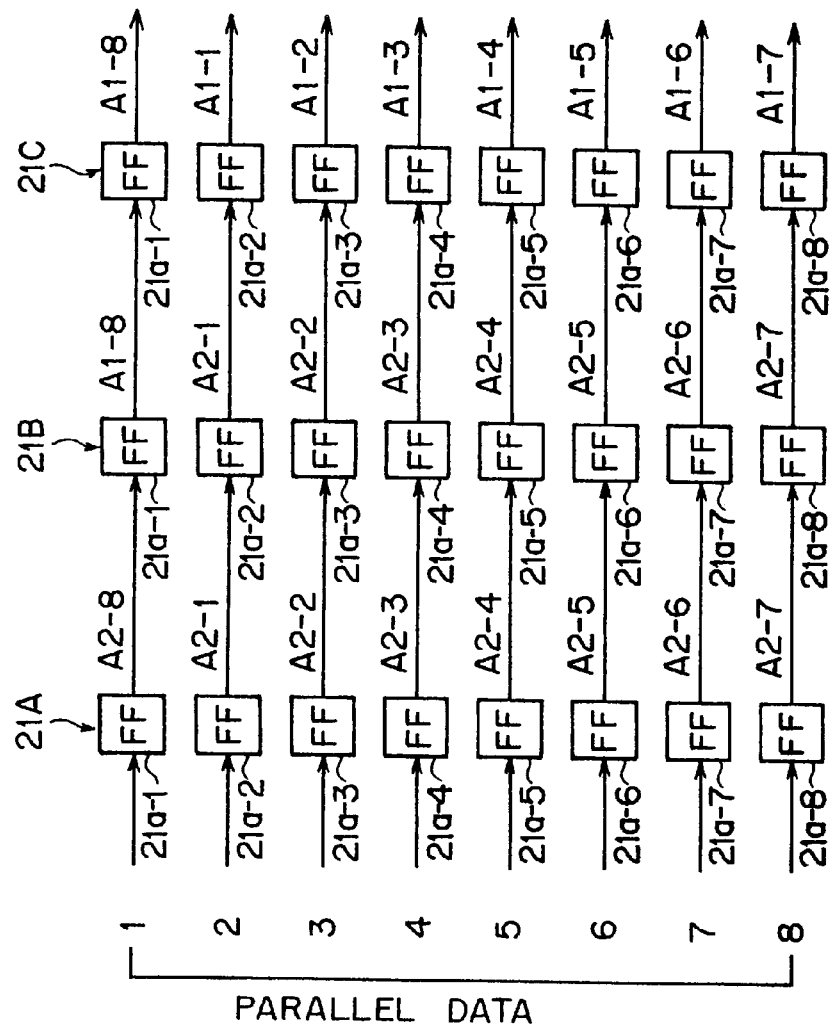
FIG. 29 and FIG. 30 are both illustrating an operation of the temporary region data latch section of the present embodiment.
Figure 30:
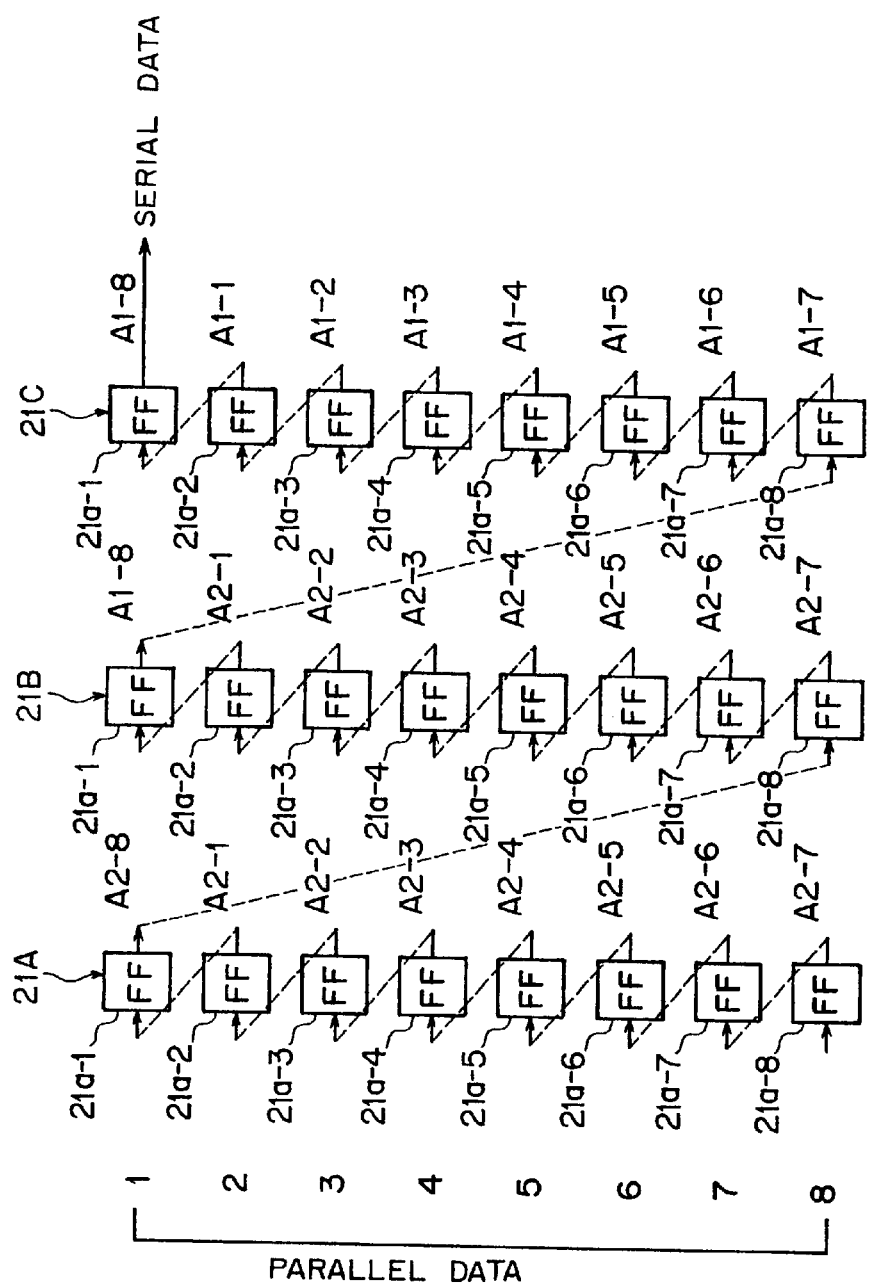
Figure 31:
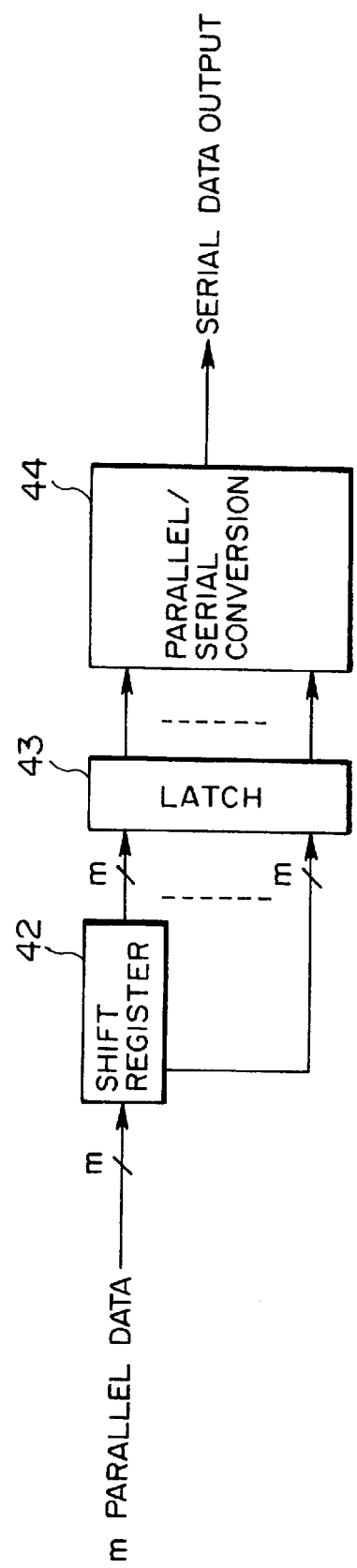
FIG. 31 is a diagram illustrating an effect provided by the temporary region data latch section of the present embodiment.

For example, when m=8 as mentioned above, suppose that the output data of respective FF circuits 21a–j is as shown in FIG. 29 (in which, in FIG. 29, A1-i represents "i"-th bit of A1 byte and A2-i "i"-th bit of A2 byte), by the switching, respective FF circuits 21a–j is connected as shown in FIG. 30, and the input parallel data is output serially in the sequence of, for instance, A1-8, A1-1, A1-2, . . . , A2-6, A2-7.

Thus, in the temporary region data latch section 21, by performing the parallel data shifting operation and the parallel data serialization operation by the shift circuit 21a–j, it is unnecessary to provide separately a shift register 42, a latch circuit 43 for shifting/latching the parallel data and a parallel/serial conversion circuit 44 for serializing the parallel data. Consequently, all the way minimizing the size of the present processing apparatus 11 (detection apparatus 14), the serialization processing may be performed extremely rapidly.

Note that in the temporary region data latch section 21, according to the present embodiment, the FF stages 21A to 21C are composed in 3 stages to serialize at least 1 byte before and after the parallel data as the temporary region data when the time point where the latch timing signal is output is taken as the actual time point, the number of stages may be variable according to the number of necessary byte of the temporary region data.

By the way, in the temporary region data latch section 21, while the frame pattern position temporary detection section 20 (or 20') does not output the latch timing signal, only any one of m parallel data (for instance, data corresponding to parallel data number "1" in FIG. 28) as serial data is output and as it concerns a pattern which does not exist actually on the m parallel signal train, the following frame synchronous pattern detection section 16 may detect erroneously.

Figure 32:
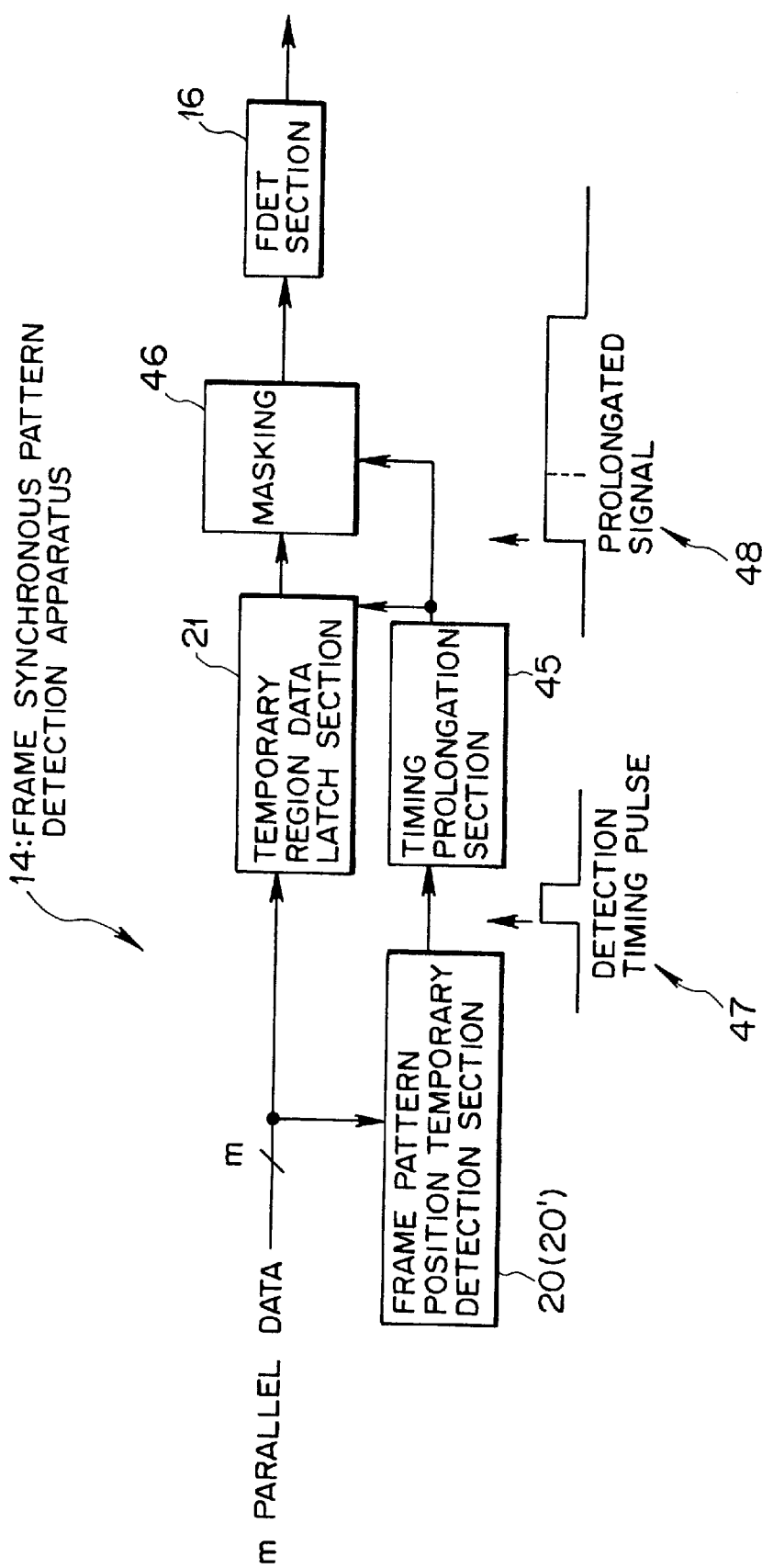
FIG. 32 is a block diagram showing another composition of the frame synchronous pattern detection section of the present embodiment.

Here, if a timing prolongation section 45 and a masking section 46 are added as shown in FIG. 32, while the latch timing signal is not detected in the frame pattern position temporary detection section 20 (or 20') the serial data will be masked in the masking section 46 by a timing signal from the timing prolongation section 45.

More particularly, as masking is not performed while the parallel/serial conversion processing is performed by the temporary region data latch section 21, the latch timing signal (refer to symbol 47) detected by the frame pattern position temporary detection section 20 (or 20') is converted to a signal (refer to symbol 48) whose the time period is prolonged as necessary for the timing prolongation section 45 so that the masking section 46 is turned to the output enable state during that period of time, and only serial data of the time where such prolonged signal is supplied to the masking section 46 is output to the frame synchronous pattern detection section 16.

As the result, the frame synchronous pattern detection section 16, always, the detected frame synchronous pattern only in respect of the data containing the frame synchronous pattern so as to contribute remarkably to the improvement of detection operation and the reduction of power consumption.

(b-4) Detailed Description of the Frame Synchronous Pattern Detection Section 16

Figure 33:
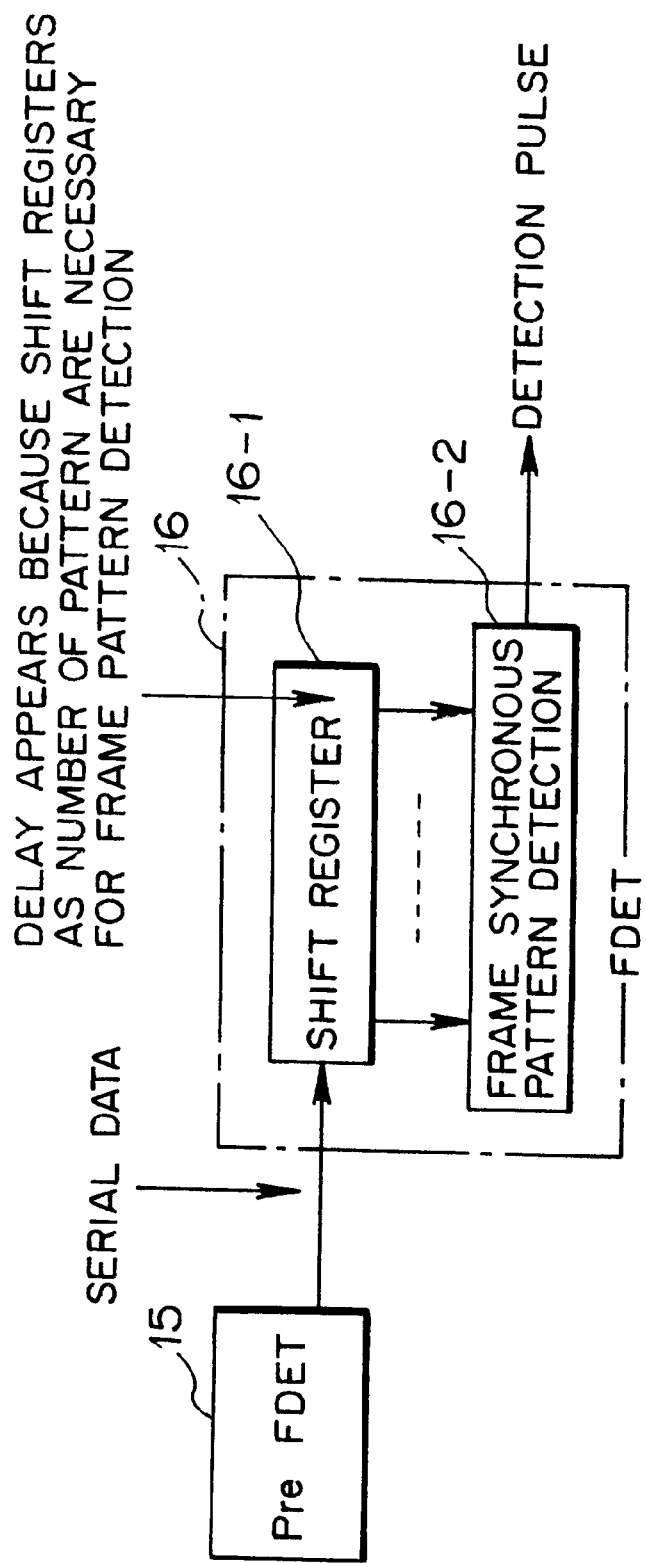
FIG. 33 is a block diagram showing a detailed composition of a frame synchronous pattern detection section.

By the way, in the frame synchronous pattern detection section 16, normally, as shown in FIG. 33, the serial data from the temporary frame synchronous pattern detection section 15 is delayed sequentially by a shift register section 16-1 and the frame synchronous pattern detection pulse is output when a sequence of the A1/A2 byte is detected by a frame synchronous pattern detection circuit 16-2.

So, in this case, at least shift registers corresponding to the number of pattern (bit) of the frame synchronous pattern existing in the parallel data will be necessary for the shift register section 16-1. For example, suppose the actual frame synchronous pattern be two byte of the A1/A2 byte, at least shift registers for 16 bits will be necessary. If so, however, the shift registers corresponding to the number of the pattern (m patterns for m parallel data) will be required for the shift register section 16-1 to detect the frame synchronous pattern so as to delay considerably such detection processing.

Figure 34:
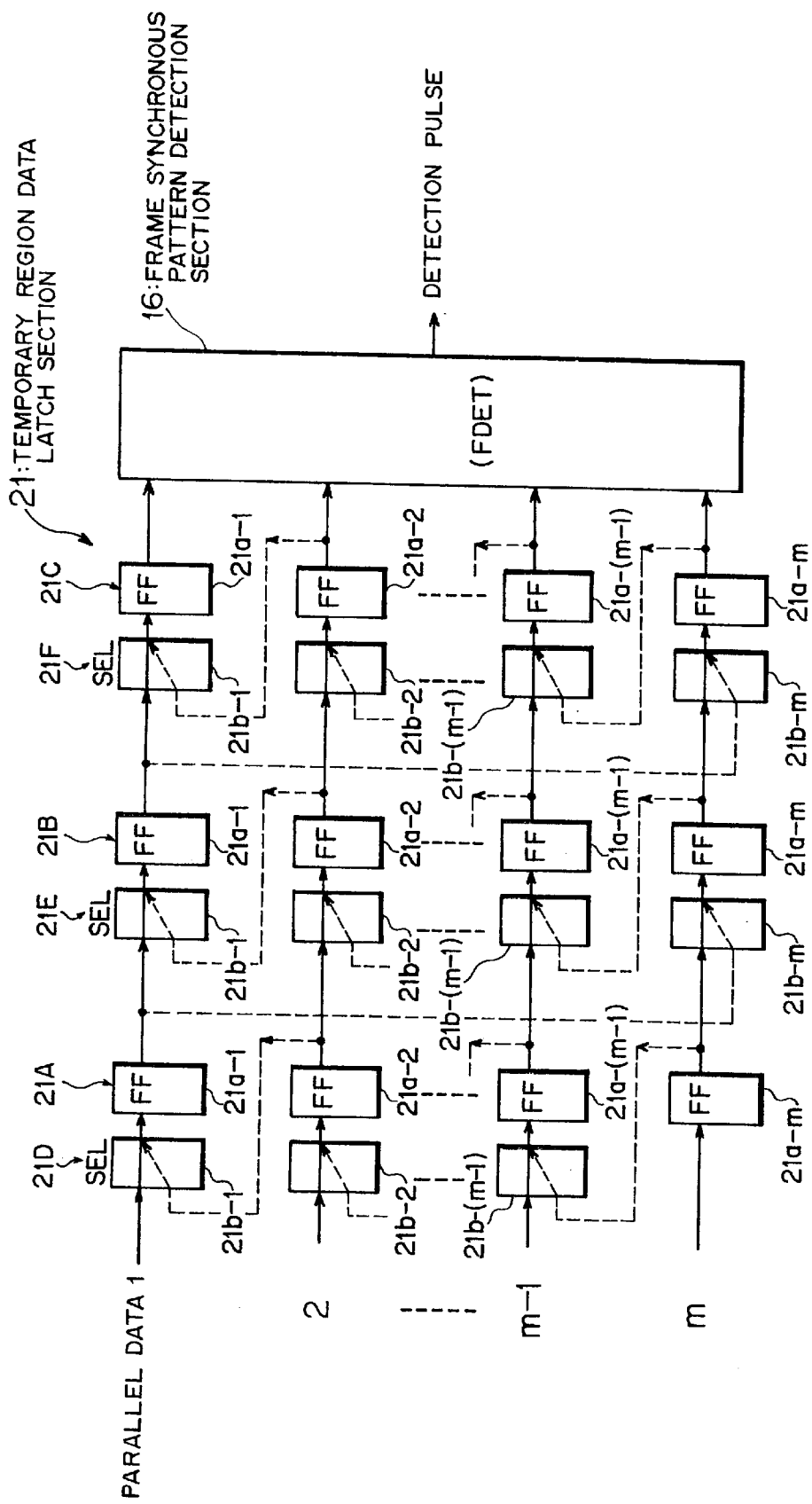
FIG. 34 is a block diagram showing a composition of the temporary region data latch section and the frame synchronous pattern detection section of the present embodiment.

Therefore, in the present embodiment, as shown in FIG. 34 for example, the frame synchronous pattern detection section 16 cooperates with the temporary region latch section 21 of the temporary frame synchronous pattern detection section 15 so as to perform the frame synchronous pattern detection using serialization processing of temporary region data in the temporary region data latch section 21.

Namely, in the frame synchronous pattern detection section 16, the frame synchronous pattern detection and serialization processing may be performed simultaneously using the fact that the sequence of the data containing all patterns necessary for the frame synchronous pattern detection appears in the parallel data in the course of serialization (for instance, respective output from FF circuit 21a–j of the last FF stage 21C) by serializing the input parallel data as it is shifted sequentially by respective FF circuit 21a–j in the temporary region data latch section 21 shown in FIG. 28.

As the result, the processing time (delay time) form the detection of the temporary region data in the temporary frame synchronous pattern detection section 15 to the detection of actual frame synchronous pattern in the frame synchronous pattern detection section 16 may be minimized permitting to detect the frame synchronous pattern from the temporary region data extremely rapidly.

(b-5) Detailed Description of the Byte Switch Control Section 19

Figure 35:
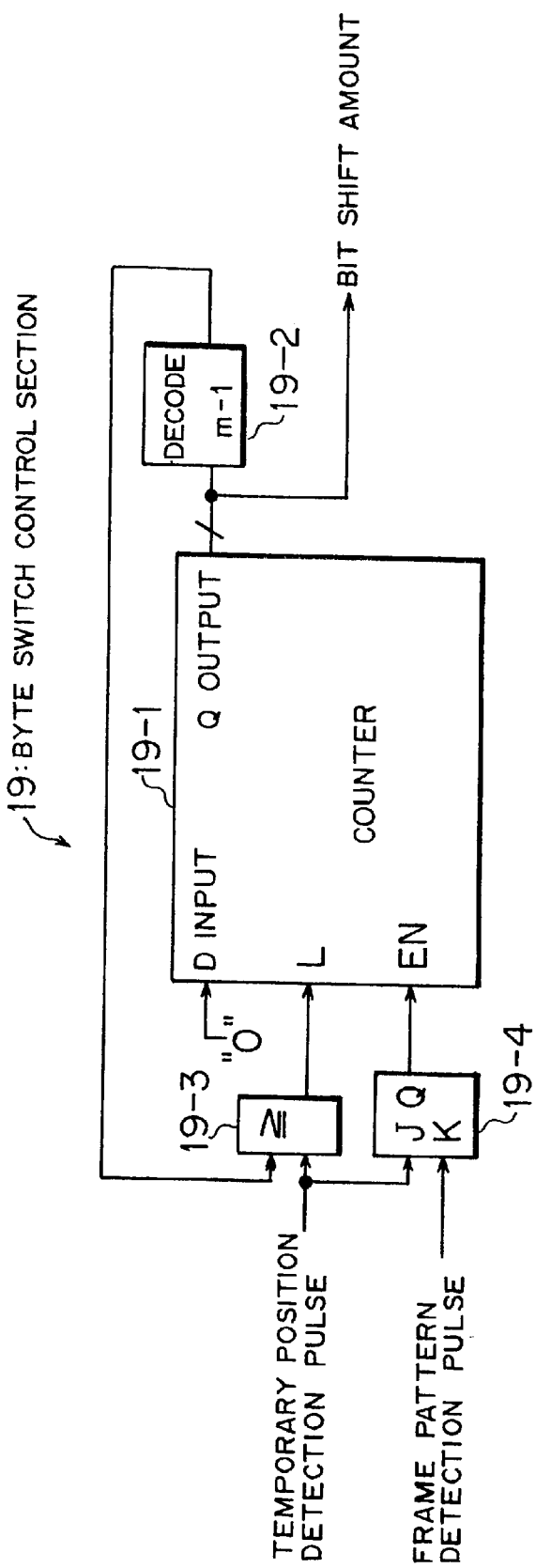
FIG. 35 is a block diagram showing a detailed composition of a byte switch control section of the present embodiment.

Next, FIG. 35 is a block diagram showing the detailed composition of the byte switch control section 19 (refer to FIG. 3). As shown in this FIG. 35, the byte switch control section 19 of the present embodiment comprises an m-ary (m is parallel factor) counter 19-1, a decoder 19-2, an OR gate 19-3 and a JK type FF circuit 19-4.

Here, the m-ary counter 19-1 counts reiteratively the counter value from the initial value "0" to "m−1" while "H" pulse is input to the enable terminal (EN) and when the input to the enable terminal is turned to "L", outputs the counter value of that time (Q output) to the byte switch section 13 (refer to FIG. 3) as the bit shift value described below.

The decoder 19-2 decodes (detects) the counter value m−1 of this m-ary counter 19-1; each time the counter value "m−1" is decoded by this decoder 19-2, the output from the OR gate 19-3 turns to "H", the initial value "0" is input to the m-ary counter 19-1 through the data input terminal (D) and the reiterative counting operation from "0" to "m−1" is repeated by the m-ary counter 19-1.

The FF circuit 19-4 generates the control signal for the enable terminal of the m-ary counter 19-1. For example, when the latch timing signal (temporary position detection pulse) turns to "H", the Q output turns to "H" to control the m-ary counter 19-1 to the enable state and, in this state, when the frame pattern detection pulse from the frame synchronous pattern detection section 16 turns to "H", the Q output turns to "L" to control the m-ary counter 19-1 to the disable state.

Figure 36A:
FIG. 36(*a*) and FIG. 36(*b*) are both illustrating an operation of the byte switch control section of the present embodiment.
Figure 36B:
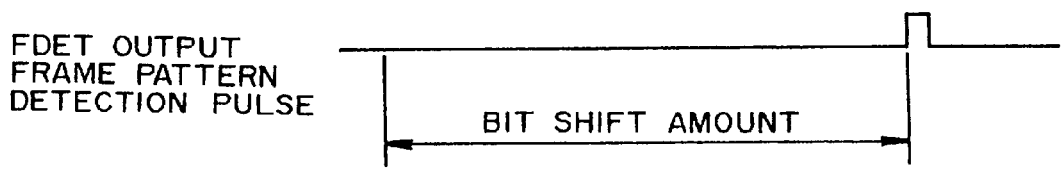
Figure 37:
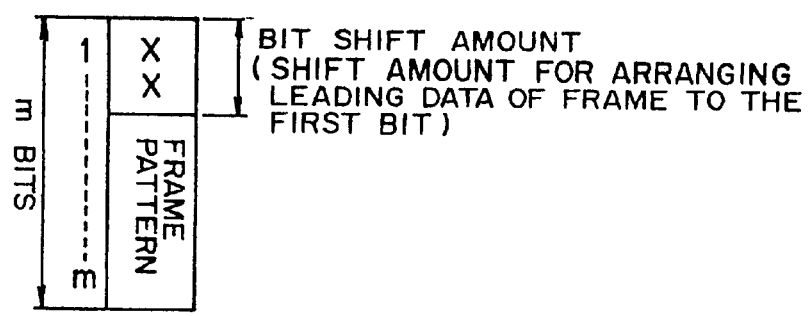
FIG. 37 is a diagram illustrating an operation of the byte switch control section of the present embodiment.

In other words, the byte switch control section 19 recognizes the byte switch control information for the byte switch section 13 by such bit shift amount based on the fact that the shift amount for arranging the leading data of the frame synchronous pattern to the first bit of m parallel data (bit shift amount) as shown in FIG. 37 corresponds to the bit shift amount in the temporary region data latch section 21 from the detection of the temporary position detection pulse in the temporary frame synchronous pattern detection section [refer to FIG. 36(*a*)] to the detection of the actual frame synchronous pattern in the frame synchronous pattern detection section 16 [refer to FIG. 36(*b*)].

Figure 38:
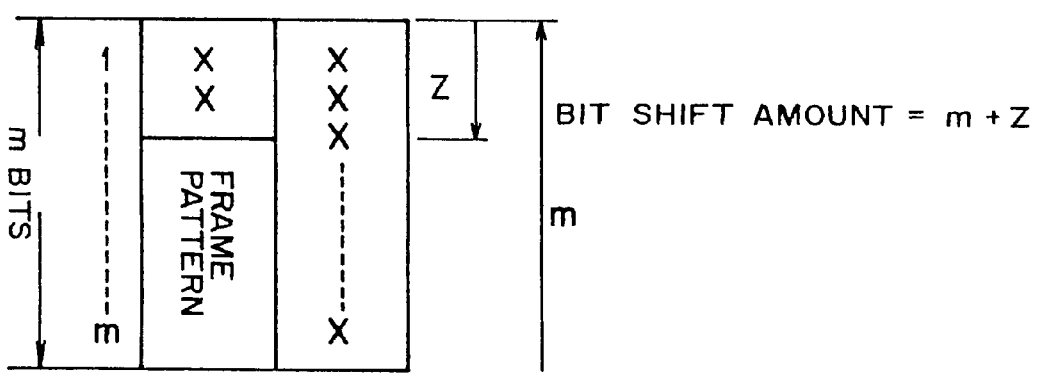
FIG. 38 is a diagram illustrating an operation of the byte switch control section of the present embodiment.

As, in the present embodiment, the bit shift amount from the temporary position of the frame synchronous pattern (data including several bytes around the actual frame pattern) is taken as the byte switch information, such several bytes around before and after may contain an unnecessary data portion and, as shown in FIG. 38, bit shift amount may exceed the parallel factor m ["m+z" (in which z is a natural number )]; in this case, as the bit shift amount is equivalent to "z", the bit shift amount "z" is obtained by dividing this value "m+z" by "m" with m-ary counter 19-1.

Figure 39:
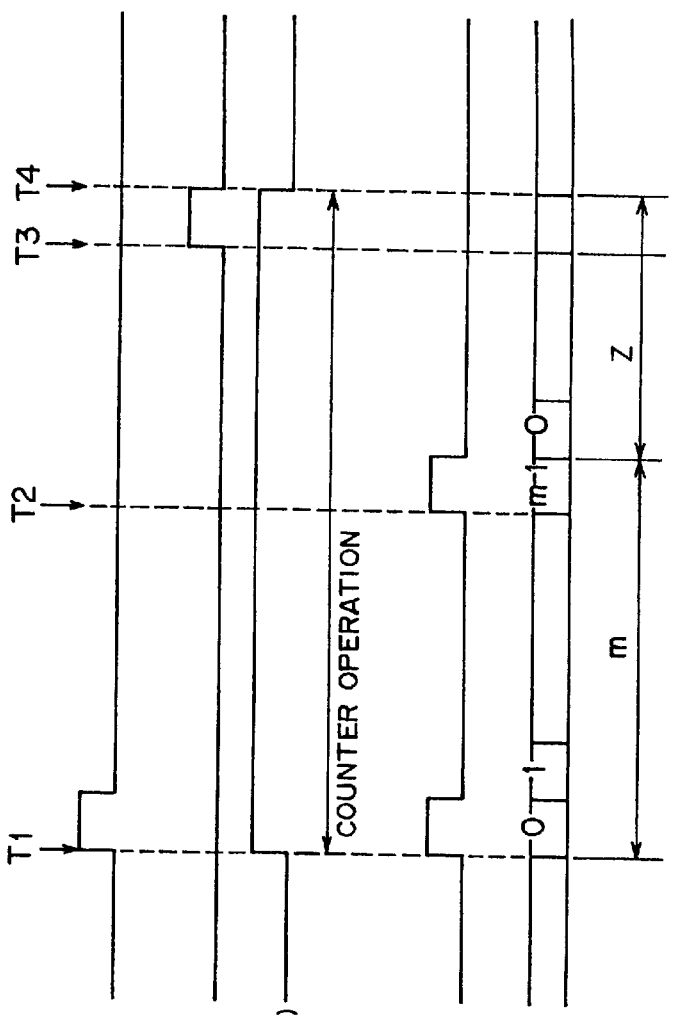
FIG. 39(*a*) to FIG. 39(*e*) are all timing charts for illustrating an operation of the byte switch control section of the present embodiment.
Figure 40:
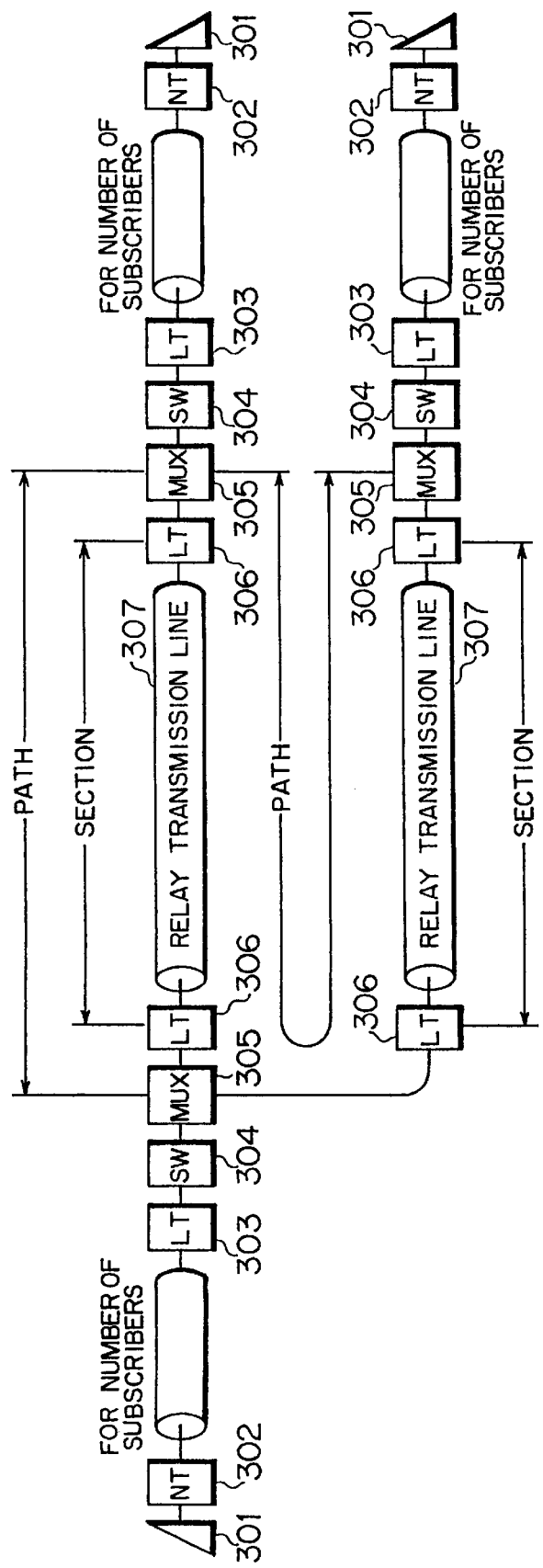
FIG. 40 is a block diagram showing an example of SDH (SONET) transmission network.
Figure 41:
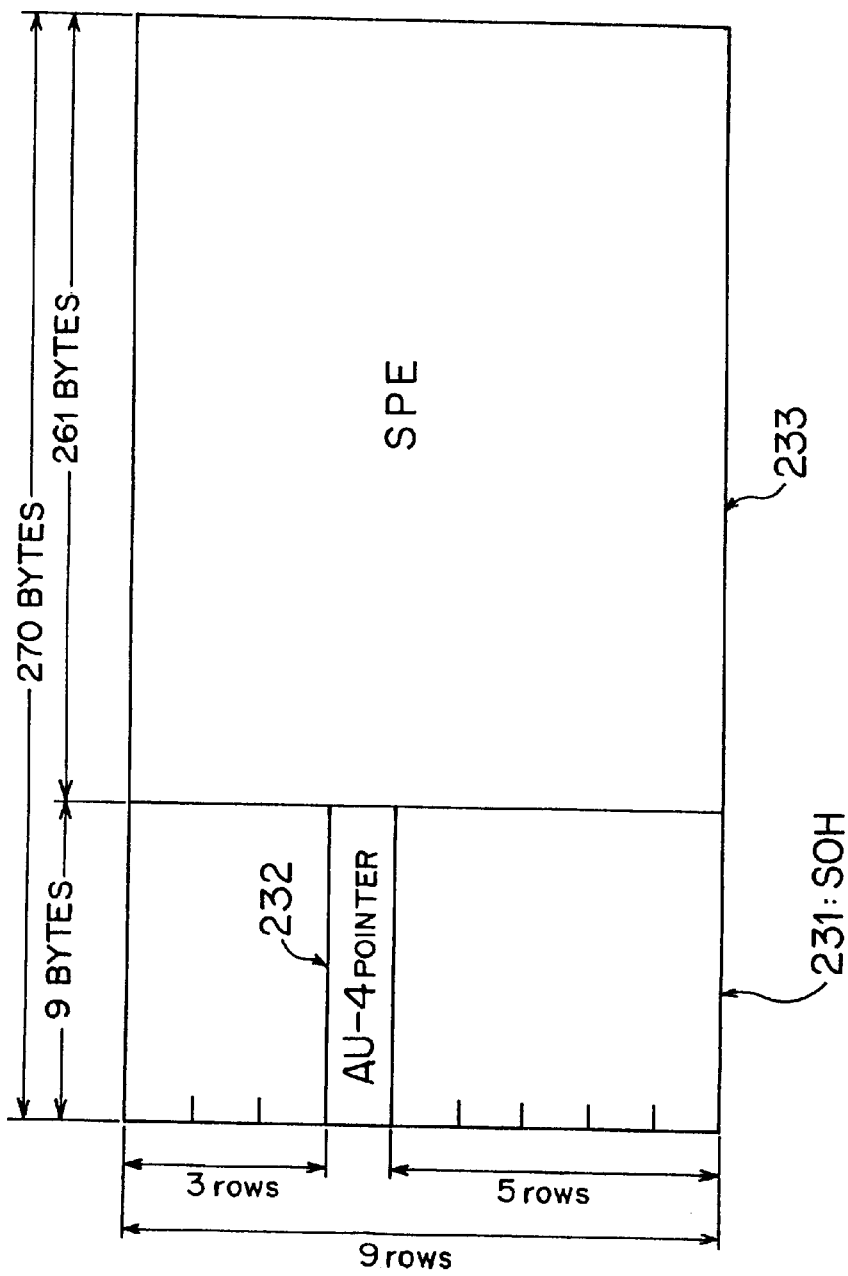
FIG. 41 is a diagram showing a frame format of STM-1 in SDH transmission system.

In the byte switch control section 19 of the present embodiment composed as mentioned above, when the temporary position of the frame synchronous pattern is detected in the temporary frame synchronous pattern detection section 15 and the detection pulse is applied [refer to the time point T1 in FIG. 39(*a*)] the load terminal input (output of OR gate 19-3) and the enable terminal input (output of FF circuit 19-4) of the m-ary counter 19-1 both turn to "H" [refer to the time point T1 in FIG. 39(*c*) and FIG. 39(*d*)] and the m-ary counter 19-1 intakes the data "0" to initiate the counting operation from "0" [refer to the time period T1 in FIG. 39(*e*)].

Thereafter, this m-ary counter 19-1 keeps the enable state until the frame synchronous pattern is detected by the frame synchronous pattern detection section 16 and the frame pattern detection pulse applied to the K input of the FF circuit 19-4; during this period of time, as shown for example by the time point T2 in FIG. 39, if "m−1" is counted, this value is decoded by the decoder 19-2 and again the load terminal input (output of OR gate 19-3) and the enable terminal input (output of FF circuit 19-4) of the m-ary counter 19-1 both turn to "H" [refer to the time point T2 in FIG. 39(*c*) and FIG. 39(*d*)] to resume the counting operation from "0".

Further thereafter, as shown by the time point T3 in FIG. 39(*b*), when the frame synchronous pattern is detected in the frame synchronous pattern detection section 16 and the frame pattern detection pulse is applied to the K input of the FF circuit 19-4, the counter value of the counter 19-1 at that time (here, "z") is output as the bit shift amount for the byte switch section 13 and, at the same time, at the next clock timing, the Q output from the FF circuit 19-4 (enable terminal input of m-ary counter 19-1) turns to "L" [refer to the time point T4 in FIG. 39(*c*)] to stop the counting operation.

Thus, in the byte switch control section 19, as the parallel data rearrangement processing is controlled by outputting as the byte switch control information for the byte switch section 13 the data (bit) shift amount corresponding to the period of time from the detection of the temporary position of the frame synchronous pattern (temporary region data) to the detection of the actual frame synchronous pattern, the frame synchronous pattern is always positioned at the leading position of the parallel data precisely.

Consequently, an extremely simple control may realize the rearrangement processing so as to contribute considerably to the scale simplification and the processing acceleration of the present processing apparatus 11 (detection apparatus 14).

Moreover, in this byte switch control section 19, as the counter value of the m-ary counter 19-1 counting the counter value "0" to "m−1" corresponding to the number of parallels of the parallel data is taken as the bit shift amount, even if the bit shift amount exceeds the parallel factor "m" of the parallel data depending on the data amount of the temporary region data, the time necessary for the data rearrangement processing may always be minimized so as to achieve the rearrangement processing in the byte switch section 13 more rapidly.

As mentioned above, according to the frame synchronous pattern processing apparatus 11 (frame synchronous pattern detection apparatus 14) of the present embodiment, first, the candidate region possibly containing the frame synchronous pattern is detected temporarily from the input parallel data and the actual frame synchronous pattern is detected from such temporary region, so the frame synchronous pattern from the parallel data may be detected by one circuit independent of the-parallel factor of the parallel data. Consequently, even when the parallel factor of the data to be treated increases, frame synchronous pattern may be detected rapidly without increasing size, power consumption or cost of this apparatus 11(14).

(b-6) Others

In the embodiment, though a frame synchronous pattern processing apparatus 11 having the frame synchronous pattern detection apparatus 14 is adopted for SOH termination processing section 404 (refer to FIG. 44), the present invention is not limited by this, but the single frame synchronous pattern detection apparatus 14 may be used independently.

Also, though the embodiments apply to the frame synchronous pattern (A1/A2 byte) based on the SDH transmission system, the present invention is not limited by this, but it may composed to detect temporarily the candidate region data containing a certain frame synchronous pattern from the data containing such frame synchronous pattern and then to detect the actual frame synchronous pattern from such temporary region. Consequently, the present apparatus 14 may also be applied to other transmission systems or data processing systems than the SDH transmission system contributing remarkably to its versatility.

What is claimed is:

1. A frame synchronous pattern processing apparatus comprising:
   (a) a data switch section for arranging parallel data, which has been converted from multiplexed serial data according to a synchronous digital hierarchy (SDH) transmission system, in-such a manner that an object frame synchronous pattern comes as a start of the parallel data:
   (b) a provisional-region detection section for sampling, among the parallel data, a part in which the object frame synchronous pattern is presumably located, as a provisional region and converting the parallel data of the provisional region in serial:
   (c) a frame synchronous pattern detecting section for detecting the object frame synchronous pattern, from the partial serial data of the provisional region which sampled and converted by said provisional region detection section; and
   (d) a data switch control section, responsive to said frame synchronous pattern detection section and said provisional-region detection section, for controlling said data switch section based on the output of said provisional-region detection section and the output of said frame synchronous pattern detection section.

2. A frame synchronous pattern processing apparatus according to claim 1 wherein said provisional-region detection section includes:
   (a) provisional position information detection section for detecting provisional position information of said frame synchronous pattern in the parallel data; and
   (b) a provisional region data hold section for holding region parallel data including a reference position, which is based on the provisional position information, detected by said provisional position information detection sections as the provisional region data, converting parallel region data into serial data successively, and outputting the resultant serial data.

3. A frame synchronous pattern processing apparatus according to claim 2, wherein said provisional position information detection section includes:
   (a) an A1 byte detection section for detecting an A1 byte from the parallel data,
   (b) an A2 byte detection section for detecting an A2 byte from the parallel data, and
   (c) a switching control section for switching the detection operations of the A1 byte detection section and the A2 byte detection section in response to the detection timing of the A1 byte and A2 byte; and wherein the detection position of the A2 byte is supplied to said provisional region data hold section as the provisional position information when the A2 byte is detected y said A2 byte detection section after the detection of the A1 byte by said A1 detection section by the switching operation of said switching control section.

4. A frame synchronous pattern processing apparatus according to claim 3, wherein said A1 byte detection section is composed to detect one byte of the A1 byte for each A1 byte leading position which may exist in the parallel data, and said A2 byte detection section is composed to detect one byte of the A2 byte for each A2 byte leading position which may exist in the parallel data.

5. A frame synchronous pattern processing apparatus according to claim 3, responding to the detection of an A1 byte by said A1 byte detection section, for stopping the detection operation of said A2 byte detection section and starting detection operation of said A2 byte detection section, and also responding to the detection of A2 byte by said A2 byte detection section, for stopping the detection operation of said A2 byte detection section and starting the next detection operation of said A1 byte detection section.

6. A frame synchronous pattern processing apparatus according to claim 5, wherein said switching control section includes a JK type flip-flop circuit.

7. A frame synchronous pattern processing apparatus according to claim 3, wherein said switching control section includes an invalidation processing section for determining a validity/invalidity of the provisional region data based on the detection state of the A1 byte in said A1 byte detection section and the detection state of the A2 byte in said A2 byte detection section; and if the provisional region data is invalid, said invalidation processing section performs invalidation processing so as to prevent the provisional position information from being supplied to the provisional region data hold section.

8. A frame synchronous pattern processing apparatus according to claim 7, wherein said invalidation processing section is operable to compare the leading position of the A1 byte detected in said A1 byte detection section and the leading position of the A2 byte detected in said A2 byte detection section and wherein if the leading positions are different as the result of comparison, and said invalidation processing section regards the provisional region data as invalid data and starts the invalidation processing.

9. A frame synchronous pattern processing apparatus according to claim 8, wherein said invalidation processing section includes (a) an A1 byte leading position hold section for temporarily holding the leading position of the A1 byte detected in said A1 byte detection section, and (b) a comparison section for comparing the leading position of the A1 byte held in said A1 byte leading position hold section and the leading position of the A2 byte detected in said A2 byte detection section; and wherein if the leading position of the A1 byte and the leading position of the A2 byte are different the comparison by said comparison section of the provisional region data is invalid data, and starts the invalidation processing.

10. A frame synchronous pattern processing apparatus according to claim 7, wherein said invalidation processing section includes a timer for counting a given period of time upon the detection of the A1 byte in said A1 byte detection section, and the invalidation processing section is composed to determine the provisional region data invalid when the A2 byte is not detected in said A2 byte detection section until the end of the counting operation of said timer and to perform the invalidation processing wherein if the A2 byte has not been detected in said A2 byte detection section until the termination of the counting operation of said timer, the provisional region data is invalid data, and starts the invalidation processing.

11. A frame synchronous pattern processing apparatus according to claim 7, wherein said invalidation processing includes an A1 byte continuity monitoring section for monitoring if said A1 byte is continuously detected in said A1 byte detection section; and wherein if the continuity of said A1 byte has not been recognized by said A1 byte continuity monitoring section and said A2 byte has not been detected by said A2 byte detection section, said invalidation processing section regards the provisional region data as invalid data, and starts the invalidation processing.

12. A frame synchronous pattern processing apparatus according to claim 2, wherein said temporary position information detection section includes an A1/A2 byte detection section for simultaneously detecting the A1 byte and the A2 byte from a plurality of time slots of said parallel data, and wherein if the A1 byte and the A2 byte are simultaneously detected by said A1/A2 byte detection section, said provisional position information detection section supplies the detection position to the provisional region data hold section as the provisional position information.

13. A frame synchronous pattern processing apparatus according to claim 2, wherein said provisional region data hold section includes a multi-stage shift circuit having a plurality of shift stage according to the number of arrays of the parallel data for temporarily holding and shifting input data and the input data successively; wherein if the provisional position information detection section, the provisional region data hold section converts the parallel input data into serial data by sequentially connection the output of the lower stage of the shift circuit to the input of the higher succeeding stage of the shift circuit and also, by connecting the output of the highest stage of the shift circuit to the input of the lowest shift circuit in the succeeding shift stages.

14. A frame synchronous pattern processing apparatus according to claim 2, further comprising a mask processing section for masking the output of said provisional region data hold section when the parallel data other than the provisional region data is inputted.

15. A frame synchronous pattern processing apparatus according to claim 1, wherein said frame synchronous pattern detection section is cooperating with said provisional region detection section for detecting the object from synchronous pattern by utilizing conversion processing of the provisional region data into serial data.

16. A frame synchronous pattern processing apparatus according to claim 1, wherein said data switch control section is operable to generates as a control signal representing a data shift amount as a control signal for said data switch section, corresponding to the period of time from when the provisional region data has been detected by said provisional region detection section to when the object frame synchronous pattern has been detected by said frame synchronous pattern detection section.

17. A frame synchronous pattern processing apparatus according to claim 16, wherein said data switch control section includes a counter for counting the count value corresponding to the number of parallels of the parallel data upon the detection of the provisional region data in said provisional region detection section, and data switch control section having operable to supply to said data switch section, the counted value of said counter at the time when the object frame synchronous pattern has been detected by said frame synchronous pattern detection section, as the data shift amount signal.

* * * * *